United States Patent
Takada

(10) Patent No.: US 10,488,997 B2
(45) Date of Patent: Nov. 26, 2019

(54) DISPLAY APPARATUS WITH TOUCH DETECTION FUNCTION

(71) Applicant: Japan Display Inc., Tokyo (JP)

(72) Inventor: Naoki Takada, Tokyo (JP)

(73) Assignee: Japan Display Inc., Tokyo (JP)

( * ) Notice: Subject to any disclaimer, the term of this patent is extended or adjusted under 35 U.S.C. 154(b) by 58 days.

(21) Appl. No.: 15/730,277

(22) Filed: Oct. 11, 2017

(65) Prior Publication Data
US 2018/0107302 A1    Apr. 19, 2018

(30) Foreign Application Priority Data

Oct. 13, 2016   (JP) .................... 2016-202064
Feb. 27, 2017   (JP) .................... 2017-035363

(51) Int. Cl.
| | | |
|---|---|---|
| *G06F 3/041* | (2006.01) | |
| *G02F 1/1333* | (2006.01) | |
| *G06F 3/044* | (2006.01) | |
| *G02F 1/1343* | (2006.01) | |
| *F21V 8/00* | (2006.01) | |
| *G01L 1/14* | (2006.01) | |

(52) U.S. Cl.
CPC .......... *G06F 3/044* (2013.01); *G02B 6/0051* (2013.01); *G02B 6/0053* (2013.01); *G02B 6/0055* (2013.01); *G02B 6/0056* (2013.01); *G02F 1/134363* (2013.01); *G06F 3/0412* (2013.01); *G06F 3/0416* (2013.01); *G01L 1/14* (2013.01); *G02F 1/13338* (2013.01); *G02F 2001/134372* (2013.01); *G06F 2203/04108* (2013.01)

(58) Field of Classification Search
CPC .. G06F 3/044; G06F 3/0412; G02F 1/134363; G02B 6/0051
See application file for complete search history.

(56) References Cited

U.S. PATENT DOCUMENTS

| | | | | |
|---|---|---|---|---|
| 2015/0338963 | A1* | 11/2015 | Lee ........................ | G06F 3/044 345/174 |
| 2016/0070398 | A1* | 3/2016 | Worfolk .................. | G06F 3/044 345/174 |

(Continued)

FOREIGN PATENT DOCUMENTS

JP    2016-058047    4/2016

*Primary Examiner* — Benyam Ketema
(74) *Attorney, Agent, or Firm* — K&L Gates LLP

(57) ABSTRACT

According to an aspect, a display apparatus with a touch detection function, the display apparatus includes: an input surface; a touch detection electrode; a first electrode; a second electrode facing the first electrode across a dielectric layer; a touch detection controller configured to detect contact with or proximity to the input surface by a detection target object based on electrostatic capacitance between the first electrode and the touch detection electrode; and a force detection controller configured to detect a force applied to the input surface by the detection target object based on electrostatic capacitance between the first electrode and the second electrode. The force detection controller is configured to correct a force detection value based on a reference capacitance value between the first electrode and the second electrode at a reference temperature in a non-contact state of the detection target object with the input surface.

16 Claims, 60 Drawing Sheets

(56) References Cited

U.S. PATENT DOCUMENTS

| | | | |
|---|---|---|---|
| 2016/0092015 A1* | 3/2016 | Al-Dahle | G06F 3/044 |
| | | | 345/174 |
| 2016/0216833 A1* | 7/2016 | Butler | G06F 3/0412 |
| 2016/0357331 A1* | 12/2016 | Kano | G06F 3/044 |
| 2017/0344165 A1* | 11/2017 | Heo | G06F 3/0412 |

* cited by examiner

FIG.43
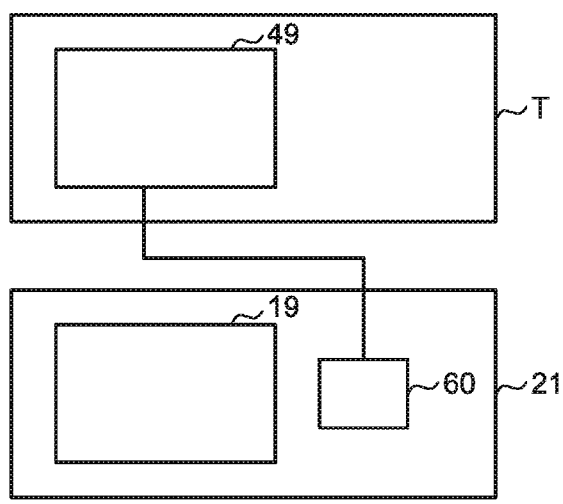
FIG.44
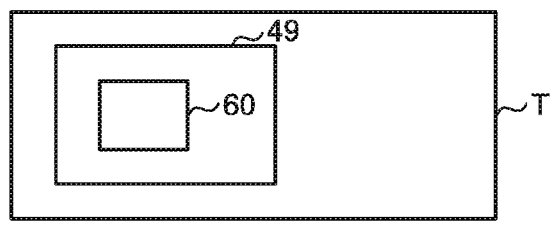
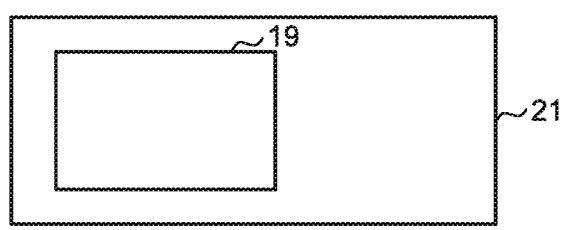

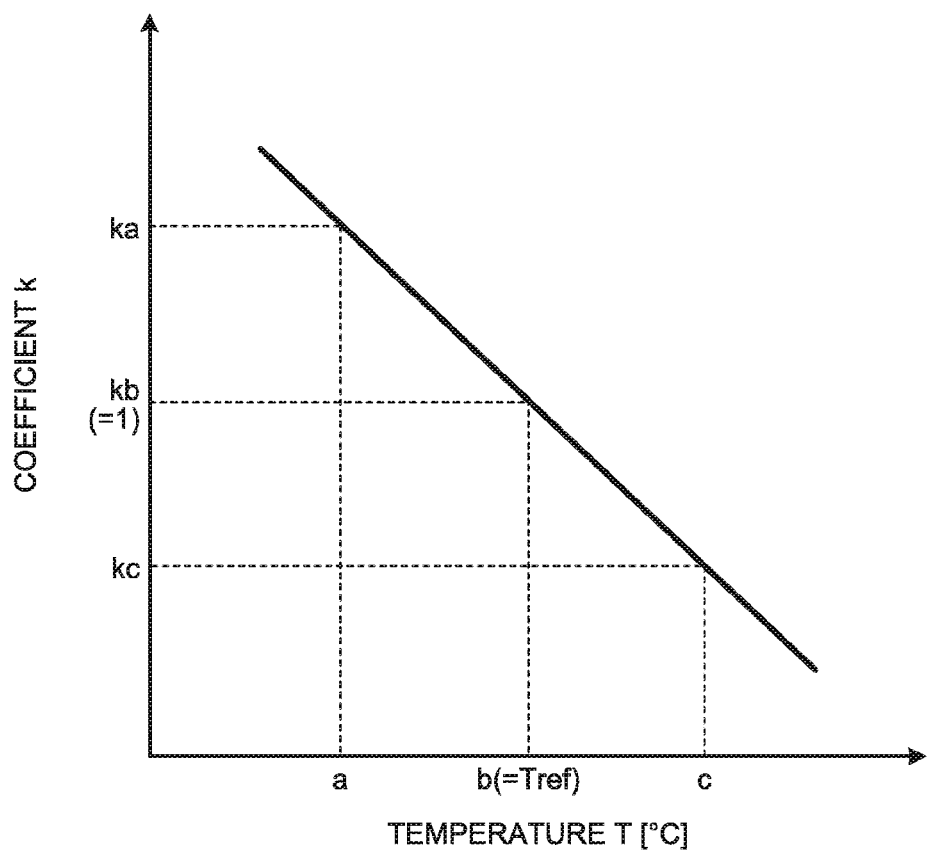

FIG.56

| | X1 | | Xp | | Xn |
|---|---|---|---|---|---|
| Y1 | (X1, Y1) | | (Xp, Y1) | | (Xn, Y1) |
| | | | | | |
| Yq | (X1, Yq) | | (Xp, Yq) | | (Xn, Yq) |
| | | | | | |
| Ym | (X1, Ym) | | (Xp, Ym) | | (Xn, Ym) |

| X-AXIS / Y-AXIS | X1 | ... | Xp | ... | Xn |
|---|---|---|---|---|---|
| Y1 | kp(1, 1) | ... | kp(p, 1) | ... | kp(n, 1) |
| ⋮ | ⋮ | | ⋮ | | ⋮ |
| Yq | kp(1, q) | ... | kp(p, q) (=1) | ... | kp(n, q) |
| ⋮ | ⋮ | | ⋮ | | ⋮ |
| Ym | kp(1, m) | ... | kp(p, m) | ... | kp(n, m) |

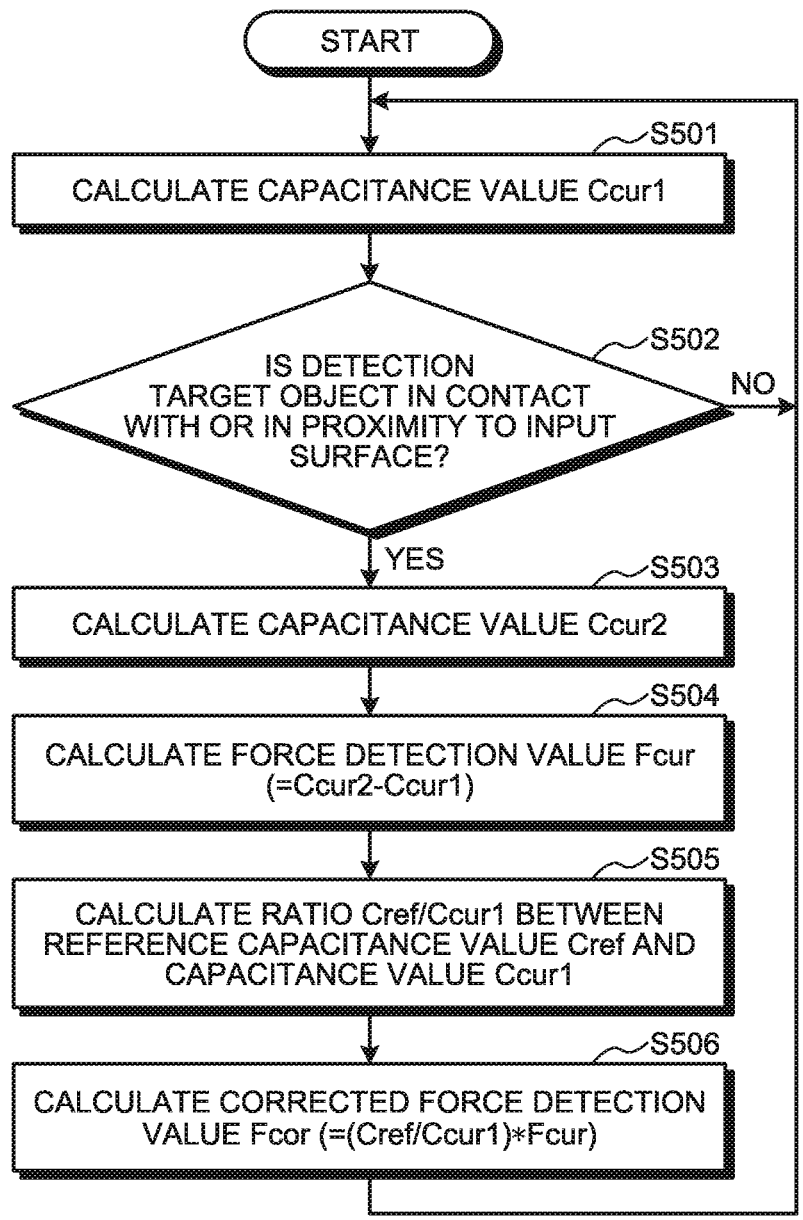

DISPLAY APPARATUS WITH TOUCH DETECTION FUNCTION

CROSS-REFERENCE TO RELATED APPLICATIONS

This application claims priority from Japanese Patent Application No. 2016-202064, filed on Oct. 13, 2016 and Japanese Patent Application No. 2017-035363, filed on Feb. 27, 2017, the contents of which are incorporated by reference herein in their entirety.

BACKGROUND

1. Technical Field

The present invention relates to a display apparatus with a touch detection function.

2. Description of the Related Art

In recent years, a touch detection apparatus commonly called a touchscreen panel that is capable of detecting an external proximate object has attracted attention. The touchscreen panel is mounted on a display apparatus such as a liquid crystal display apparatus or integrated with the display apparatus, and is used as a display apparatus with a touch detection function. The display apparatus with a touch detection function displays various button images and the like on the display apparatus so as to enable information input using the touchscreen panel as a substitute for typical mechanical buttons.

Force detection devices that are capable of detecting a force, in addition to detecting the touch, have come to be used.

As a related technology, an electrostatic touchscreen panel controller is disclosed that prevents an erroneous determination of contact or proximity between the touchscreen panel and the external proximate object caused by a difference in temperature between the touchscreen panel and the external proximate object (refer to Japanese Patent Application Laid-open Publication No. 2016-058047).

It is known that there is a force detection device that detects a force based on a change in electrostatic capacitance between a first conductor on an input surface side of the touchscreen panel and a second conductor on a back surface side of the touchscreen panel. Application of a force to the input surface of the detection device bends the touchscreen panel, and reduces the thickness of an air layer between the first conductor and the second conductor, thereby reducing the distance between the first and second conductors, such that the electrostatic capacitance between the first and second conductors is increased. The force detection device outputs a force signal value based on the change in electrostatic capacitance.

When the force detection device described above is used in the display apparatus with a touch detection function, a layered body may be provided between the first and second conductors, in addition to the air layer. The layered body includes a film, a light diffusing sheet, a light guide, and the like making up a backlight device. The layered body included in the backlight device is generally made of an acrylic resin. Such an acrylic resin expands or contracts with changes in temperature. Consequently, the electrostatic capacitance between the first and second conductors changes, thus reducing the accuracy of detection of a force applied to the input surface of the touchscreen panel, in some cases.

SUMMARY

According to an aspect, a display apparatus with a touch detection function, the display apparatus includes: an input surface configured to receive a force applied by a detection target object; a touch detection electrode provided on a first substrate and facing the input surface; a first electrode provided on a second substrate and facing the touch detection electrode; a second electrode facing the first electrode across a dielectric layer; a touch detection controller configured to detect contact with or proximity to the input surface by the detection target object based on electrostatic capacitance between the first electrode and the touch detection electrode; and a force detection controller configured to detect a force applied to the input surface by the detection target object based on electrostatic capacitance between the first electrode and the second electrode. The force detection controller is configured to correct a force detection value based on a reference capacitance value between the first electrode and the second electrode at a reference temperature in a non-contact state of the detection target object with the input surface.

According to another aspect, a display apparatus with a touch detection function, the display apparatus includes: an input surface configured to receive a force applied by a detection target object; a first electrode and a second electrode disposed facing each other across a dielectric layer; a touch detection controller configured to detect a position where the detection target object is in contact with or in proximity to the input surface; and a force detection controller configured to detect a force applied to the input surface by the detection target object based on electrostatic capacitance generated between the first electrode and the second electrode. The force detection controller is configured to correct a force detection value based on a ratio between a reference capacitance value of the electrostatic capacitance at a reference temperature in a non-contact state of the detection target object with the input surface and the electrostatic capacitance in the non-contact state of the detection target object with the input surface.

BRIEF DESCRIPTION OF THE DRAWINGS

FIG. 43 is a diagram illustrating a third arrangement example of the temperature sensor of the display apparatus with a touch detection function according to the second embodiment;

FIG. 44 is a diagram illustrating a fourth arrangement example of the temperature sensor of the display apparatus with a touch detection function according to the second embodiment;

FIG. 46 is a diagram illustrating an exemplary relation between a correction coefficient and the temperature of the display apparatus with a touch detection function according to the second embodiment;

FIG. 47 is a diagram illustrating an example of a first correction coefficient table of the display apparatus with a touch detection function according to the second embodiment;

FIG. 56 is a diagram illustrating a division example of a force detection area on the input surface of the display apparatus with a touch detection function according to the third embodiment;

FIG. 57 is a diagram illustrating an example of a second correction coefficient table of the display apparatus with a touch detection function according to the third embodiment;

FIG. 76 is a flowchart illustrating a process executed by the force detection controller of the display apparatus with a touch detection function according to the fourth embodiment.

DETAILED DESCRIPTION

Figure 1:
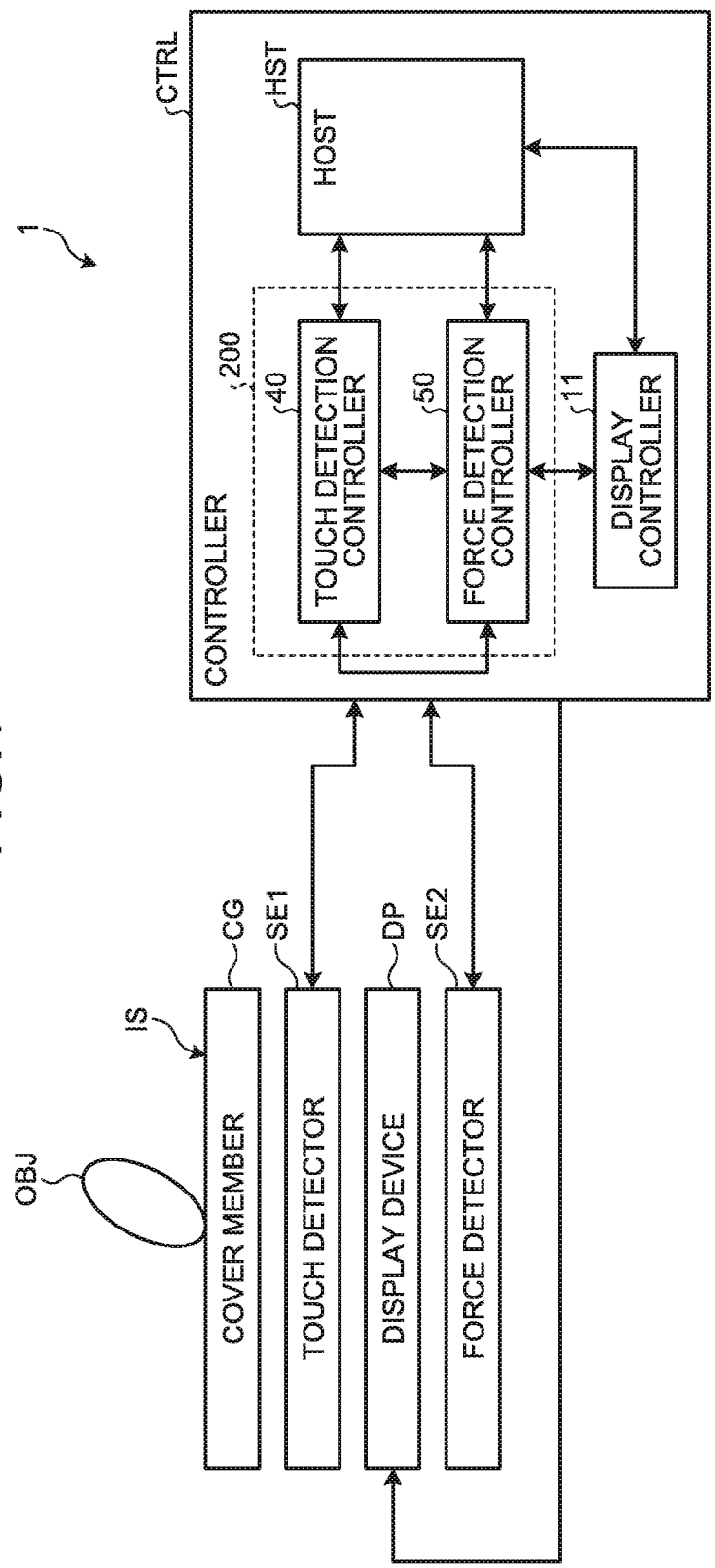
FIG. 1 is a block diagram illustrating a configuration of a display apparatus with a touch detection function according to a first embodiment.

The following describes embodiments for carrying out the present invention in detail with reference to the drawings. The present invention is not limited to the description of the embodiments to be given below. Components to be described below include those easily conceivable by those skilled in the art, and those substantially the same. The components to be described below can also be combined as appropriate. What is disclosed herein is merely an example, and the present invention naturally encompasses appropriate modifications easily conceivable by those skilled in the art while maintaining the gist of the invention. To further clarify the description, widths, thicknesses, shapes, and the like of various parts may be schematically illustrated in the drawings as compared with actual aspects thereof. However, they are merely examples, and interpretation of the invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

1. First Embodiment

FIG. 1 is a block diagram illustrating a configuration of a display apparatus with a touch detection function according to a first embodiment.

This display apparatus with a touch detection function 1 according to the first embodiment includes a touch detector SE1, a display device DP, a force detector SE2, and a controller CTRL. In the present embodiment, the force detector SE2 and the controller CTRL in the display apparatus with a touch detection function 1 correspond to a "force detection device".

The touch detector SE1 detects contact or proximity of a detection target object OBJ with or to an input surface IS of a cover member CG. Specifically, the touch detector SE1 outputs, to the controller CTRL, a signal value according to the contact or proximity of the detection target object OBJ with or to a region of the input surface IS where the detection target object OBJ overlaps in a direction orthogonal thereto.

The detection target object OBJ may be a first type object that is deformed when coming in contact with the input surface IS, or may be a second type object that is not deformed or is deformed by a relatively smaller amount than the first type object when coming in contact with the input surface IS. Examples of the first type object include, but are not limited to, a finger. Examples of the second type object include, but are not limited to, a stylus pen made of a resin or a metal.

The number of the detection target objects OBJ detectable by the touch detector SE1 is not limited to one. The touch detector SE1 may be configured to detect two or more such detection target objects OBJ.

Examples of the touch detector SE1 include, but are not limited to, a sensor using a capacitance method and a sensor using a resistive film method. Examples of the capacitance method include a mutual capacitance method and a self-capacitance method.

The display device DP displays an image toward the input surface IS. Examples of the display device DP include, but are not limited to, a liquid crystal display device and an organic electroluminescent (EL) display device.

The touch detector SE1 and the display device DP may be integrated together into an in-cell device or a hybrid device. The touch detector SE1 and the display device DP may alternatively make up an on-cell device obtained by mounting the touch detector SE1 on the display device DP.

The force detector SE2 detects a force applied to the input surface IS by the detection target object OBJ. Specifically, the force detector SE2 outputs to the controller CTRL a signal corresponding to the force applied to the input surface IS by the detection target object OBJ.

Examples of the force detector SE2 include a sensor using the capacitance method.

The controller CTRL calculates a force signal value representing the force based on the signal output from the force detector SE2.

The controller CTRL includes a display controller 11, a detection controller 200, and a host HST. The detection controller 200 includes a touch detection controller 40 and a force detection controller 50.

Examples of the display controller 11 include an integrated circuit (IC) chip mounted on a glass substrate of the display device DP. Examples of the detection controller 200 include an IC chip mounted on a printed circuit board (such as a flexible printed circuit board) coupled to the glass substrate of the display device DP. Examples of the host HST include a central processing unit (CPU). The display controller 11, the detection controller 200, and the host HST cooperate together to control the touch detector SE1, the display device DP, and the force detector SE2.

The processing performed by the controller CTRL to calculate the force signal value may be performed by the display controller 11, the detection controller 200, or the host HST, or alternatively, by cooperation of two or more of the display controller 11, the detection controller 200, and the host HST.

The following describes specific configuration examples of the touch detector SE1, the display device DP, and the force detector SE2. The configuration examples are merely examples, and do not limit the embodiments.

1-1. Configuration Example of Touch Detector and Display Device

Figure 2:
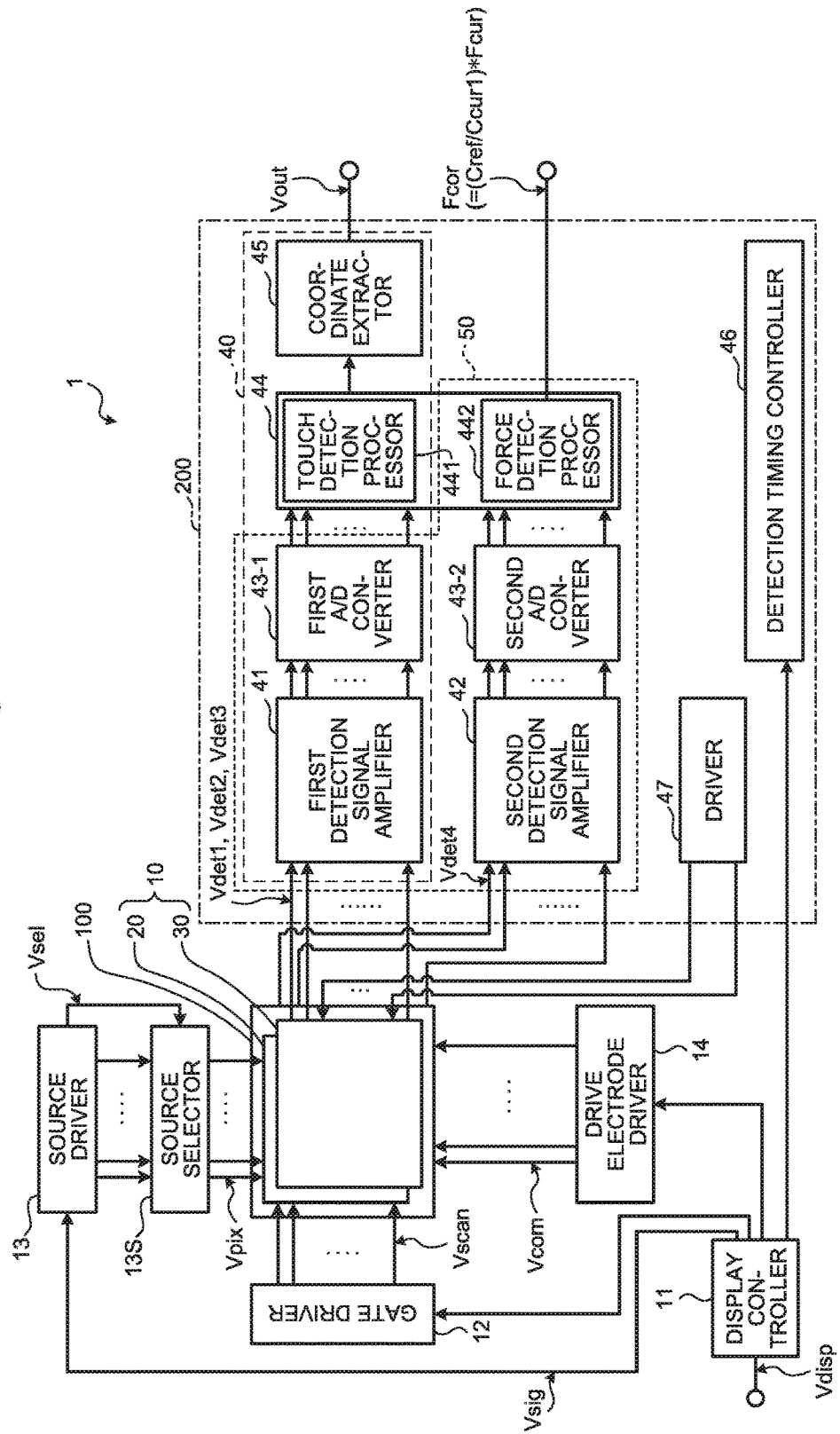
FIG. 2 is a block diagram illustrating a configuration example of a touch detector and a display device of the display apparatus with a touch detection function according to the first embodiment.

FIG. 2 is a block diagram illustrating a configuration example of the touch detector and the display device of the display apparatus with a touch detection function according to the first embodiment. The display apparatus with a touch detection function 1 illustrated in FIG. 2 is a device that uses the mutual capacitance method and the self-capacitance method to detect coordinates and a contact area of the detection target object OBJ. The display apparatus with a touch detection function 1 illustrated in FIG. 2 is also a device that uses the mutual capacitance method to detect a force applied to the input surface IS when the detection target object OBJ is in contact with the input surface IS.

The display apparatus with a touch detection function 1 includes a display device with a touch detection function 10, the display controller 11, a gate driver 12, a source driver 13, a source selector 13S, a drive electrode driver 14, a force detection device 100, and the detection controller 200.

The display device with a touch detection function 10 is an in-cell device or a hybrid device obtained by incorporating a capacitive touch detection device 30 into a liquid crystal display device 20 such that the liquid crystal display device 20 and the capacitive touch detection device 30 are integrated. The liquid crystal display device 20 uses liquid crystal display elements as display elements. The incorporating the capacitive touch detection device 30 into the liquid crystal display device 20 such that these devices are integrated includes, for example, using some members such as substrates and electrodes for both the liquid crystal display device 20 and the touch detection device 30.

The liquid crystal display device 20 corresponds to the display device DP of FIG. 1. The touch detection device 30 corresponds to the touch detector SE1 of FIG. 1. The force detection device 100 corresponds to the force detector SE2 of FIG. 1.

The display device with a touch detection function 10 may be an on-cell device obtained by mounting the capacitive touch detection device 30 on the liquid crystal display device 20 that uses the liquid crystal display elements as the display elements. In the case of the on-cell device, the touch detection device 30 may be provided directly on the liquid crystal display device 20, or may be provided not directly on, but above the liquid crystal display device 20 with an intervening layer interposed therebetween.

As will be described later, the liquid crystal display device 20 performs display by sequentially scanning one horizontal line at a time according to a scan signal Vscan supplied from the gate driver 12.

The display controller 11 is a circuit that supplies a control signal to each of the gate driver 12, the source driver 13, the drive electrode driver 14, and the detection controller 200 based on a video signal Vdisp supplied from the host HST so as to control them to operate in synchronization with one another. The display controller 11 generates, from the video signal Vdisp for one horizontal line, an image signal Vsig obtained by time-division multiplexing pixel signals Vpix of a plurality of sub-pixels SPix in the liquid crystal display device 20, and supplies the generated signal to the source driver 13.

The controller CTRL includes the display controller 11, the gate driver 12, the source driver 13, and the drive electrode driver 14. Although, in the present embodiment, the display controller 11 and the drive electrode driver 14 correspond to a "driver", the drive electrode driver 14 may correspond to the driver.

The gate driver 12 has a function to sequentially select one horizontal line to be driven for display performed by the display device with a touch detection function 10, based on the control signal supplied from the display controller 11.

The source driver 13 is a circuit that supplies the pixel signals Vpix to respective pixels Pix (sub-pixels SPix) of the display device with a touch detection function 10 based on the control signal supplied from the display controller 11. The source driver 13 is supplied with the 6-bit image signal Vsig of red (R), green (G), and blue (B), for example.

The source driver 13 receives the image signal Vsig from the display controller 11, and supplies it to the source selector 13S. The source driver 13 generates a switch control signal Vsel needed for separating the pixel signals Vpix multiplexed into the image signal Vsig, and supplies the switch control signal Vsel together with the pixel signals Vpix to the source selector 13S. The source selector 13S can reduce the number of wiring lines between the source driver 13 and the display controller 11. The source selector 13S may be omitted. The source driver 13 may be partially controlled by the display controller 11, or only the source selector 13S may be provided.

The drive electrode driver 14 is a circuit that supplies drive signals Vcom to drive electrodes COML described below of the display device with a touch detection function 10, based on the control signal supplied from the display controller 11. The drive signals Vcom include a drive signal for mutual capacitance touch detection (drive signal for touch detection, hereinafter, called a drive signal) Vcomtm, a drive signal for self-capacitance touch detection Vcomts2, and a display drive voltage VcomDC serving as a voltage for display.

The detection controller 200 includes a driver 47 for supplying a drive signal Vcomts1 to touch detection electrodes TDL described later when the touch detection controller 40 performs a touch detection operation using the self-capacitance method.

When the touch detection device 30 operates based on the basic principle of the mutual capacitance touch detection, the touch detection electrodes TDL output a detection signal Vdet1. When the touch detection device 30 operates based on the basic principle of the self-capacitance touch detection, the touch detection electrodes TDL output a detection signal Vdet2. When the touch detection device 30 operates based on the basic principle of the self-capacitance touch detection, the drive electrodes COML output a detection signal Vdet3.

The touch detection device 30 can perform the touch detection using the mutual capacitance method alone. However, in the present configuration example, to suitably reduce an influence of moisture beads or the like adhering to the input surface IS, and to suitably detect a stylus pen or the like, the touch detection device 30 performs both the mutual capacitance touch detection and the self-capacitance touch detection. The present invention is, however, not limited to the case of performing both the mutual capacitance touch detection and the self-capacitance touch detection.

The force detection device 100 operates based on the basic principle of mutual capacitance force detection, and electrodes SUS (to be described later) output a detection signal Vdet4.

Figure 3:
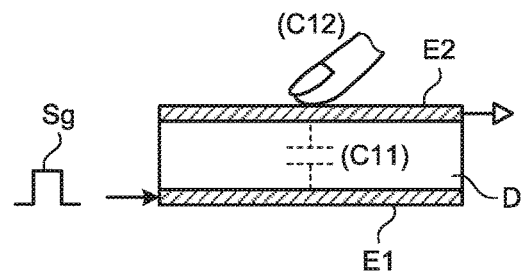
FIG. 3 is an explanatory diagram for explaining the basic principle of mutual capacitance touch detection, illustrating a state where a detection target object is in contact with or in proximity to a touch detection electrode.
Figure 4:
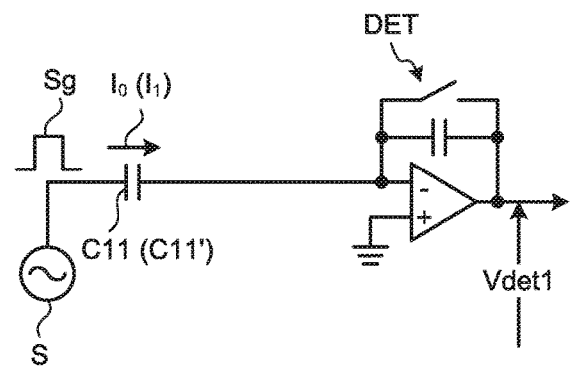
FIG. 4 is an explanatory diagram illustrating an exemplary equivalent circuit of the mutual capacitance touch detection.
Figure 5:
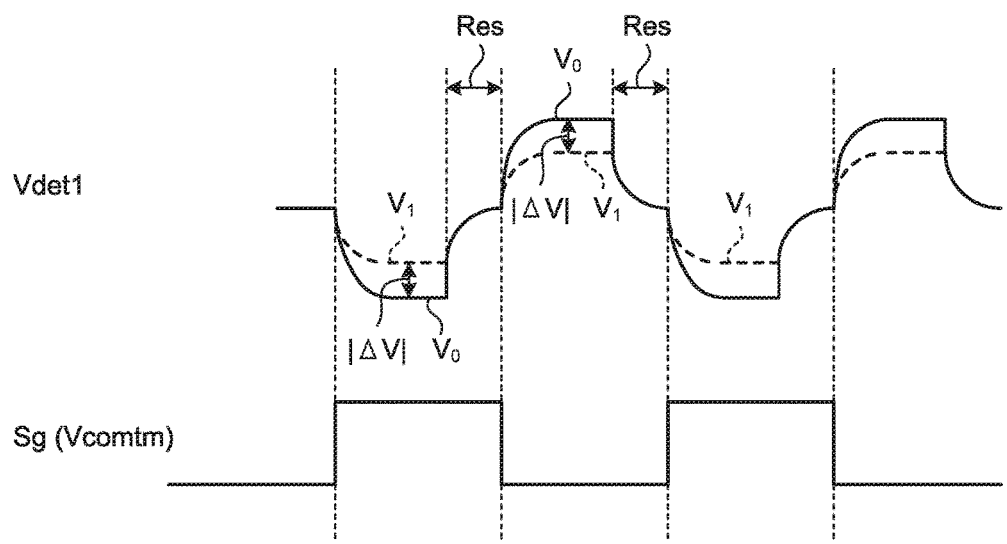
FIG. 5 is a diagram illustrating exemplary waveforms of a drive signal and a detection signal of the mutual capacitance touch detection.

The following describes the basic principle of the mutual capacitance touch detection performed by the display apparatus with a touch detection function 1 of the present configuration example, with reference to FIGS. 3 to 5.

FIG. 3 is an explanatory diagram for explaining the basic principle of the mutual capacitance touch detection, illustrating a state where the detection target object is in contact with or in proximity to a touch detection electrode. FIG. 4 is an explanatory diagram illustrating an exemplary equivalent circuit of the mutual capacitance touch detection. FIG. 5 is a diagram illustrating exemplary waveforms of the drive signal and the detection signal of the mutual capacitance touch detection. FIG. 4 also illustrates a detection circuit.

For example, as illustrated in FIG. 3, a capacitive element C11 includes a pair of electrodes, that is, a drive electrode E1 and a touch detection electrode E2 that are arranged opposite to each other across a dielectric material D. As illustrated in FIG. 4, the capacitive element C11 has one end coupled to an alternating-current signal source (drive signal source) S, and the other end coupled to a voltage detector (touch detector) DET. The voltage detector DET is, for example, an integrating circuit included in a first detection signal amplifier 41 illustrated in FIG. 2.

When an alternating-current (AC) rectangular wave Sg having a predetermined frequency (a frequency on the order of several kilohertz to several hundred kilohertz, for example) is applied from the alternating-current signal source S to the drive electrode E1 (one end of the capacitive element C11), an output waveform (of the detection signal Vdet1) appears through the voltage detector DET coupled to the touch detection electrode E2 side (the other end of the capacitive element C11). The AC rectangular wave Sg corresponds to the drive signal Vcomtm described later.

In the state (non-contact state) where the detection target object OBJ is not in contact with (or in proximity to) the touch detection electrode, a current $I_0$ according to the capacitance value of the capacitive element C11 flows with charge and discharge of the capacitive element C11. As illustrated in FIG. 5, the voltage detector DET converts variation in the current $I_0$ according to the AC rectangular wave Sg into variation in voltage (waveform $V_0$ of a solid line).

In the state (contact state) where the detection target object OBJ is in contact with (or in proximity to) the touch detection electrode, as illustrated in FIG. 3, electrostatic capacitance C12 generated by a finger is in contact with or in proximity to the touch detection electrode E2. This causes interruption of a fringe component of the electrostatic capacitance between the drive electrode E1 and the touch detection electrode E2, and thus causes the electrostatic capacitance to serve as a capacitive element C11' having a smaller capacitance value than that of the capacitive element C11. In the equivalent circuit illustrated in FIG. 4, a current $I_1$ flows in the capacitive element C11'.

As illustrated in FIG. 5, the voltage detector DET converts variation in the current $I_1$ according to the AC rectangular wave Sg into variation in voltage (waveform $V_1$ of a dotted line). In this case, the waveform $V_1$ has a smaller amplitude than that of the above-mentioned waveform $V_0$. As a result, an absolute value $|\Delta V|$ of a voltage difference between the waveforms $V_0$ and $V_1$ changes according to the influence of the detection target object OBJ. To accurately detect the absolute value $|\Delta V|$ of the voltage difference between the waveforms $V_0$ and $V_1$, the voltage detector DET more preferably performs an operation including a period Res during which the charge or discharge of the capacitor is reset by switching in the circuit in accordance with the frequency of the AC rectangular wave Sg.

Referring again to FIG. 2, the touch detection device 30 sequentially scans each of the drive electrodes COML according to the drive signal Vcomtm supplied from the drive electrode driver 14, and outputs the detection signal Vdet1.

The following describes the basic principle of the self-capacitance touch detection performed by the display apparatus with a touch detection function 1 of the present configuration example, with reference to FIGS. 6 to 9.

Figure 6:
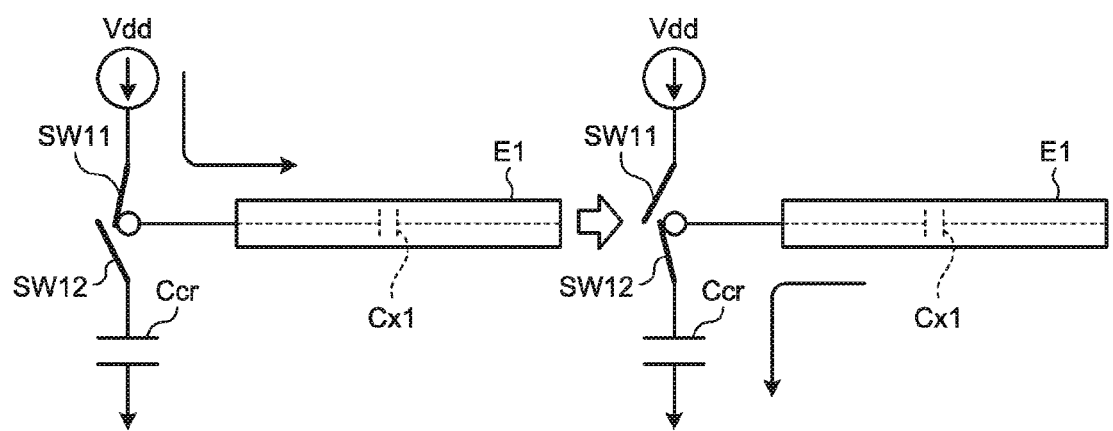
FIG. 6 is an explanatory diagram for explaining the basic principle of self-capacitance touch detection, illustrating a state where the detection target object is neither in contact with nor in proximity to a detection electrode.
Figure 7:
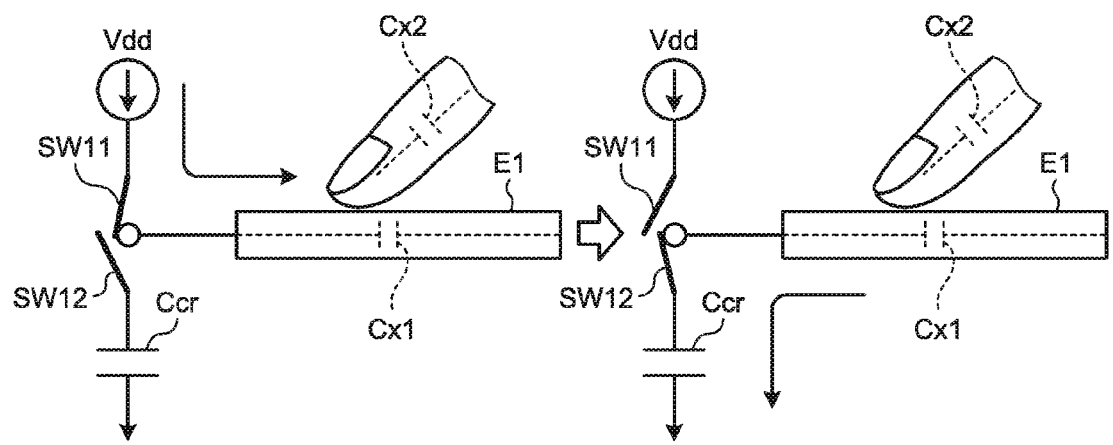
FIG. 7 is an explanatory diagram for explaining the basic principle of the self-capacitance touch detection, illustrating a state where the detection target object is in contact with or in proximity to the detection electrode.
Figure 8:
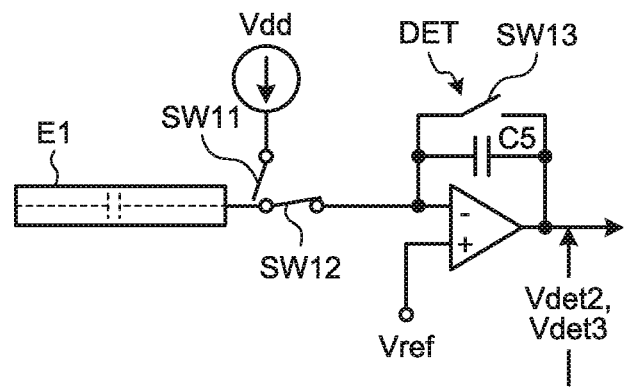
FIG. 8 is an explanatory diagram illustrating an exemplary equivalent circuit of the self-capacitance touch detection.
Figure 9:
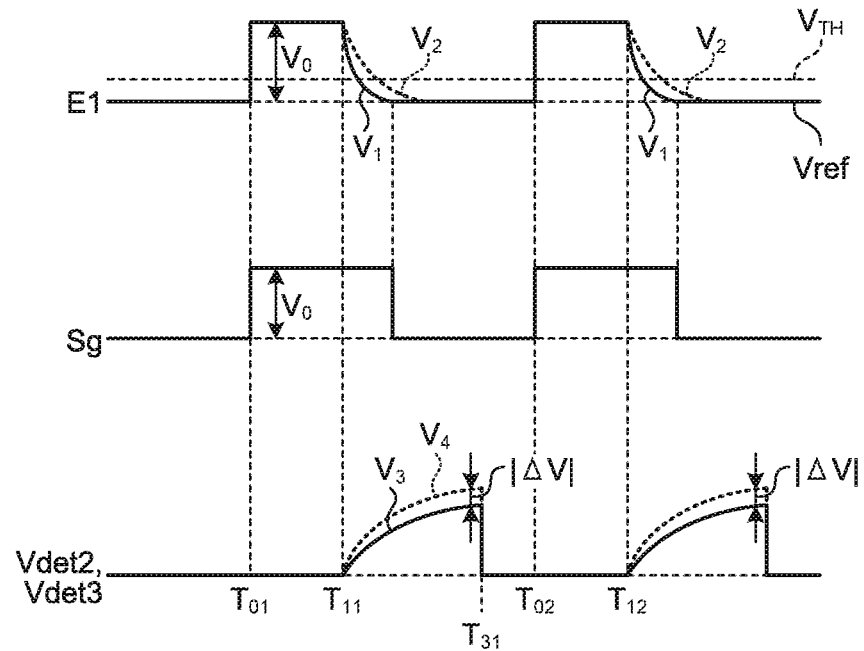
FIG. 9 is a diagram illustrating exemplary waveforms of the drive signal and the detection signal of the self-capacitance touch detection.

FIG. 6 is an explanatory diagram for explaining the basic principle of the self-capacitance touch detection, illustrating a state where the detection target object is neither in contact with nor in proximity to a detection electrode. FIG. 7 is an explanatory diagram for explaining the basic principle of the self-capacitance touch detection, illustrating a state where the detection target object is in contact with or in proximity to the detection electrode. FIG. 8 is an explanatory diagram illustrating an exemplary equivalent circuit of the self-capacitance touch detection. FIG. 9 is a diagram illustrating exemplary waveforms of the drive signal and the detection signal of the self-capacitance touch detection.

The left diagram of FIG. 6 illustrates a state where a power source Vdd is coupled to a detection electrode E1 through a switch SW11, and the detection electrode E1 is not coupled to a capacitor Ccr through a switch SW12, in a state where the detection target object OBJ is neither in contact with nor in proximity to the detection electrode. In this state, the detection electrode E1 is charged to a capacitance Cx1. The right diagram of FIG. 6 illustrates a state where the power source Vdd is decoupled from the detection electrode E1 through the switch SW11, and the detection electrode E1 is coupled to the capacitor Ccr through the switch SW12. In this state, the electric charge of the capacitance Cx1 is discharged through the capacitor Ccr.

The left diagram of FIG. 7 illustrates a state where the power source Vdd is coupled to the detection electrode E1 through the switch SW11, and the detection electrode E1 is not coupled to the capacitor Ccr through the switch SW12, in a state where the detection target object OBJ is in contact with or in proximity to the detection electrode. In this state, capacitance Cx2 generated by the detection target object OBJ in proximity to the detection electrode E1, in addition to the capacitance Cx1 included in the detection electrode E1, is charged. The right diagram of FIG. 7 illustrates a state where the power source Vdd is decoupled from the detection electrode E1 through the switch SW11, and the detection electrode E1 is coupled to the capacitor Ccr through the switch SW12. In this state, the electric charge of the capacitance Cx1 and the electric charge of the capacitance Cx2 are discharged through the capacitor Ccr.

The voltage change characteristic of the capacitor Ccr during the discharge illustrated in the right diagram of FIG. 6 (in the state where the detection target object OBJ is neither in contact with nor in proximity to the detection electrode) clearly differs from the voltage change characteristic of the capacitor Ccr during the discharge illustrated in the right diagram of FIG. 7 (in the state where the detection target object OBJ is in contact with or in proximity to the detection electrode), because the capacitance Cx2 is present. Accordingly, in the self-capacitance method, whether or not the detection target object OBJ is in contact with or in proximity to the detection electrode is determined using the fact that the voltage change characteristic of the capacitor Ccr varies depending on whether the capacitance Cx2 is present.

Specifically, the AC rectangular wave Sg (refer to FIG. 9) having the predetermined frequency (frequency on the order of several kilohertz to several hundred kilohertz) is applied to the detection electrode E1. The voltage detector DET illustrated in FIG. 8 converts variation in the current corresponding to the AC rectangular wave Sg into variation in voltage (waveform $V_3$ or $V_4$). The voltage detector DET is, for example, the integrating circuit included in the first detection signal amplifier 41 illustrated in FIG. 2.

As described above, the detection electrode E1 is configured to be decoupled from other elements by the switch SW11 and the switch SW12. In FIG. 9, the AC rectangular wave Sg increases to a voltage level corresponding to a voltage $V_0$, at time $T_{01}$. At this time, the switch SW11 is on, and the switch SW12 is off. Hence, the voltage of the detection electrode E1 also increases to the voltage $V_0$.

Then, the switch SW11 is turned off before time $T_{11}$. At this time, while the detection electrode E1 is in an electrically floating condition, the potential of the detection electrode E1 is maintained at $V_0$ by the capacitance Cx1 of the detection electrode E1 (refer to FIG. 6), or by capacitance (Cx1+Cx2, refer to FIG. 7) obtained by adding the capacitance Cx2 generated by the contact or proximity of the detection target object OBJ to the capacitance Cx1 of the detection electrode E1. In addition, a switch SW13 is tuned on before time $T_{11}$, and turned off after a lapse of a predetermined time to reset the voltage detector DET. With this reset operation, an output voltage (detection signal) Vdet from the voltage detector DET becomes substantially equal to a reference voltage Vref.

Subsequently, when the switch SW12 is turned on at time $T_{11}$, the voltage at an inversion input side of the voltage detector DET becomes the voltage $V_0$ of the detection electrode E1. Then, the voltage at a negative input terminal of the voltage detector DET drops to the reference voltage Vref according to the time constants of the capacitance Cx1 (or Cx1+Cx2) of the detection electrode E1 and capacitance C5 in the voltage detector DET. At this time, the electric charge of the capacitance Cx1 (or Cx1+Cx2) of the detection electrode E1 moves to the capacitance C5 in the voltage detector DET, and consequently, the output voltages (detection signals) Vdet2 and Vdet3 of the voltage detector DET increase.

When the detection target object OBJ is neither in contact with nor in proximity to the detection electrode E1, the output voltage Vdet2 of the voltage detector DET is represented by the waveform $V_3$ indicated by a solid line, and is given as Vdet2=Cx1×$V_0$/C5. In the same way, when the detection target object OBJ is neither in contact with nor in proximity to the detection electrode E1, the output voltage Vdet3 of the voltage detector DET is represented by the waveform $V_3$ indicated by the solid line, and is given as Vdet3=Cx1×$V_0$/C5.

When capacitance is added by the influence of the detection target object OBJ, the output voltage Vdet2 of the voltage detector DET is represented by the waveform $V_4$ indicated by a dotted line, and is given as Vdet2=(Cx1+Cx2)×$V_0$/C5. In the same way, when the capacitance is added by the influence of the detection target object OBJ, the output voltage Vdet3 of the voltage detector DET is represented by the waveform $V_4$ indicated by the dotted line, and is given as Vdet3=(Cx1+Cx2)×$V_0$/C5.

Then, at time $T_{31}$ after the electric charge of the capacitance Cx1 (or Cx1+Cx2) of the detection electrode E1 has sufficiently moved to the capacitance C5, the switch SW12 is turned off, and the switches SW11 and SW13 are turned on. Due to this, the potential of the detection electrode E1 becomes a low level, which is equal to that of the AC rectangular wave Sg, and the voltage detector DET is reset. In this operation, the switch SW11 can be turned on at any time before time $T_{02}$ after the switch SW12 is turned off. The voltage detector DET can be reset at any time before time $T_{12}$ after the switch SW12 is turned off.

The operation described above is repeated at the predetermined frequency (a frequency on the order of several kilohertz to several hundred kilohertz). Whether the detection target object OBJ is present (whether the touch is made) is determined based on the absolute value |ΔV| of a difference between the waveforms $V_3$ and $V_4$. As illustrated in FIG. 9, the potential of the detection electrode E1 is represented by the waveform $V_1$ when the detection target object OBJ is neither in contact with nor in proximity to detection electrode E1. The potential of the detection electrode E1 is represented by the waveform $V_2$ when the capacitance Cx2 is added by the influence of the detection target object OBJ. Whether an external proximate object is present (whether the touch is made) can be determined by measuring time until voltages of the respective waveforms $V_1$ and $V_2$ drop to a predetermined threshold voltage $V_{TH}$.

In the present configuration example, in the touch detection device 30, each of the touch detection electrodes TDL is supplied with an electric charge according to the drive signal Vcomts1 supplied from the driver 47 illustrated in FIG. 2 such that the touch detection is performed using the self-capacitance method, and the touch detection electrodes TDL output the touch detection signal Vdet2. Also, in the touch detection device 30, each of the drive electrodes COML is supplied with an electric charge according to the drive signal Vcomts2 supplied from the drive electrode driver 14 illustrated in FIG. 2 such that the touch detection is performed using the self-capacitance method, and the drive electrodes COML output the touch detection signal Vdet3.

Referring again to FIG. 2, the detection controller 200 is a circuit that detects existence or non-existence of a touch (the contact state described above) to the input surface IS based on the control signal supplied from the display controller 11 and the touch detection signals Vdet1, Vdet2, and Vdet3 supplied from the touch detection device 30 of the display device with a touch detection function 10, that detects a force applied to the input surface IS based on the force detection signal Vdet4 supplied from the force detection device 100, and that obtains the coordinates and the contact area of the touch in the touch detection area if there is a touch.

The detection controller 200 includes the first detection signal amplifier 41, a second detection signal amplifier 42, a first analog-to-digital (A/D) converter 43-1, a second A/D converter 43-2, a signal processor 44, a coordinate extractor 45, and a detection timing controller 46. The signal processor 44 includes a touch detection processor 441 and a force detection processor 442. The first detection signal amplifier 41, the first A/D converter 43-1, the coordinate extractor 45, and the touch detection processor 441 make up the touch detection controller 40. The first detection signal amplifier 41, the second detection signal amplifier 42, the first A/D converter 43-1, the second A/D converter 43-2, and the force detection processor 442 make up the force detection controller 50.

The touch detection controller 40 is a component for detecting the position where the detection target object OBJ is in contact with or in proximity to the input surface IS.

The force detection controller 50 is a component for detecting a force applied to the input surface IS by the detection target object OBJ.

In the mutual capacitance touch detection, the touch detection device 30 outputs the touch detection signals Vdet1 from the touch detection electrodes TDL (to be described later) through the voltage detector DET illustrated in FIG. 4, and supplies the touch detection signals Vdet1 to the first detection signal amplifier 41 of the detection controller 200.

In the self-capacitance touch detection, the touch detection device 30 outputs and supplies the touch detection signal Vdet2 from the touch detection electrodes TDL (to be described later) to the first detection signal amplifier 41 of the detection controller 200 through the voltage detector DET illustrated in FIG. 8. In the self-capacitance touch detection, the touch detection device 30 outputs and supplies the touch detection signal Vdet3 from the drive electrode COML (to be described later) to the first detection signal amplifier 41 of the detection controller 200 through the voltage detector DET illustrated in FIG. 8.

In the mutual capacitance force detection, the force detection device 100 outputs and supplies the force detection signal Vdet4 from the electrodes SUS (to be described later) to the second detection signal amplifier 42 of the detection controller 200.

The first detection signal amplifier 41 amplifies the touch detection signals Vdet1, Vdet2, and Vdet3 supplied from the touch detection device 30. The touch detection signals Vdet1, Vdet2, and Vdet3 amplified by the first detection signal amplifier 41 are supplied to the first A/D converter 43-1. The first detection signal amplifier 41 may include a low-pass analog filter that removes high-frequency components (noise components) included in the touch detection signals Vdet1, Vdet2, and Vdet3 to extract and output touch detection components. The detection controller 200 need not include the first detection signal amplifier 41. In other words, the touch detection signals Vdet1, Vdet2, and Vdet3 from the touch detection device 30 may be supplied to the first A/D converter 43-1.

The second detection signal amplifier 42 amplifies the force detection signal Vdet4 supplied from the force detection device 100. The force detection signal Vdet4 amplified by the second detection signal amplifier 42 is supplied to the second A/D converter 43-2. The second detection signal amplifier 42 may include a low-pass analog filter that removes high-frequency components (noise components) included in the force detection signal Vdet4 to extract and output a force detection component. The detection controller 200 need not include the second detection signal amplifier 42. In other words, the force detection signal Vdet4 from the force detection device 100 may be supplied to the second A/D converter 43-2.

The first A/D converter 43-1 is a circuit that samples analog signals output from the first detection signal amplifier 41 at intervals synchronized with the drive signals Vcomtm, Vcomts1, and Vcomts2, and converts the sampled analog signals into digital signals.

The second A/D converter 43-2 is a circuit that samples analog signals output from the second detection signal amplifier 42 at intervals synchronized with the drive signal Vcomtm, and converts the sampled analog signals into digital signals.

The signal processor 44 includes a digital filter that reduces frequency components (noise components) included in the output signals from the first A/D converter 43-1 and the second A/D converter 43-2 other than those at the frequency at which the drive signals Vcomtm, Vcomts1, and Vcomts2 have been sampled.

The signal processor 44 is a logic circuit that performs the touch detection processing of detecting a touch with the input surface IS based on the output signals of the first A/D converter 43-1, and performs the force detection processing of detecting a force applied to the input surface IS.

The signal processor 44 performs processing of extracting only a signal of difference generated by the finger. This signal of difference generated by the finger corresponds to the absolute value $|\Delta V|$ of the difference between the waveform $V_0$ and the waveform $V_1$ described above.

The signal processor 44 may perform a calculation of averaging the absolute values $|\Delta V|$ of differences between the waveform $V_0$ and the waveform $V_1$ to obtain the average value of the absolute values $|\Delta V|$. This calculation allows the signal processor 44 to reduce the influence of the noise.

The signal processor 44 compares the detected signal of difference generated by the finger with the predetermined threshold voltage $V_{TH}$. If the detected signal of difference is equal to or higher than the threshold voltage $V_{TH}$, the signal processor 44 determines that the state is the non-contact state of the external proximate object.

The signal processor 44 compares the detected signal of difference generated by the finger with the predetermined threshold voltage $V_{TH}$. If the detected signal of difference is lower than the threshold voltage $V_{TH}$, the signal processor 44 determines that the state is the contact state of the external proximate object. In this manner, the touch detection controller 40 of the detection controller 200 can perform the touch detection.

The display apparatus with a touch detection function 1 according to the first embodiment simultaneously performs the mutual capacitance touch detection and the mutual capacitance force detection. That is, the signal processor 44 performs the force detection processing (to be described later) at the same time as performing the mutual capacitance touch detection described above.

The coordinate extractor 45 is a logic circuit that obtains the coordinates of the touch detection position on the input surface IS when the signal processor 44 has detected the touch to the input surface IS and detected a force applied to the input surface IS. The detection timing controller 46 controls the first A/D converter 43-1, the second A/D converter 43-2, the signal processor 44, and the coordinate extractor 45 so as to operate them in synchronization with one another. The coordinate extractor 45 outputs the coordinates of the touch detection position as a touch detection position Vout.

Figure 10:
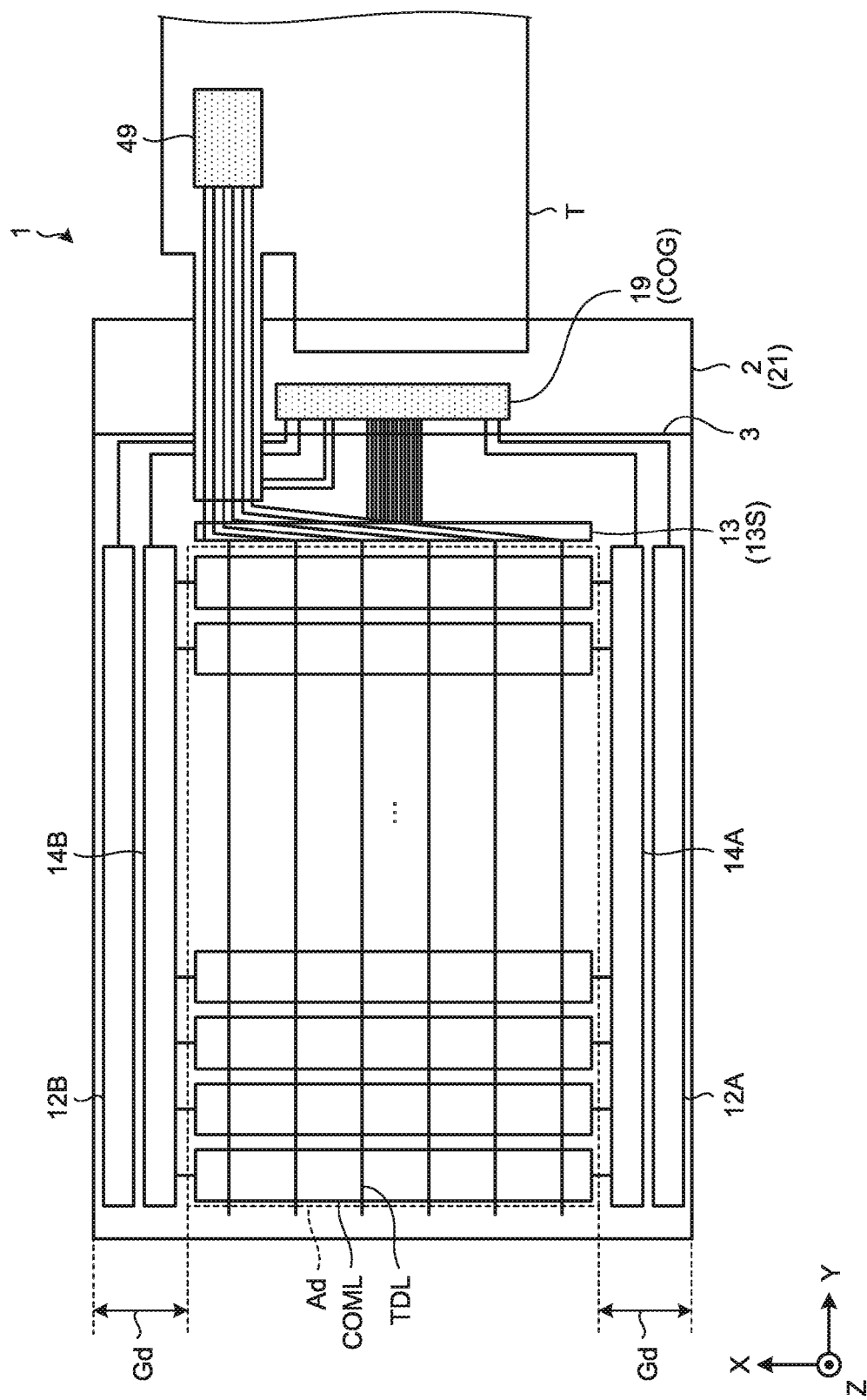
FIG. 10 is a diagram illustrating an exemplary module on which the display apparatus with a touch detection function according to the first embodiment is mounted.

FIG. 10 is a diagram illustrating an exemplary module on which the display apparatus with a touch detection function according to the first embodiment is mounted. The display apparatus with a touch detection function 1 includes a second substrate (such as a pixel substrate 2) and a printed circuit board (such as a flexible printed circuit board) T.

The pixel substrate 2 includes a second substrate 21. The second substrate 21 is, for example, a glass substrate or a film substrate. A driver IC chip (such as a chip on glass (COG) 19) is mounted on the second substrate 21. A display area Ad and a frame Gd of the liquid crystal display device 20 are arranged on the pixel substrate 2 (second substrate 21).

The COG 19 is an IC chip serving as a driver mounted on the second substrate 21, and is a control device including circuits required for display operations, such as the display controller 11 illustrated in FIG. 2.

In the present configuration example, the source driver 13 and/or the source selector 13S are arranged on the second substrate 21. The source driver 13 and the source selector 13S may be built into the COG 19.

Drive electrode scanners 14A and 14B serving as parts of the drive electrode driver 14 are arranged on the second substrate 21.

The gate driver 12 is provided as gate drivers 12A and 12B on the second substrate 21.

The COG 19 of the display apparatus with a touch detection function 1 may include circuits, such as the drive electrode scanners 14A and 14B and the gate driver 12. The COG 19 is merely one form of the mounted driver, which is not limited to this form. For example, a configuration having the same function as that of the COG 19 may be mounted as a chip on film, or chip on flexible (COF) on the flexible printed circuit board T.

As illustrated in FIG. 10, the drive electrodes COML and the touch detection electrodes TDL are arranged so as to intersect with each other at different levels in a direction orthogonal to a surface of the second substrate 21.

The drive electrodes COML are divided into a plurality of stripe-like electrode patterns extending in one direction. When the mutual capacitance touch detection operation is performed, the drive electrode driver 14 sequentially supplies the drive signal Vcomtm to each of the electrode patterns. When the self-capacitance touch detection operation is performed, the drive electrode driver 14 sequentially supplies the drive signal Vcomts2 to each of the electrode patterns.

In the example illustrated in FIG. 10, the drive electrodes COML are arranged in a direction parallel to short sides of the display device with a touch detection function 10, whereas the touch detection electrodes TDL (to be described later) are arranged in a direction intersecting with the extending direction of the drive electrodes COML, such as in a direction parallel to long sides of the display device with a touch detection function 10. The drive electrodes COML may be arranged in the direction parallel to the long sides of the display device with a touch detection function 10. The touch detection electrodes TDL may be arranged in a direction intersecting with the extending direction of the drive electrodes COML, such as in the direction parallel to the short sides of the display device with a touch detection function 10. Although FIG. 10 assumes the sides parallel to the X-axis direction as the short sides and the sides parallel to the Y-axis direction as the long sides, the sides parallel to the X-axis direction may be the long sides, and the sides parallel to the Y-axis direction may be the short sides.

The touch detection electrodes TDL are coupled to a touch IC 49 that is mounted on the flexible printed circuit board T coupled to a short side of the display device with a touch detection function 10. The touch IC 49 is an IC chip serving as a driver mounted on the flexible printed circuit board T. The touch IC 49 is a control device including circuits, such as the detection controller 200 illustrated in FIG. 2, required for the touch detection operation and the force detection operation. In this manner, the touch IC 49 is mounted on the flexible printed circuit board T, and is coupled to each of the touch detection electrodes TDL arranged in parallel. The flexible printed circuit board T only needs to be a terminal, and is not limited to being a board. In this case, the touch IC 49 is provided outside the module. The touch IC 49 is not limited to the case of being disposed on the flexible printed circuit board T, but may be disposed on the second substrate 21 or a first substrate 31.

In the present configuration example, the touch IC 49 is a control device serving as the detection controller 200. However, some of the functions of the detection controller 200, that is, some of the functions of the touch detection controller 40 or the force detection controller 50 may be provided as functions of another microprocessor unit (MPU).

Specifically, among various functions such as the A/D conversion and the noise removal that can be provided as functions of the IC chip serving as the touch driver, some functions (such as the noise removal) may be performed by a circuit, such as the MPU, provided separately from the IC chip serving as the touch driver. If the IC chip serving as the driver is configured as one chip (as a single-chip configuration), the detection signals may be transmitted, for example, to the IC chip serving as the touch driver on an array substrate through wiring of, for example, the flexible printed circuit board T.

The source selector 13S is made up of thin-film transistor (TFT) elements near the display area Ad on the second substrate 21. A large number of the pixels Pix (to be described later) are arranged in a matrix (in a row-column configuration) in the display area Ad. The frame Gd is an area in which the pixels Pix are not arranged when the surface of the second substrate 21 is viewed from a direction orthogonal thereto. The gate driver 12 and the drive electrode scanners 14A and 14B of the drive electrode driver 14 are arranged in the frame Gd.

The gate driver 12 includes, for example, the gate drivers 12A and 12B, and is made up of TFT elements on the second substrate 21. The gate drivers 12A and 12B are arranged on opposite sides of the display region Ad where the sub-pixels SPix (pixels) described below are arranged in a matrix (row-column configuration), and configured to drive the pixels from both sides. Scanning lines are arranged between the gate drivers 12A and 12B. As a result, the scanning lines extend in a direction parallel to the extending direction of the drive electrodes COML, in the direction orthogonal to the surface of the second substrate 21.

In the present configuration example, the two circuits, that is, the gate drivers 12A and 12B are provided as the gate driver 12. However, this is an example of a specific configuration of the gate driver 12, and the configuration thereof is not limited to this example. For example, the gate driver 12 may be one circuit provided on only one end side of each of the scanning lines.

The drive electrode driver 14 includes, for example, the drive electrode scanners 14A and 14B, and includes TFT elements on the second substrate 21. The drive electrode scanners 14A and 14B are supplied with the display drive voltage VcomDC and the drive signals Vcomtm and Vcomts2 from the COG 19. The drive electrode scanners 14A and 14B can drive each of the drive electrodes COML arranged in parallel from both sides thereof.

In the present configuration example, the two circuits, that is, the drive electrode scanners 14A and 14B are provided as the drive electrode driver 14. However, this is an example of a specific configuration of the drive electrode driver 14, and the configuration thereof is not limited to this example. For example, the drive electrode driver 14 may be one circuit provided on only one end side of each of the drive electrodes COML.

The display apparatus with a touch detection function 1 outputs the touch detection signals Vdet1, Vdet2, and Vdet3 from the short side of the display device with a touch detection function 10. This facilitates routing of wiring in the display apparatus with a touch detection function 1 when the display device with a touch detection function 10 is coupled to the detection controller 200 through the flexible printed circuit board T serving as a terminal.

Figure 11:
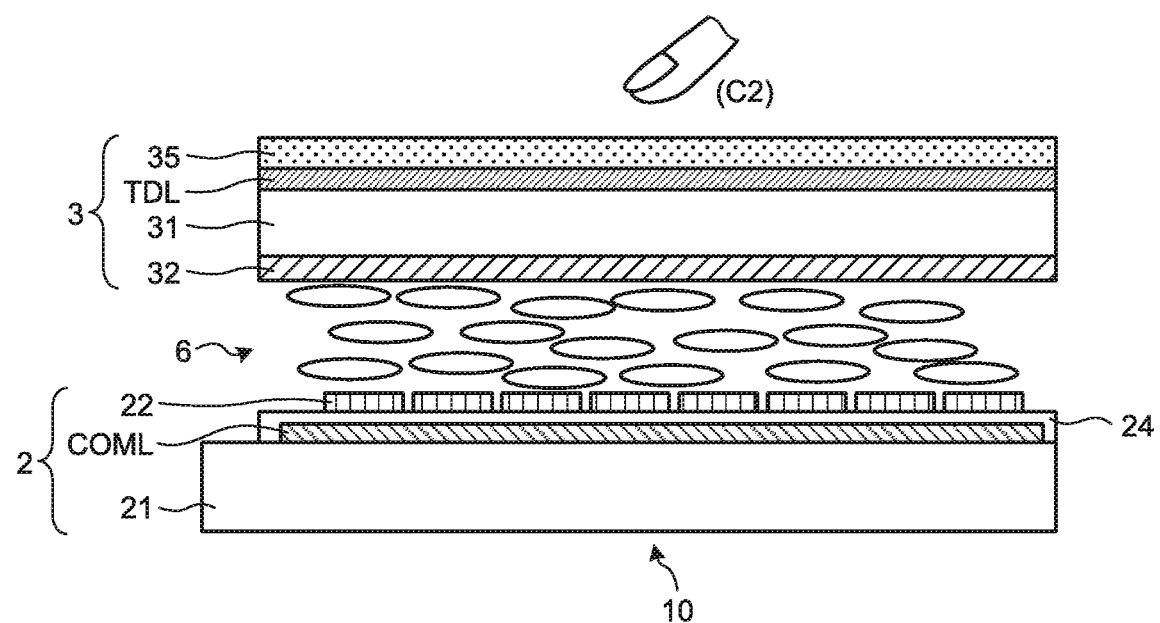
FIG. 11 is a sectional view illustrating a schematic structure of a display device with a touch detection function.
Figure 12:
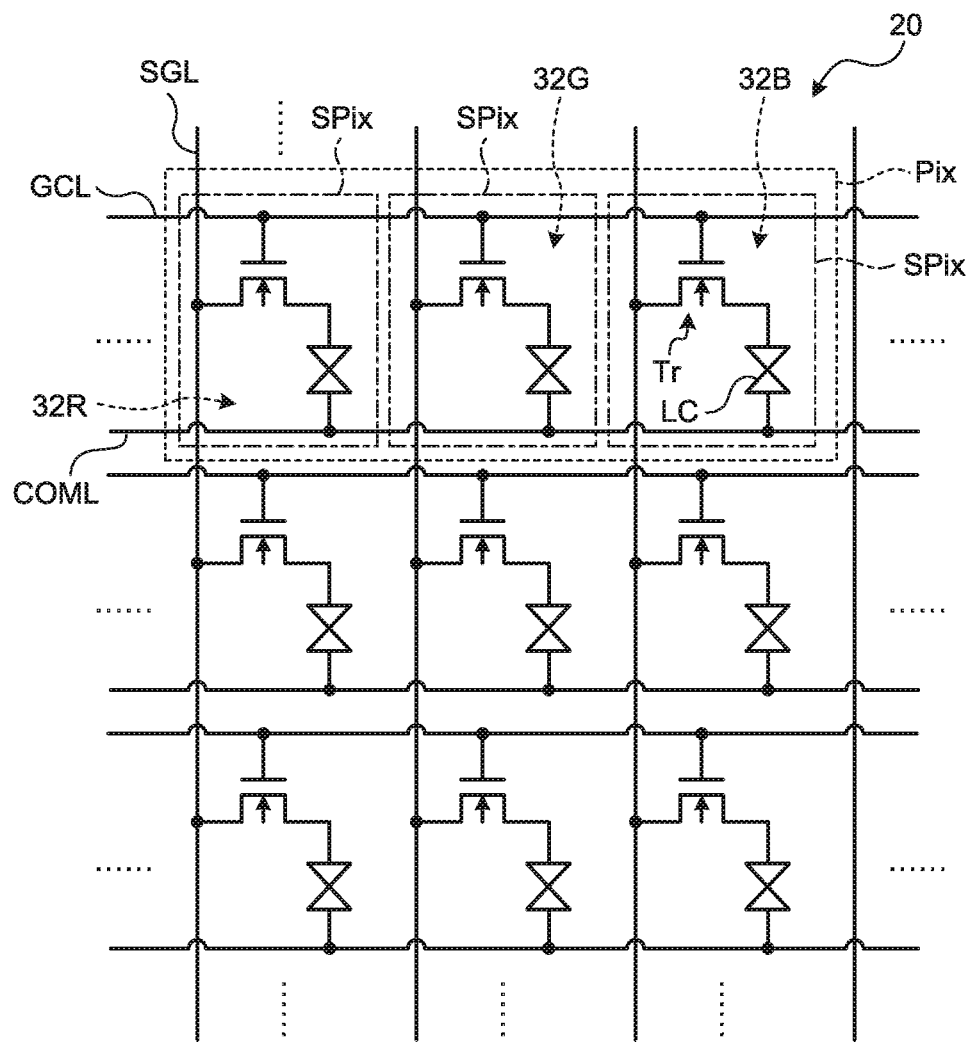
FIG. 12 is a circuit diagram illustrating a pixel arrangement of the display device with a touch detection function.

FIG. 11 is a sectional view illustrating a schematic structure of the display device with a touch detection function. FIG. 12 is a circuit diagram illustrating a pixel arrangement of the display device with a touch detection function. The display device with a touch detection function 10 includes the pixel substrate 2, a first substrate (such as a counter substrate 3), and a display functional layer (such as a liquid crystal layer 6). The counter substrate 3 is disposed so as to face a surface of the pixel substrate 2 in a direction orthogonal thereto. The liquid crystal layer 6 is arranged between the pixel substrate 2 and the counter substrate 3.

The pixel substrate 2 includes the second substrate 21 serving as a circuit substrate, a plurality of pixel electrodes 22, the drive electrodes COML, and an insulating layer 24. The pixel electrodes 22 are arranged in a matrix having a row-column configuration on the second substrate 21. The drive electrodes COML are arranged between the second substrate 21 and the pixel electrodes 22. The insulating layer 24 insulates the pixel electrodes 22 from the drive electrodes COML.

As illustrated in FIG. 12, thin-film transistor (TFT) elements Tr of the sub-pixels SPix, and wiring such as pixel signal lines SGL and scan signal lines GCL are arranged on the second substrate 21. The signal lines SGL supply the pixel signals Vpix to the respective pixel electrodes 22, and the scan signal lines GCL drive the corresponding TFT elements Tr. The pixel signal lines SGL extend in a plane parallel to the surface of the second substrate 21, and supply the pixel signals Vpix for displaying an image to the sub-pixels SPix. The sub-pixel SPix corresponds to a configuration unit controlled by the pixel signal Vpix. The sub-pixel SPix also is a region surrounded by the pixel signal lines SGL and the scan signal lines GCL, and corresponds to a configuration unit that is controlled by the TFT elements Tr.

As illustrated in FIG. 12, the liquid crystal display device 20 includes the sub-pixels SPix arranged in a matrix having a row-column configuration. Each of the sub-pixels SPix includes a TFT element Tr and a liquid crystal element LC. The TFT element Tr is fabricated from a thin-film transistor material. The TFT element Tr in this example is fabricated from an n-channel metal oxide semiconductor (MOS) TFT material.

One of the source and the drain of the TFT element Tr is coupled to a corresponding one of the pixel signal lines SGL; the gate is coupled to a corresponding one of the scan signal lines GCL; and the other of the source and the drain is coupled to one end of the liquid crystal element LC. The liquid crystal element LC has one end coupled to the drain of the TFT element Tr, and the other end coupled to a corresponding one of the drive electrodes COML. In FIG. 11, the pixel electrodes 22, the insulating layer 24, and the drive electrodes COML are layered in this order on the second substrate 21. The embodiment is, however, not limited to this example. The drive electrodes COML, the insulating layer 24, and the pixel electrodes 22 may be layered in this order on the second substrate 21, or the drive electrodes COML and the pixel electrodes 22 may be arranged in the same layer with the insulating layer 24 interposed therebetween.

The sub-pixel SPix is mutually coupled with other sub-pixels SPix belonging to the same row of the liquid crystal display device 20 through the scan signal line GCL. The scan signal line GCL is coupled to the gate driver 12, and is supplied with the scan signal Vscan from the gate driver 12.

The sub-pixel SPix is mutually coupled with other sub-pixels SPix belonging to the same column of the liquid crystal display device 20 through the pixel signal line SGL. The pixel signal line SGL is coupled to the source driver 13, and is supplied with the pixel signal Vpix from the source driver 13.

Moreover, the sub-pixel SPix is mutually coupled with other sub-pixels SPix belonging to the same row of the liquid crystal display device 20 through the drive electrode COML. The drive electrode COML is coupled to the drive electrode driver 14, and is supplied with the drive signal Vcom from the drive electrode driver 14. In other words, in this example, the sub-pixels SPix belonging to the same row share one of the drive electrodes COML.

The drive electrodes COML of the present configuration example extend parallel to the extending direction of the scan signal lines GCL. The extending direction of the drive electrodes COML is not limited to this direction and may be a direction parallel to the extending direction of the pixel signal lines SGL. The extending direction of the touch detection electrodes TDL is not limited to the extending direction of the pixel signal lines SGL and may be a direction parallel to the extending direction of the scan signal lines GCL.

The gate driver 12 illustrated in FIG. 2 applies the scan signal Vscan to the gates of the TFT elements Tr of the pixels Pix through the scan signal line GCL illustrated in FIG. 12 so as to sequentially select one row (one horizontal line) as a target of display driving, of the sub-pixels SPix that are arranged in a matrix having a row-column configuration on the liquid crystal display device 20.

The source driver 13 illustrated in FIG. 2 supplies the pixel signals Vpix to the respective sub-pixels SPix included in the horizontal line sequentially selected by the gate driver 12 through the pixel signal lines SGL illustrated in FIG. 12. The sub-pixels SPix are configured to display the one horizontal line according to the pixel signals Vpix thus supplied.

The drive electrode driver 14 illustrated in FIG. 2 applies the drive signals Vcom to the drive electrodes COML to drive the drive electrodes COML on a block-by-block basis, each block including a predetermined number of drive electrodes COML.

As described above, in the liquid crystal display device 20, the gate driver 12 drives the scan signal lines GCL so as to sequentially scan each of the scan signal lines GCL in a time-division manner, and thereby sequentially selects one horizontal line. The source driver 13 supplies the pixel signals Vpix to the sub-pixels SPix belonging to the one horizontal line, and thus, the liquid crystal display device 20 performs display on a horizontal-line-by-horizontal-line basis. In this display operation, the drive electrode driver 14 is configured to apply the drive signals Vcom to the block including the drive electrodes COML corresponding to the one horizontal line.

The liquid crystal layer 6 modulates light passing therethrough according to the state of an electric field. When the drive electrode COML is driven, a voltage corresponding to the pixel signal Vpix supplied to the pixel electrode 22 is applied to the liquid crystal layer 6 and generates the electric field. As a result, the liquid crystal of the liquid crystal layer 6 is oriented according to the electric field, and modulates the light passing through the liquid crystal layer 6.

In this manner, the pixel electrode 22 and the drive electrode COML serve as a pair of electrodes generating the electric field in the liquid crystal layer 6. That is, the liquid crystal display device 20 serves as the display device DP in which the display image is changed according to electric charges applied to the pair of electrodes. One pixel electrode 22 is arranged in at least every pixel Pix or sub-pixel SPix. One drive electrode COML is arranged in at least every plurality of pixels Pix or sub-pixels SPix.

In the present configuration example, a liquid crystal display device using, for example, liquid crystals of the horizontal electric field mode, such as an in-plane switching (IPS) mode including a fringe field switching (FFS) mode, is used as the liquid crystal display device 20. Orientation films may be provided between the liquid crystal layer 6 and the pixel substrate 2, and between the liquid crystal layer 6 and the counter substrate 3, which are illustrated in FIG. 11.

The liquid crystal display device 20 has a configuration corresponding to the horizontal electric field mode, but may have a configuration corresponding to another display mode. For example, the liquid crystal display device 20 may have a configuration corresponding to a mode using a vertical electric field mainly generated between substrate major surfaces, such as a twisted nematic (TN) mode, an optically compensated bend (OCB) mode, or a vertical aligned (VA) mode. In a display mode using the vertical electric field, for example, a configuration in which the pixel electrodes 22 is provided on the pixel substrate 2 and the drive electrodes COML is provided on the counter substrate 3 is applicable.

The counter substrate 3 includes the first substrate 31 and a color filter 32 arranged on one surface of the first substrate 31. The other surface of the first substrate 31 is provided with the touch detection electrodes TDL serving as detection electrodes of the touch detection device 30. Furthermore, a polarizing plate 35 is provided on the touch detection electrodes TDL.

The method for mounting the color filter 32 may be a color filter on array (COA) method of providing the color filter 32 on the pixel substrate 2 serving as an array substrate.

In the color filter 32 illustrated in FIG. 11, for example, color regions of the color filter colored in three colors of red (R), green (G), and blue (B) are cyclically arranged. Color regions 32R, 32G, and 32B of the three colors R, G and B are associated with the respective sub-pixels SPix, and one set of the color regions 32R, 32G, and 32B corresponds to one pixel Pix.

The pixels Pix are arranged in a matrix having a row-column configuration along a direction parallel to the scan signal lines GCL and a direction parallel to the pixel signal lines SGL, and form the display area Ad described later. The color filter 32 faces the liquid crystal layer 6 in the direction orthogonal to the second substrate 21. Thus, each sub-pixel SPix can display a single color.

The color filter 32 may have a combination of other colors as long as being colored in different colors. The color filter 32 may be omitted. Thus, regions may be present for which the color filter 32 is not provided; in other words, non-colored sub-pixels SPix may be present. The pixel Pix may include four or more sub-pixels SPix.

Figure 13:
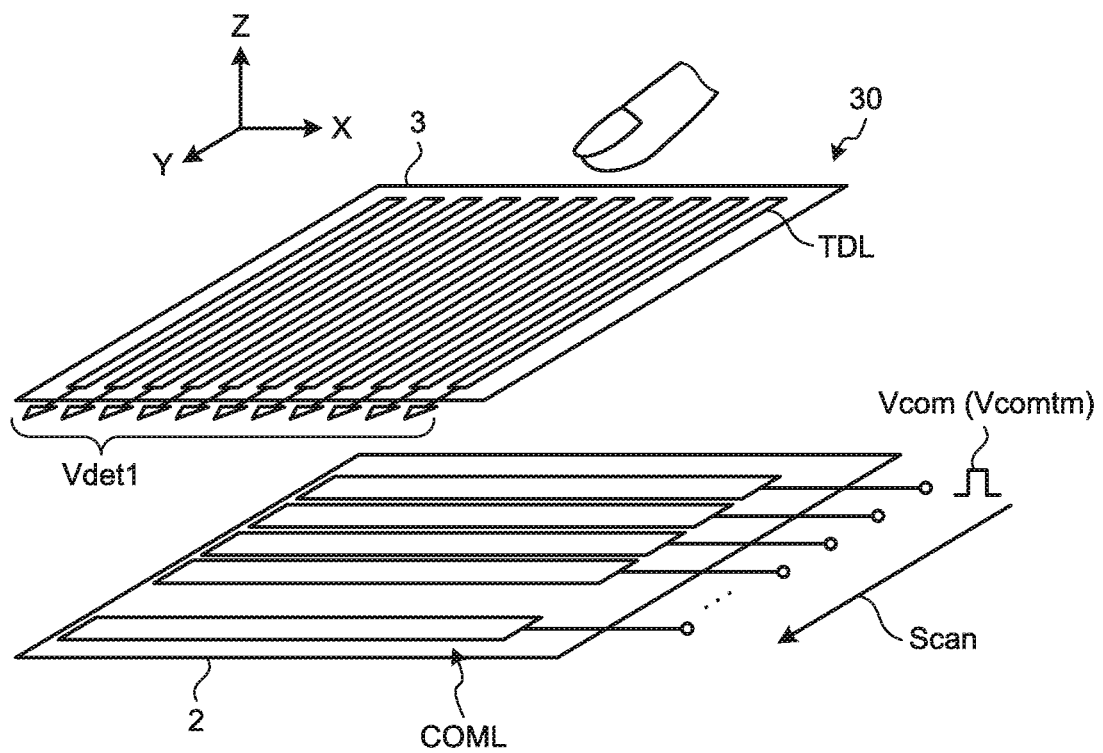
FIG. 13 is a perspective view illustrating a configuration example of drive electrodes and touch detection electrodes of the display device with a touch detection function.

FIG. 13 is a perspective view illustrating a configuration example of the drive electrodes and the touch detection electrodes of the display device with a touch detection function. The drive electrodes COML according to the present configuration example serve as both drive electrodes of the liquid crystal display device 20 and drive electrodes of the touch detection device 30.

The drive electrodes COML face the pixel electrodes 22 in the direction orthogonal to the surface of the second substrate 21. The touch detection device 30 includes the drive electrodes COML provided on the pixel substrate 2 and the touch detection electrodes TDL provided on the counter substrate 3.

The touch detection electrodes TDL are provided in stripe-like electrode patterns extending in the direction intersecting with the extending direction of the electrode patterns of the drive electrodes COML. The touch detection electrodes TDL face the drive electrodes COML in the direction orthogonal to the surface of the second substrate 21. Each of the electrode patterns of the touch detection electrodes TDL is coupled to an input side of the first detection signal amplifier 41 of the detection controller 200.

The electrode patterns of the drive electrodes COML and the touch detection electrodes TDL intersecting with each other generate electrostatic capacitance at intersecting portions therebetween. In the touch detection device 30, the drive electrode driver 14 is configured to apply the drive signal Vcomtm to the drive electrodes COML so as to output the touch detection signal Vdet1 from the touch detection electrodes TDL to perform the touch detection.

In other words, the drive electrode COML corresponds to the drive electrode E1, and the touch detection electrode TDL corresponds to the touch detection electrode E2, in the basic principle of the mutual capacitance touch detection illustrated in FIGS. 3 to 5. The touch detection device 30 is configured to detect the touch according to this basic principle.

In this manner, the touch detection device 30 includes the touch detection electrodes TDL that generate the mutual capacitance in conjunction with either the pixel electrodes 22 or the drive electrodes COML (for example, the mutual capacitance in conjunction with the drive electrodes COML), and performs the touch detection based on change in the mutual capacitance.

The electrode patterns of the drive electrodes COML and the touch detection electrodes TDL intersecting with each other make up mutual capacitance touch sensors in a matrix (row-column) arrangement. As a result, by scanning the entire input surface IS of the touch detection device 30, the touch detection controller 40 can detect the position and the contact area of a place where the detection target object OBJ is in contact with or in proximity to the input surface IS.

In other words, when the touch detection device 30 performs the touch detection operation, the drive electrode driver 14 drives the drive electrodes COML so as to sequentially scan the drive electrodes COML illustrated in FIG. 10 in a time-division manner. This operation sequentially selects the drive electrodes COML in a scan direction Scan. The touch detection device 30 outputs the touch detection signal Vdet1 from the touch detection electrodes TDL. In this manner, the touch detection device 30 is configured to perform the touch detection in units of drive electrodes COML.

While any relation can be established between the detection block and the number of lines in the display output, a touch detection region corresponding to two lines in the display area Ad serves as one detection block in the present embodiment. In other words, while any relation can be established between the detection block and any facing ones of the pixel electrodes, the scan signal lines, and the pixel signal lines, two pixel electrodes or two scan signal lines face one of the drive electrodes COML in the present embodiment.

The shape of the touch detection electrodes TDL or the drive electrodes COML is not limited to a shape with which the touch detection electrodes TDL or the drive electrodes COML are divided into the plurality of stripe patterns. The touch detection electrodes TDL or the drive electrodes COML may have, for example, a comb-tooth shape. Alternatively, each of the touch detection electrodes TDL or the drive electrodes COML may have any shape that just enables the touch detection electrodes TDL or the drive electrodes COML to be divided into a plurality of patterns, and the shape of the slit that divides the drive electrodes COML may be a straight line or a curved line.

As an example of the operation method of the display apparatus with a touch detection function 1, the display apparatus with a touch detection function 1 performs the touch detection operation (in a touch detection period) and the display operation (in a display operation period) in a time-division manner. The touch detection operation and the display operation can be performed in any division manner.

1-2. Configuration Example of Force Detector

Figure 14:
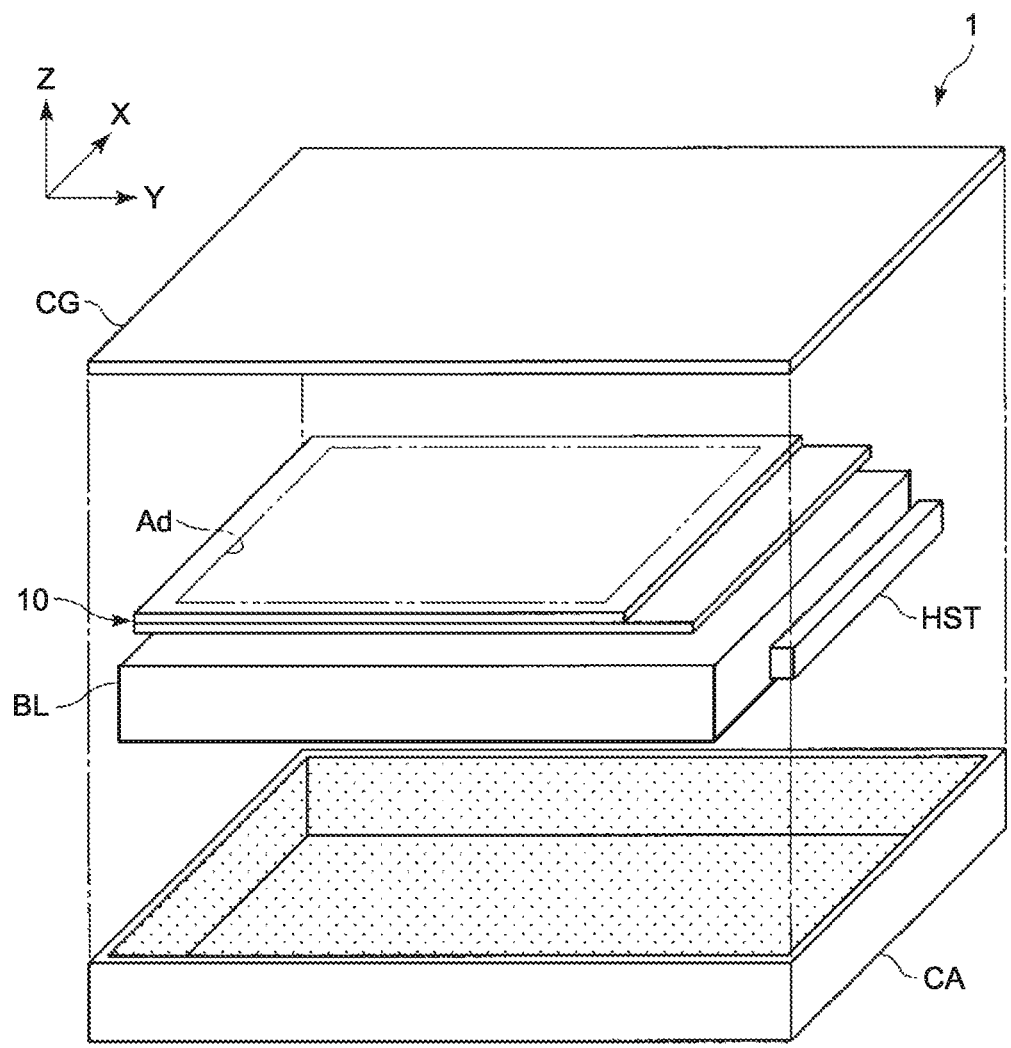
FIG. 14 is an exploded perspective view illustrating a configuration example of the display apparatus with a touch detection function according to the first embodiment.

FIG. 14 is an exploded perspective view illustrating a configuration example of the display apparatus with a touch detection function according to the first embodiment. As illustrated in FIG. 14, the display apparatus with a touch detection function 1 includes the display device with a touch detection function 10, an illumination device (such as a backlight device BL), the host HST, casing CA, and a cover member CG. The illumination device illuminates the input surface IS of the display device with a touch detection function 10 from the back surface thereof. The host HST controls the display device with a touch detection function 10 and the backlight device BL.

The display device with a touch detection function 10 has a plane parallel to the X-Y plane defined by the X-direction serving as a first direction and the Y-direction serving as a second direction, the X- and Y-directions intersecting with each other at a right angle. In the present configuration example, the X-direction serving as the first direction and the Y-direction serving as the second direction intersect with each other at a right angle, but may intersect with each other at an angle other than 90 degrees. The Z-direction serving as a third direction intersects with each of the X-direction serving as the first direction and the Y-direction serving as the second direction at a right angle. The Z-direction serving as the third direction corresponds to the thickness direction of the display device with a touch detection function 10.

The casing CA has a box shape having an opening in an upper portion thereof, and accommodates the display device with a touch detection function 10, the backlight device BL, and the host HST. The casing CA may be made of an electrical conductor, such as a metal. Alternatively, the casing CA may be made of a resin, and a surface layer of the casing CA is made of a conductor such as metal.

The cover member CG closes the opening of the casing CA, and covers the display device with a touch detection function 10, the backlight device BL, and the host HST.

In the X-Y plane view, the dimensions of the cover member CG are larger than the dimensions of the second substrate 21 and the dimensions of the first substrate 31. Examples of the cover member CG include a light-transmitting substrate, such as a glass substrate and a resin substrate. When the cover member CG is a glass substrate, the cover member CG is called a cover glass in some cases.

In the Z-direction serving as the third direction, the display device with a touch detection function 10 and the backlight device BL are located between the bottom surface of the casing CA and the cover member CG, and the backlight device BL is located between the casing CA and display device with a touch detection function 10. The backlight device BL can be disposed with a distance from the display device with a touch detection function 10. The backlight device BL can be disposed with a distance from the casing CA.

A force detection area in which the force detector SE2 detects a force may be the same as the display area Ad.

Figure 15:
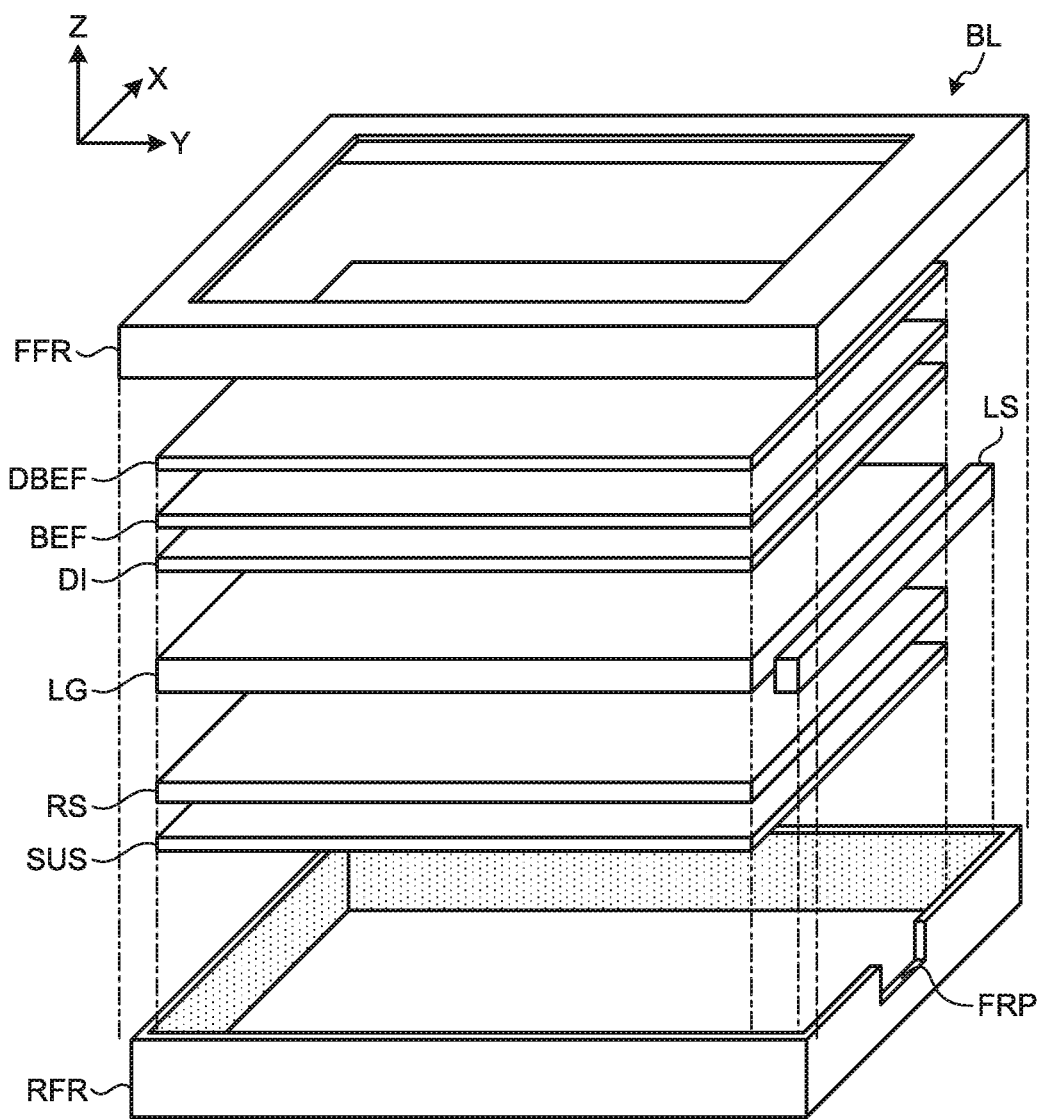
FIG. 15 is an exploded perspective view illustrating a backlight device.

FIG. 15 is an exploded perspective view illustrating the backlight device. The backlight device BL includes a reflective polarizing film DBEF, a brightness enhancement film BEF, a light diffusing sheet DI, a light guide LG, a light reflector RS, and the electrodes SUS arranged in this order in the Z-direction from the side of the display device with a touch detection function 10 toward the side of the casing CA. A light source LS is disposed facing one side of the light guide LG. The backlight device BL has a shape and a size corresponding to those of the display device with a touch detection function 10.

The electrodes SUS are included in the force detection device 100 illustrated in FIG. 2, and correspond to the force detector SE2 illustrated in FIG. 1.

In the present configuration example, the light guide LG is formed into a flat rectangular shape. The light source LS emits light to the light guide LG. In the present configuration example, the light source LS uses light-emitting-diodes (LEDs).

The light reflector RS reflects light transmitted from the light guide LG in a direction opposite to the display device with a touch detection function 10, and transmits the reflected light toward the display device with a touch detection function 10. The light reflector RS can increase the brightness level of a displayed image by reducing loss of the light. In the present configuration example, the light reflector RS is formed into a rectangular sheet-like shape. The light reflector RS has substantially the same area in the X-Y plane as that of the light guide LG. The light reflector RS may have, for example, a multilayer film structure using a polyester-based resin.

The light diffusing sheet DI diffuses light entering from the light guide LG side, and emits the diffused light toward the display device with a touch detection function 10. That is, the light transmitted through the light diffusing sheet DI is diffused, and hence, the light diffusing sheet DI can reduce brightness unevenness of light emitted from the backlight device BL in the X-Y plane. In the present configuration example, the light diffusing sheet DI is formed into a rectangular sheet-like shape. The light diffusing sheet DI has substantially the same area in the X-Y plane as that of the light guide LG.

The brightness enhancement film BEF has an effect of increasing the brightness level of the light emitted from the backlight device BL. In the present configuration example, the brightness enhancement film BEF is formed into a rectangular film-like shape. The brightness enhancement film BEF has substantially the same area in the X-Y plane as that of the light guide LG.

The reflective polarizing film DBEF has an effect of increasing the use efficiency of the light emitted from the backlight device BL. In the present configuration example, the reflective polarizing film DBEF is formed into a rectangular film-like shape. The reflective polarizing film DBEF has substantially the same area in the X-Y plane as that of the light guide LG.

A front frame FFR and a rear frame RFR are used for modularizing the backlight device BL. The reflective polarizing film DBEF, the brightness enhancement film BEF, the light diffusing sheet DI, the light guide LG, the light reflector RS, the electrodes SUS, and the light source LS are accommodated in the rear frame RFR. This configuration fixes relative positions between the reflective polarizing film DBEF, the brightness enhancement film BEF, the light diffusing sheet DI, the light guide LG, the light reflector RS, and the electrodes SUS, and the relative position between the light guide LG and the light source LS.

In the present configuration example, each of the front frame FFR and the rear frame RFR is formed into a rectangular frame-like shape. The front frame FFR has an opening in an upper portion thereof so as not to interrupt the illumination of the display device with a touch detection function 10. The rear frame RFR totally surrounds the assembly of the light guide LG and the light source LS in the X-Y plane. The rear frame RFR has a path FRP formed therein, through which the flexible printed circuit board T coupled to the light source LS passes. A certain clearance in the Z-direction is provided between the front frame FFR and the reflective polarizing film DBEF. The front frame FFR and the rear frame RFR may be made of an electrically conductive material, such as a metal.

The shape of each of the front frame FFR and the rear frame RFR in the X-Y plane can be variously changed, and only needs to be a shape that does not interrupt the illumination of the display device with a touch detection function 10. Examples of the shape of each of the front frame FFR and the rear frame RFR in the X-Y plane include an L-shape facing two adjacent sides of the light guide LG, a H-shape facing three adjacent sides of the light guide LG, and an II-shape facing two opposite sides of the light guide LG.

While FIG. 15 exemplifies the backlight device BL, various forms are applicable as the backlight device BL. For example, the backlight device BL may be made up excluding one or more of the reflective polarizing film DBEF, the brightness enhancement film BEF, the light diffusing sheet DI, and the light reflector RS, or may be made up including additional optical elements not illustrated in FIG. 15. The backlight device BL only needs to be configured to emit light to the display device with a touch detection function 10.

Figure 16:
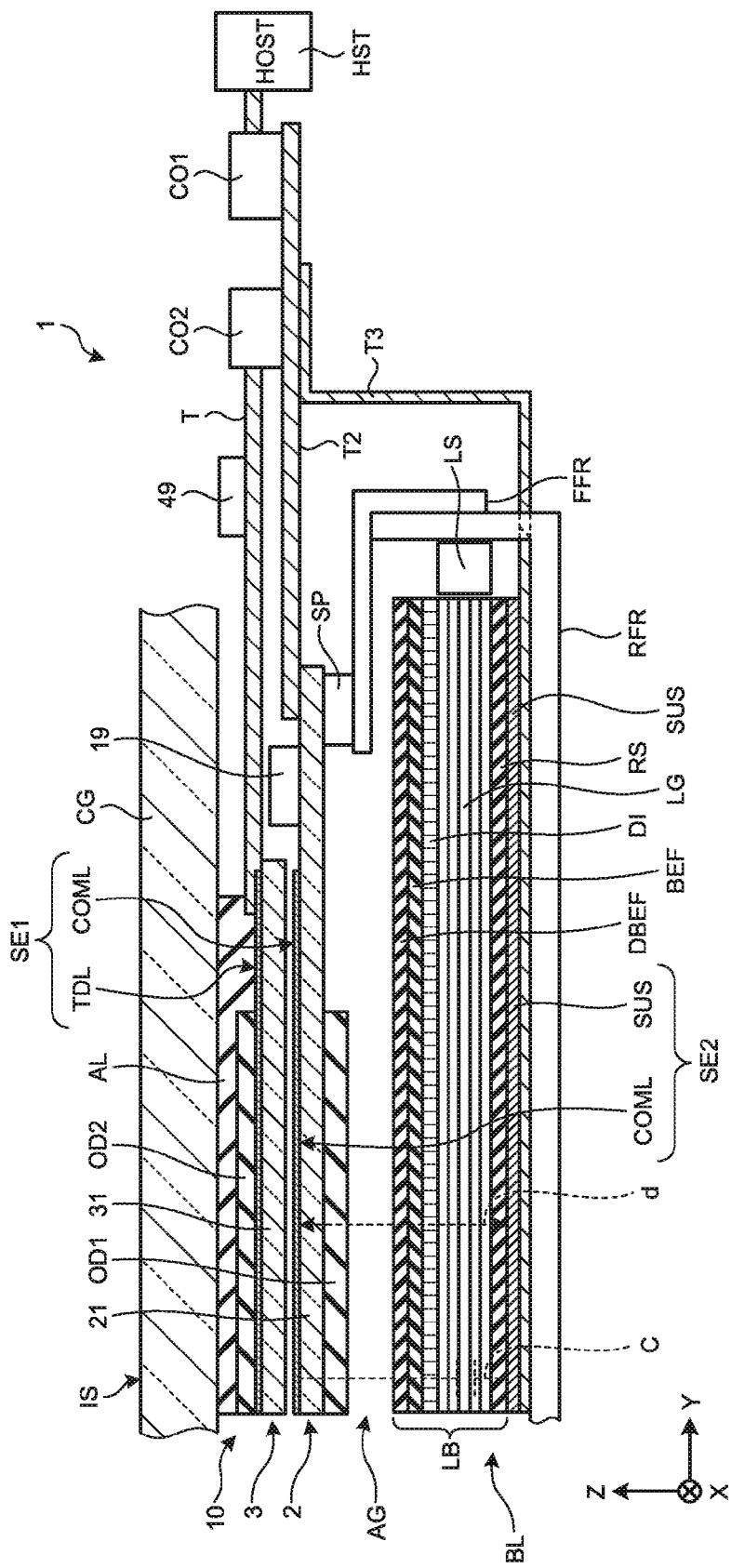
FIG. 16 is a sectional view illustrating a configuration example of the display apparatus with a touch detection function according to the first embodiment.

FIG. 16 is a sectional view illustrating a configuration example of the display apparatus with a touch detection function according to the first embodiment. As illustrated in FIG. 16, the display apparatus with a touch detection function 1 includes the display device with a touch detection function 10, the COG 19, the cover member CG, a first optical device OD1, a second optical device OD2, the touch IC 49, the backlight device BL, and first, second, and third printed circuit boards (such as flexible printed circuit boards T, T2, and T3).

The COG 19 is mounted on the pixel substrate 2 of the display device with a touch detection function 10. The flexible printed circuit board T2 is coupled to the pixel substrate 2. A connector CO1 and a connector CO2 are mounted on the flexible printed circuit board T2. The flexible printed circuit board T2 is coupled to the host HST through the connector CO1.

The flexible printed circuit board T provides coupling between the touch detection electrodes TDL and the connector CO2. The COG 19 is coupled to the touch IC 49 through the flexible printed circuit board T2, the connector CO2, and the flexible printed circuit board T. As an example of arrangement of the touch IC 49, the touch IC 49 can be mounted on one of the flexible printed circuit boards T, T2, and T3 and the counter substrate 3, or can be divided into two or more parts and mounted on any two or more of these boards.

The flexible printed circuit board T3 couples the electrodes SUS to the flexible printed circuit board T2. The host HST is coupled to the electrodes SUS through the connector CO1 and the flexible printed circuit board T3. The electrodes SUS may be coupled to the touch IC 49 through the flexible printed circuit board T3, the flexible printed circuit board T2, and the flexible printed circuit board T.

The method for coupling together the host HST, the display device with a touch detection function 10, the touch detection electrodes TDL, the light source LS, and the electrodes SUS can be variously modified.

For example, a single flexible printed circuit board may be used instead of the three independent flexible printed circuit boards T, T2, and T3 and the connectors CO1 and CO2 described above. In this case, the single flexible printed circuit board can be coupled to the host HST; a first branch part of the single flexible printed circuit board can be coupled to the display device with a touch detection function 10; a second branch part of the single flexible printed circuit board can be coupled to the touch detection electrodes TDL; and a third branch part of the single flexible printed circuit board can be coupled to the light source LS. The coupling between the flexible printed circuit boards or between each of the flexible printed circuit boards and the host HST or the substrate may be achieved through a connector, such as the connector CO1 or the connector CO2, or may be achieved using, for example, solder instead of the connector.

The host HST, the COG 19, and the touch IC 49 serve as the controller CTRL for controlling the touch detector SE1 that is made up of the drive electrodes COML and the touch detection electrodes TDL of the display device with a touch detection function 10.

The host HST, the COG 19, and the touch IC 49 serve as the controller CTRL for controlling the force detector SE2 that is made up of the drive electrodes COML and the electrodes SUS of the display device with a touch detection function 10.

The host HST may be an application processor. The touch IC 49 can provide a timing signal indicating a driving time of each of the touch detector SE1 and the force detector SE2 to the COG 19. Alternatively, the COG 19 can provide a timing signal indicating a driving time of each of the drive electrodes COML to the touch IC 49. Still alternatively, the host HST can provide a timing signal to each of the COG 19 and the touch IC 49. Such a timing signal can synchronize the driving of the COG 19 and the driving of the touch IC 49 with each other.

The cover member CG is located outside the display device with a touch detection function 10, and faces the counter substrate 3. In the present configuration example, the input surface IS of the display apparatus with a touch detection function 1 is a surface of the cover member CG. The display apparatus with a touch detection function 1 can detect the position and the contact area of the detection target object OBJ when the detection target object OBJ is in contact with the input surface IS.

When the detection target object OBJ applies a force to the input surface IS, the force detector SE2 of the display apparatus with a touch detection function 1 can output a signal corresponding to the force to the controller CTRL. The signal corresponding to the force is a signal that corresponds to a force applied by the detection target object OBJ to press the input surface IS downward, and changes with the level of the force.

A spacer SP is provided between the display device with a touch detection function 10 and the front frame FFR of the backlight device BL, and an air layer (air gap) AG is formed between the display device with a touch detection function 10 and the reflective polarizing film DBEF. The spacer SP is a nonconductor made of polyurethane, for example.

When a force is applied to the input surface IS, the spacer SP is elastically deformed according to the force, and thus, the force applied to the input surface IS can be detected.

The first optical device OD1 is disposed between the pixel substrate 2 and the backlight device BL. The first optical device OD1 is stuck to the pixel substrate 2.

The second optical device OD2 is disposed between the display device with a touch detection function 10 and the cover member CG. For example, the second optical device OD2 may be stuck to the first substrate 31 and the touch detection electrodes TDL.

Each of the first and second optical devices OD1 and OD2 includes at least a polarizing plate, and may include a waveplate as needed. The absorption axis of the polarizing plate included in the first optical device OD1 intersects with the absorption axis of the polarizing plate included in the second optical device OD2. For example, the absorption axis of the polarizing plate included in the first optical device OD1 and the absorption axis of the polarizing plate included in the second optical device OD2 intersect with each other at a right angle.

The cover member CG is stuck to the second optical device OD2 with an adhesive layer AL. The adhesive layer AL is made of, for example, an optically clear resin (OCR). Since the display device with a touch detection function 10 detects a force, the adhesive layer AL may be elastically deformed, and only needs to be capable of transmitting the force, which is applied from the cover member CG, to the second optical device OD2.

The touch detection electrodes TDL are disposed between the drive electrodes COML and the cover member CG. In the present configuration example, the touch detection electrodes TDL are provided on the upper side of a surface of the first substrate 31, the surface facing the second optical device OD2. The touch detection electrodes TDL may be in contact with the first substrate 31, or may be separated from the first substrate 31. If the touch detection electrodes TDL are separated from the first substrate 31, a member, such as an insulating film (not illustrated), is interposed between the first substrate 31 and the touch detection electrodes TDL. The touch detection electrodes TDL extend in the Y-direction serving as the second direction.

The drive electrodes COML and the touch detection electrodes TDL make up the touch detector SE1 using the mutual capacitance method and the self-capacitance method. The drive electrodes COML serve as both display electrodes and sensor driving electrodes. The touch detector SE1 is used to detect the position and the contact area of the detection target object OBJ.

In the present configuration example, the electrode SUS is made of an electrical conductor (such as aluminum). The touch IC 49 and the electrode SUS is electrically coupled together, and the force detection signal Vdet4 from the electrode SUS is output to the touch IC 49.

The electrodes SUS are disposed with a distance from the display device with a touch detection function 10. In the present configuration example, the air layer AG is provided between the display device with a touch detection function 10 and the electrodes SUS. That is, the air layer AG is provided between the electrodes SUS and the drive electrodes COML. The presence of the air layer AG makes the distances between the electrodes SUS and the drive electrodes COML changeable with the level of the force applied to the input surface IS. Removing the force having been applied to the input surface IS causes the distances between the electrodes SUS and the drive electrodes COML to return to the original distances with a lapse of time.

In the present embodiment, a layered body LB included in the backlight device BL is provided between the electrodes SUS and the drive electrodes COML, the layered body LB being obtained by layering the reflective polarizing film DBEF, the brightness enhancement film BEF, the light diffusing sheet DI, the light guide LG, and the light reflector RS. That is, the electrodes SUS are provided on a surface of the layered body LB, the surface being opposite to a surface on the input surface IS side of the layered body LB.

In the present embodiment, the drive electrode COML corresponds to "first electrode"; the electrode SUS corresponds to "second electrode"; and the air layer AG and the layered body LB correspond to a "dielectric layer".

In the present configuration example, the air layer AG is provided between the display device with a touch detection function 10 and the backlight device BL. The present invention is, however, not limited to this example. Instead of the air layer AG, a resin layer having a high transmittance of the light emitted from the backlight device BL may be provided between the display device with a touch detection function 10 and the backlight device BL.

A distance d from the electrode SUS to the drive electrode COML is a distance in the Z-direction serving as the third direction, and corresponds to the distance from a surface of the electrode SUS facing the drive electrode COML to a surface of the drive electrode COML facing the electrode SUS. The distance d changes according to the level of a force applied to the cover member CG and the position where the force is applied.

Capacitance C is present between the drive electrode COML and the electrode SUS. That is, the drive electrodes COML make capacitive coupling with the electrodes SUS. The capacitance C changes with the distance d. Therefore, the COG 19 can detect the force information by detecting the change in the capacitance C. The principle of the force detection will be described later in detail.

The display controller 11 and the detection controller 200 drive the drive electrodes COML, and obtain the force information based on the change in the capacitance C from the electrodes SUS. For example, the display controller 11 and the detection controller 200 are included in the COG 19 and the touch IC 49. The COG 19 outputs a signal to the drive electrodes COML, and the touch IC 49 reads a signal based on the change in the capacitance value C as the force detection signal Vdet4 from the electrodes SUS. The display controller 11 may be included in the COG 19 or the host HST. The detection controller 200 may be included in the touch IC 49 or the host HST. The display controller 11, the detection controller 200, and the host HST may cooperate to control the touch detector SE1, the display device DP, and the force detector SE2.

In the present configuration example, the drive electrodes COML are used by all the touch detector SE1, the display device DP, and the force detector SE2.

Figure 17:
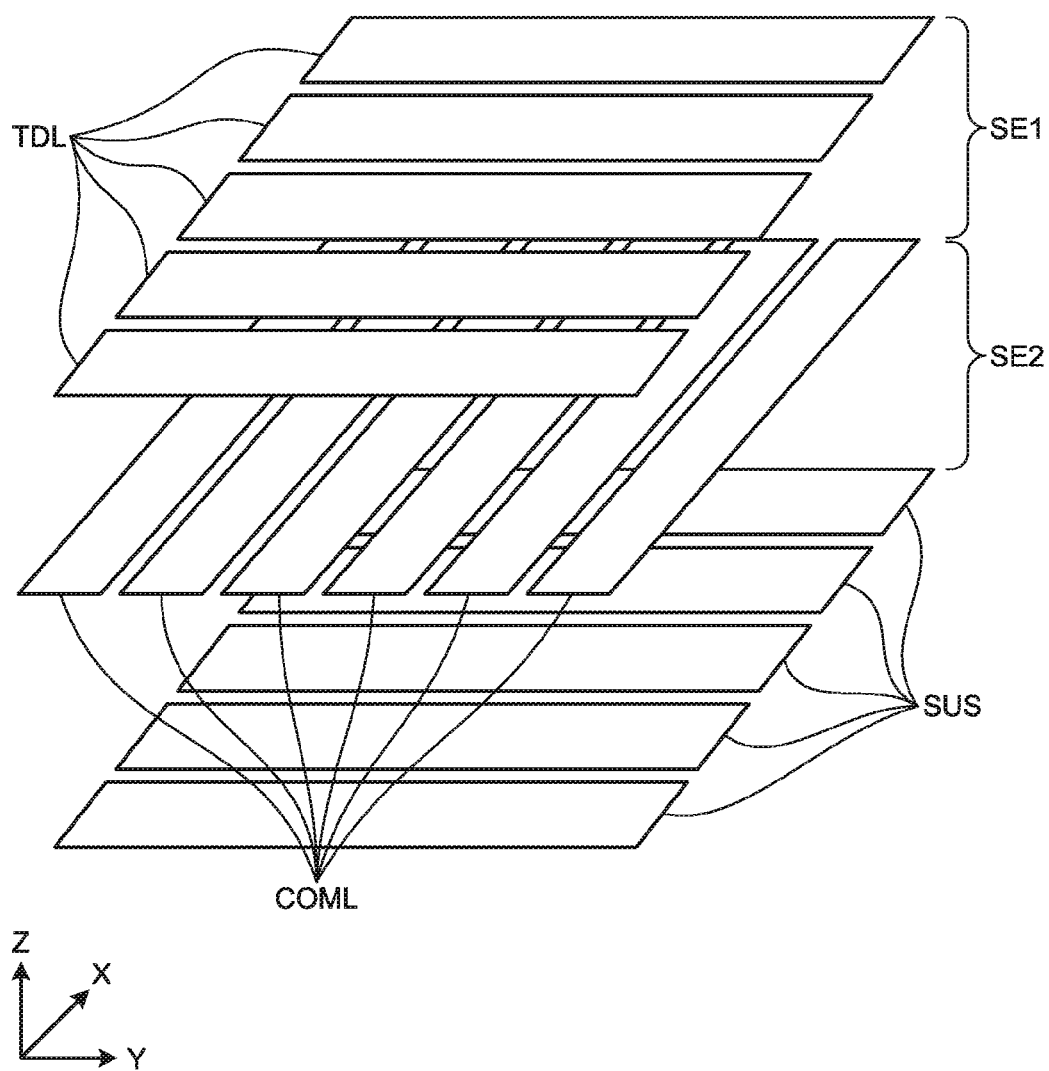
FIG. 17 is a perspective view illustrating electrodes of the display apparatus with a touch detection function according to the first embodiment.

FIG. 17 is a perspective view illustrating the electrodes of the display apparatus with a touch detection function according to the first embodiment. The touch detection electrodes TDL and the drive electrodes COML make up the touch detector SE1 of FIG. 1. The drive electrodes COML and the electrodes SUS make up the force detector SE2 of FIG. 1.

In the present embodiment, the touch detector SE1 and the force detector SE2 drive the drive electrodes COML, and simultaneously perform the mutual capacitance touch detection and the mutual capacitance force detection as described above.

In the example illustrated in FIG. 17, the electrodes SUS are formed in stripe-like electrode patterns extending in the direction intersecting with the extending direction of the electrode patterns of the drive electrodes COML. The electrodes SUS face the drive electrodes COML in the Z-direction.

The electrode patterns of the drive electrodes COML and the electrodes SUS intersecting with each other generate electrostatic capacitances at intersecting portions therebetween. In the force detector SE2, the drive electrode driver 14 is configured to apply the drive signal Vcomtm to the drive electrodes COML so as to output the detection signal Vdet4 from the electrodes SUS to perform the force detection.

Figure 18:
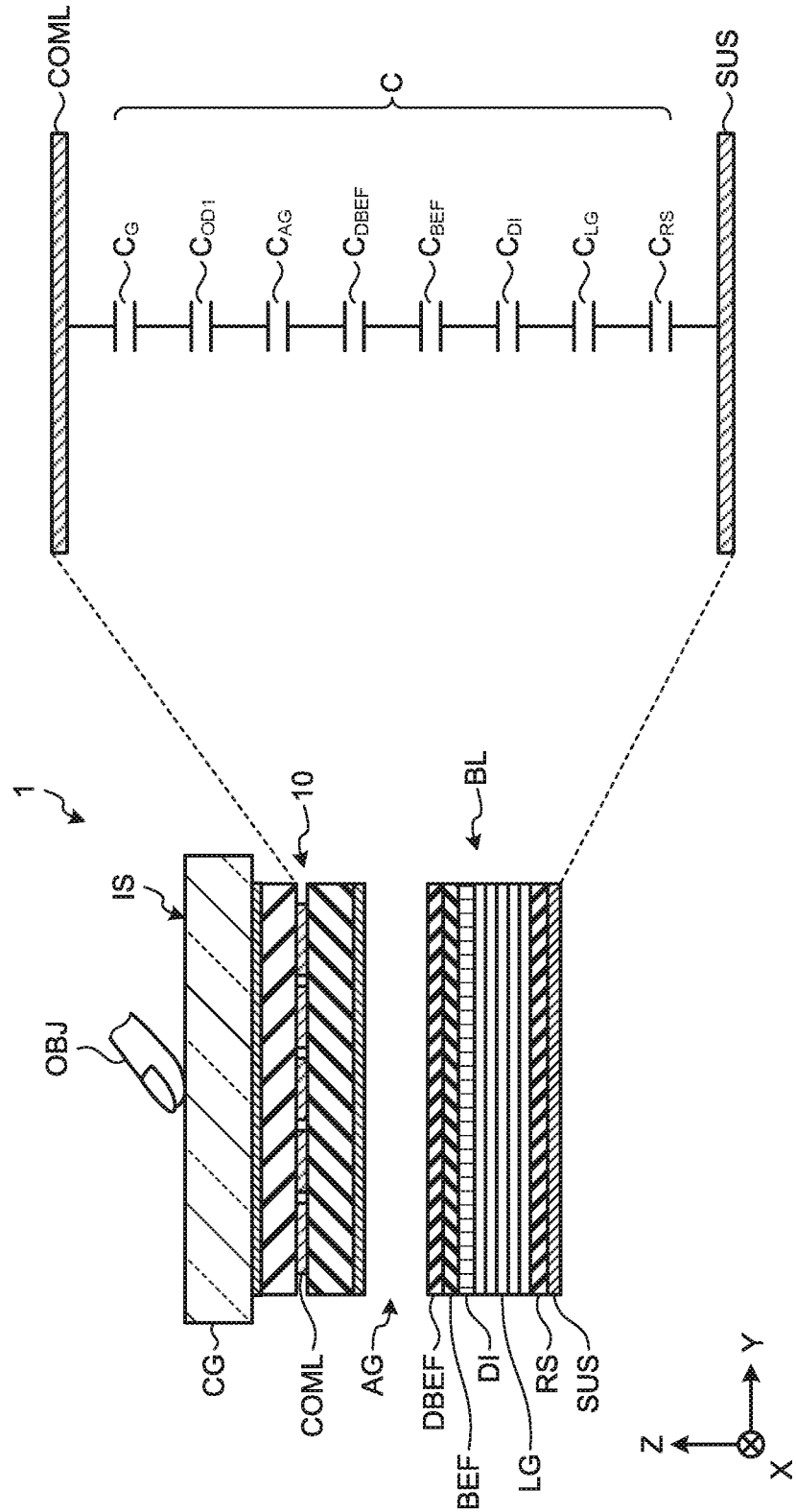
FIG. 18 illustrates a sectional view and an equivalent circuit diagram of the display apparatus with a touch detection function according to the first embodiment when no force is applied to an input surface thereof.

1-3. Principle of Force Detection
Basic Principle
FIG. 18 illustrates a sectional view and an equivalent circuit diagram of the display apparatus with a touch detection function according to the first embodiment when no force is applied to the input surface thereof. The display apparatus with a touch detection function 1 according to the first embodiment detects the mutual capacitance between the drive electrode COML and the electrode SUS to perform the force detection.

As illustrated in FIG. 18, assume that $C_G$ denotes capacitance generated by the second substrate 21, $C_{OD1}$ denotes capacitance generated by the first optical device OD1, $C_{AG}$ denotes capacitance generated by the air layer AG, $C_{DBEF}$ denotes capacitance generated by the reflective polarizing film DBEF, $C_{BEF}$ denotes capacitance generated by the brightness enhancement film BEF, $C_{DI}$ denotes capacitance generated by the light diffusing sheet DI, $C_{LG}$ denotes capacitance generated by the light guide LG, and $C_{RS}$ denotes capacitance generated by the light reflector RS. In this case, the capacitance value C between the drive electrode COML and the electrode SUS when no force is applied to the input surface IS can be represented by Expression (1) below.

$$C = C_G \times C_{OD1} \times C_{AG} \times C_{DBEF} \times C_{BEF} \times C_{DI} \times C_{LG} \times C_{RS} / (C_G + C_{OD1} + C_{AG} + C_{DBEF} + C_{BEF} + C_{DI} + C_{LG} + C_{RS}) \quad (1)$$

Figure 19:
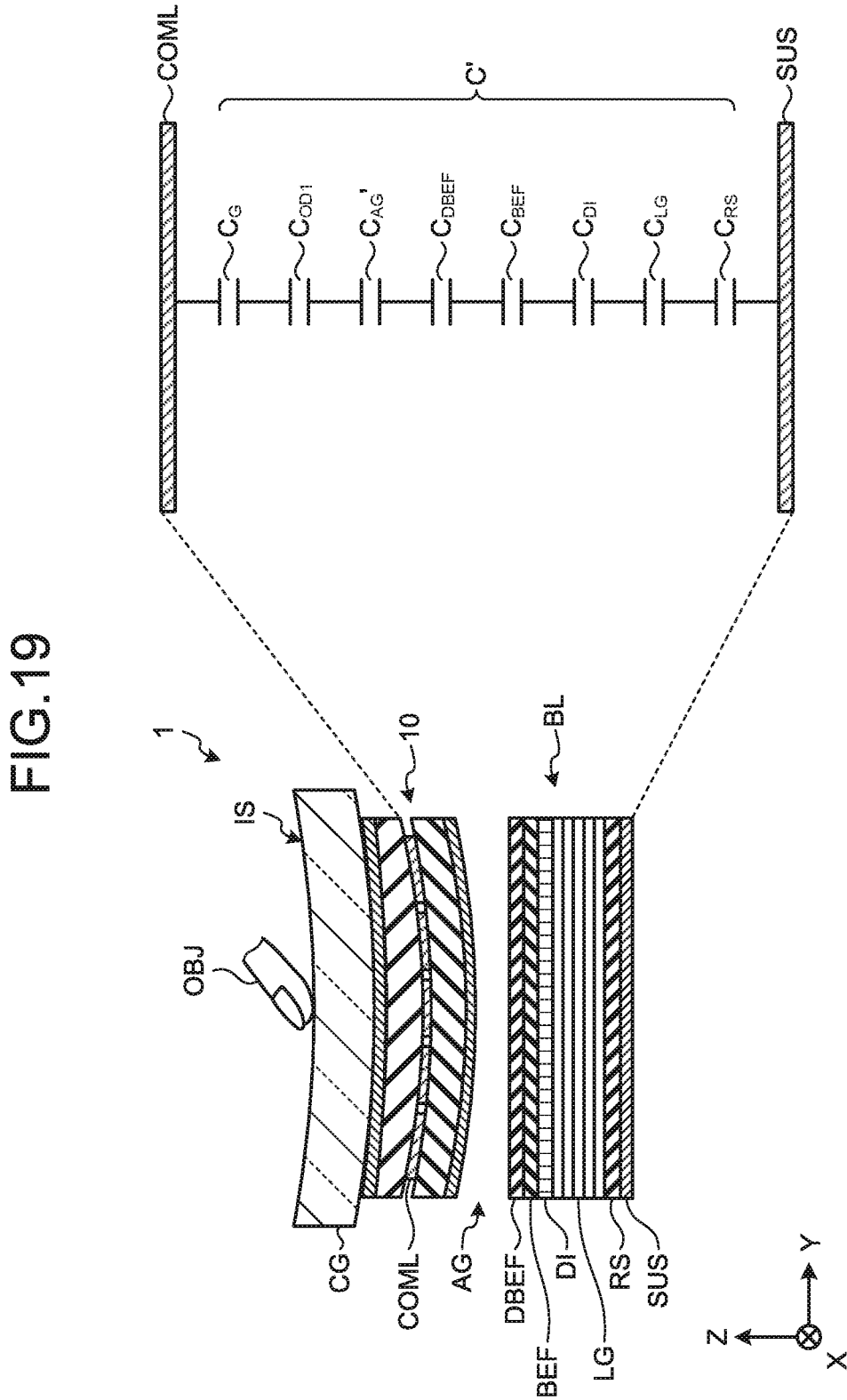
FIG. 19 illustrates a sectional view and an equivalent circuit diagram of the display apparatus with a touch detection function according to the first embodiment when a force is applied to the input surface thereof.

FIG. 19 illustrates a sectional view and an equivalent circuit diagram of the display apparatus with a touch detection function according to the first embodiment when a force is applied to the input surface thereof. As illustrated in FIG. 19, the display device with a touch detection function 10 bends when the detection target object OBJ applies the force to the input surface IS. The bending of the display device with a touch detection function 10 reduces the thickness of the air layer AG. At this time, capacitance $C_{AG}'$ generated by the air layer AG increases by $\Delta C_{AG}$ from capacitance $C_{AG}$ generated by the air layer AG when no force is applied to the input surface IS, and is represented by Expression (2) below.

$$C_{AG}' = C_{AG} + \Delta C_{AG} \quad (2)$$

At this time, capacitance value C' between the drive electrode COML and the electrode SUS can be represented by Expression (3) below.

$$C' = C_G \times C_{OD1} \times C_{AG}' \times C_{DBEF} \times C_{BEF} \times C_{DI} \times C_{LG} \times C_{RS} / (C_G + C_{OD1} + C_{AG}' + C_{DBEF} + C_{BEF} + C_{DI} + C_{LG} + C_{RS}) \quad (3)$$

In the present embodiment, the display apparatus with a touch detection function 1 detects the amount of change (C'−C) in the electrostatic capacitance generated between the drive electrode COML and the electrode SUS as a force detection value.

The following describes influences of temperature characteristics of dielectric materials included in the display apparatus with a touch detection function 1 according to the first embodiment on the force detection processing.

The dielectric materials included in members included in the display apparatus with a touch detection function 1 according to the first embodiment have temperature characteristics of the respective dielectric materials. Examples of the members included in the display apparatus with a touch detection function 1 include the cover member CG, the adhesive layer AL, the second optical device OD2, the first substrate 31, the second substrate 21, the first optical device OD1, the air layer AG, the reflective polarizing film DBEF, the brightness enhancement film BEF, the light diffusing sheet DI, the light guide LG, and the light reflector RS. In the present embodiment, the capacitance C between the drive electrode COML and the electrode SUS changes according to the temperature characteristics of dielectric materials included in the second substrate 21, the first optical device OD1, the air layer AG, the reflective polarizing film DBEF, the brightness enhancement film BEF, the light diffusing sheet DI, the light guide LG, and the light reflector RS, which are arranged between the drive electrode COML and the electrode SUS, among the members listed above. The capacitance C between the drive electrode COML and the electrode SUS also varies depending on changes in thickness of the respective layers due to thermal expansion of these dielectric materials. The change in the capacitance C between the drive electrode COML and the electrode SUS associated with the change in thickness of each layer due to the temperature characteristics and the thermal expansion of the dielectric materials can affect the force detection processing.

Figure 20:
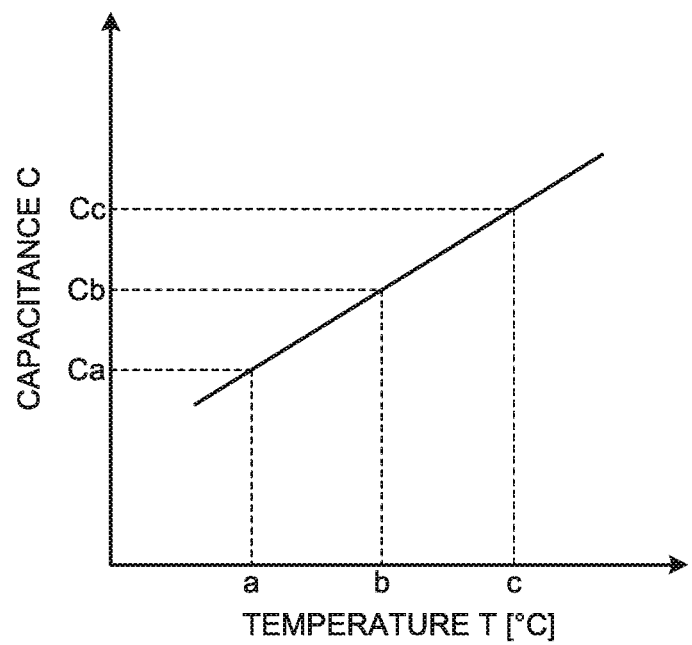
FIG. 20 is a diagram illustrating an exemplary temperature characteristic of capacitance between the drive electrode and the electrode when no force is applied to the input surface.

FIG. 20 is a diagram illustrating an exemplary temperature characteristic of the capacitance between the drive electrode COML and the electrode SUS when no force is applied to the input surface. In FIG. 20, the horizontal axis represents the temperature, and the vertical axis represents the capacitance value between the drive electrode COML and the electrode SUS.

FIG. 20 illustrates an example in which the capacitance value between the drive electrode COML and the electrode SUS is Ca at a temperature a, Cb at a temperature b, and Cc at a temperature c.

As illustrated in FIG. 20, the capacitance value between the drive electrode COML and the electrode SUS takes various values depending on the temperature even in the state where no force is applied to the input surface IS.

FIG. 20 illustrates an example in which the capacitance value between the drive electrode COML and the electrode SUS increases with increase in the temperature, that is, an example in which the graph has a positive slope. The slope of the graph, however, varies depending on the material types of the dielectric materials and the combination of the dielectric materials, and can be negative. FIG. 20 illustrates an example in which the capacitance value between the drive electrode COML and the electrode SUS linearly changes with the temperature. The capacitance value can, however, change along a quadratic curve.

Figure 21:
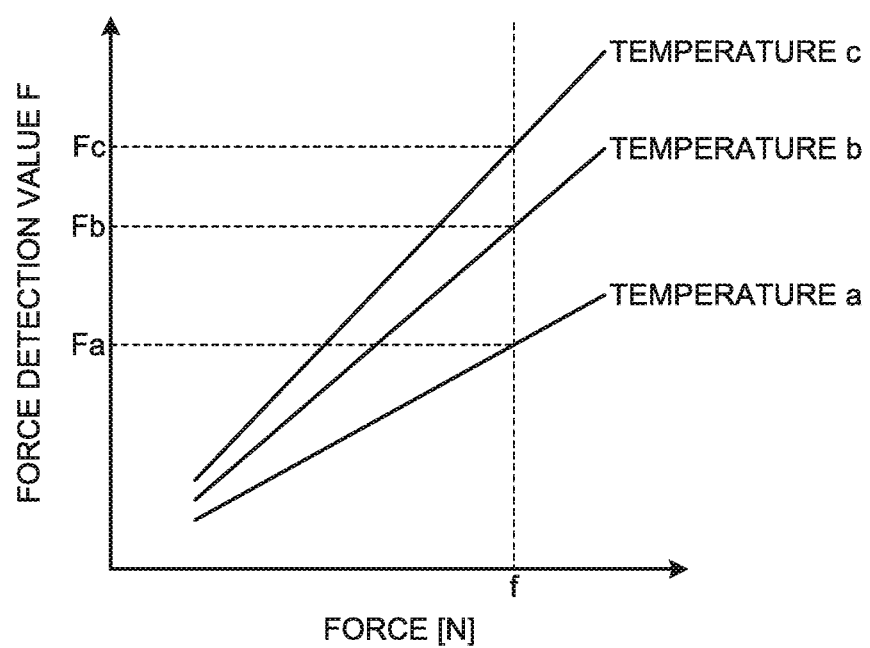
FIG. 21 is a diagram illustrating relations between a force applied to the input surface and a force detection value in cases of different temperatures.
Figure 22:
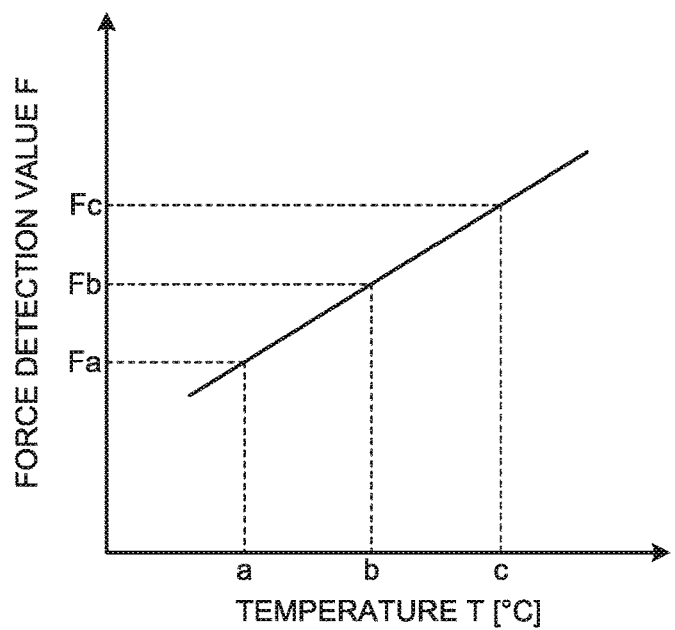
FIG. 22 is a diagram illustrating errors in the force detection value caused by variation in temperature when the force applied to the input surface is constant.

FIG. 21 is a diagram illustrating relations between a force applied to the input surface and the force detection value in cases of different temperatures. In FIG. 21, the horizontal axis represents a force applied to the input surface, and the vertical axis represents a force detection value F. FIG. 22 is a diagram illustrating errors in the force detection value caused by variation in temperature when the force applied to the input surface is constant. In FIG. 22, the horizontal axis represents the temperature, and the vertical axis represents the force detection value F.

As illustrated in FIGS. 21 and 22, when a force f applied to the input surface IS is constant, an error is generated in the force detection value F due to the temperature characteristics of the dielectric materials provided between the drive electrode COML and the electrode SUS. Specifically, even though the force f applied to the input surface IS is constant, the force detection value F has a value of Fa at the temperature a, a value of Fb at the temperature b, and a value of Fc at the temperature c.

Figure 23:
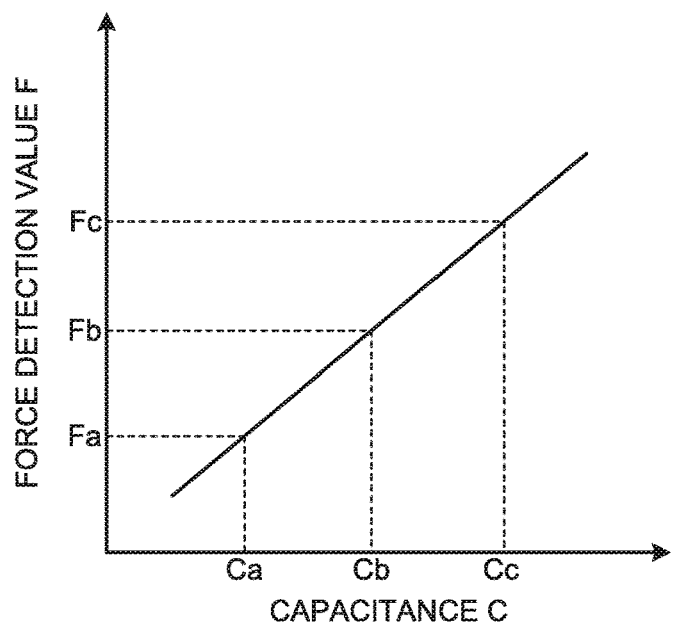
FIG. 23 is a diagram illustrating a relation between the force detection value and the capacitance between the drive electrode and the electrode according to the variation in temperature.

FIG. 23 is a diagram illustrating a relation between the force detection value and the capacitance between the drive electrode COML and the electrode SUS according to the variation in temperature. As illustrated in FIG. 23, a proportional relation holds for the capacitance value between the drive electrode COML and the electrode SUS corresponding to the temperature and the force detection value F. That is, Expressions (4) and (5) below are satisfied.

$$Fb/Fa = Cb/Ca \quad (4)$$

$$Fb/Fc = Cb/Cc \quad (5)$$

Assume that Cref denotes a reference capacitance value between the drive electrode COML and the electrode SUS at a reference temperature Tref (for example, under an environment of room temperature 25° C.) in the state where the detection target object OBJ is not in contact with the input surface IS (hereinafter, also referred to as the "non-contact state"), and Ccur1 denotes the capacitance value (first capacitance value) between the drive electrode COML and the electrode SUS in the non-contact state. Further, assume that Ccur2 denotes the capacitance value (second capacitance value) between the drive electrode COML and the electrode SUS in the state where a force is applied to the input surface IS (hereinafter, also referred to as the "contact state"), Fcur denotes the force detection value that is the amount of change in the electrostatic capacitance between the drive electrode COML and the electrode SUS, and Fcor denotes a corrected force detection value to be obtained. In this case, Expressions (6) and (7) below are obtained.

$$Fcur = Ccur2 - Ccur1 \quad (6)$$

$$Fcor = (Cref/Ccur1) * Fcur \quad (7)$$

As represented in Expressions (6) and (7) above, the force detection controller 50 can obtain the corrected force detection value Fcor corrected from the force detection value Fcur by multiplying the force detection value Fcur (=Ccur2−Ccur1) by the ratio (Cref/Ccur1) between the reference capacitance value Cref and the capacitance value Ccur1. As described above, the reference capacitance value Cref represents a capacitance value between the drive electrode COML and the electrode SUS in the non-contact state at the reference temperature Tref, and the capacitance value Ccur1 represents a capacitance value between the drive electrode COML and the electrode SUS in the non-contact state.

Figure 24:
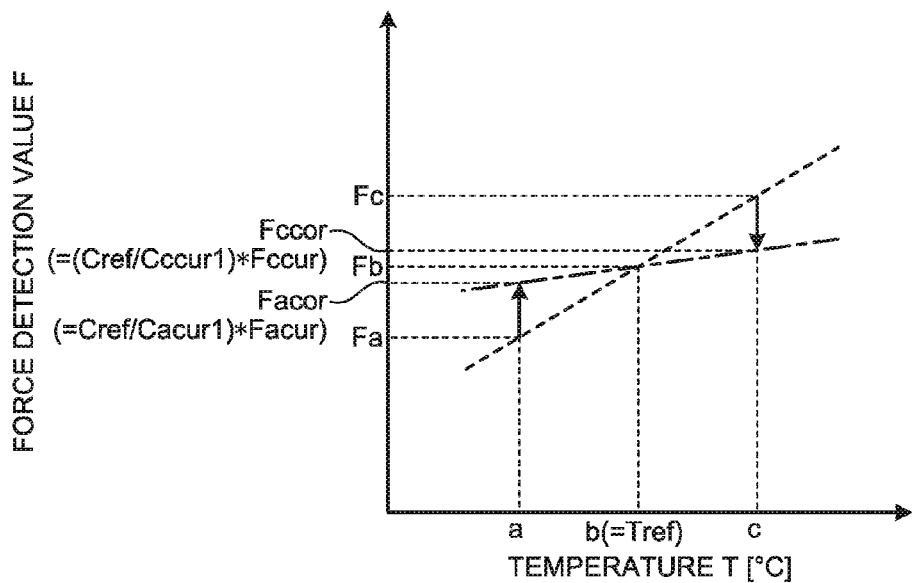
FIG. 24 is a diagram illustrating exemplary corrected force detection values when the force applied to the input surface is constant, in the display apparatus with a touch detection function according to the first embodiment.

FIG. 24 is a diagram illustrating examples of the corrected force detection value when the force applied to the input surface is constant, in the display apparatus with a touch detection function according to the first embodiment. In FIG. 24, the horizontal axis represents the temperature, and the vertical axis represents the force detection value F. In FIG. 24, the dashed line represents the force detection value before being corrected, and the long-dashed short-dashed line represents the force detection value after being corrected.

Figure 25:
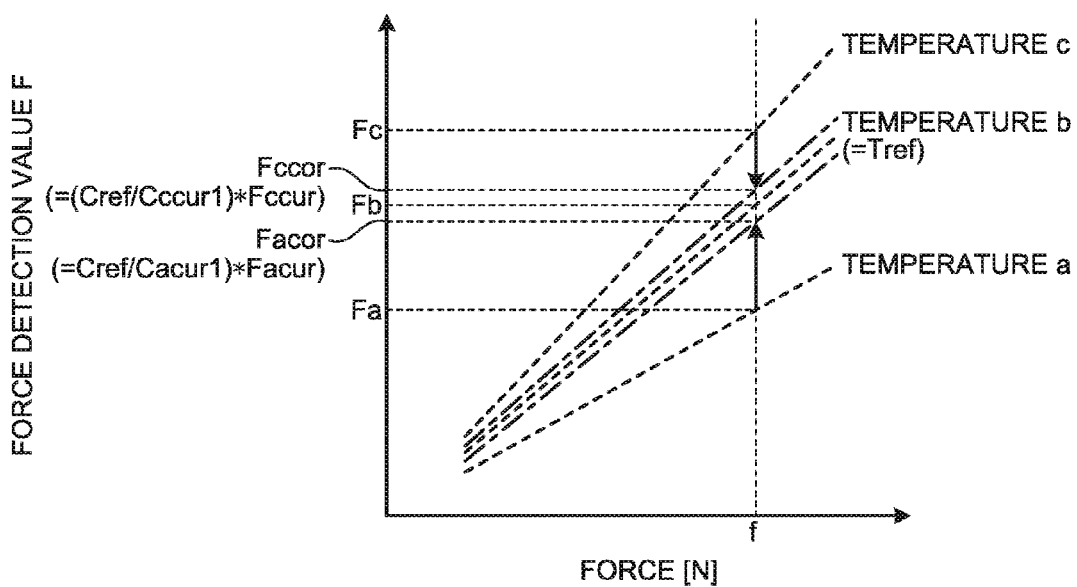
FIG. 25 is a diagram illustrating relations between a force applied to the input surface and the corrected force detection value, in the display apparatus with a touch detection function according to the first embodiment.

FIG. 25 is a diagram illustrating relations between a force applied to the input surface and the corrected force detection value, in the display apparatus with a touch detection function according to the first embodiment. In FIG. 25, the horizontal axis represents a force applied to the input surface, and the vertical axis represents the force detection value F. In FIG. 25, the dashed line represents the force detection value before being corrected, and the long-dashed short-dashed line represents the force detection value after being corrected.

FIGS. 24 and 25 illustrate an example in which the temperature b is assumed to be the reference temperature Tref.

For example, as illustrated in FIG. 24, a corrected force detection value Facor corrected from the force detection value Fa can be obtained by using Expressions (6) and (7) above to multiply the force detection value Fa at the temperature a by the ratio (Cref/Cacur1) between the reference capacitance value Cref and a capacitance value Cacur1. The reference capacitance value Cref represents a capacitance value between the drive electrode COML and the electrode SUS in the non-contact state at the reference temperature Tref, and the capacitance value Cacur1 represents a capacitance value between the drive electrode COML and the electrode SUS in the non-contact state.

For example, as illustrated in FIG. 24, a corrected force detection value Fccor corrected from the force detection value Fc can be obtained by using Expressions (6) and (7) above to multiply the force detection value Fc at the temperature c by the ratio (Cref/Cccur1) between the reference capacitance value Cref and a capacitance value Cccur1. The reference capacitance value Cref represents a capacitance value between the drive electrode COML and the electrode SUS in the non-contact state at the reference temperature Tref, and the capacitance value Cccur1 represents a capacitance value between the drive electrode COML and the electrode SUS in the non-contact state.

As illustrated in FIG. 25, the above calculations correct the force detection value that is the amount of change in the electrostatic capacitance between the drive electrode COML and the electrode SUS generated due to the temperature characteristics of the dielectric materials included in the second substrate 21, the first optical device OD1, the air layer AG, the reflective polarizing film DBEF, the brightness enhancement film BEF, the light diffusing sheet DI, the light guide LG, and the light reflector RS, which are arranged between the drive electrode COML and the electrode SUS.

1-4. Configuration and Operation of Force Detection Controller

In the present embodiment, the force detection controller 50 illustrated in FIG. 1 performs the force detection processing described above. More specifically, for example, the force detection processor 442 of the signal processor 44 in the force detection controller 50 illustrated in FIG. 2 performs the force detection processing.

Figure 26:
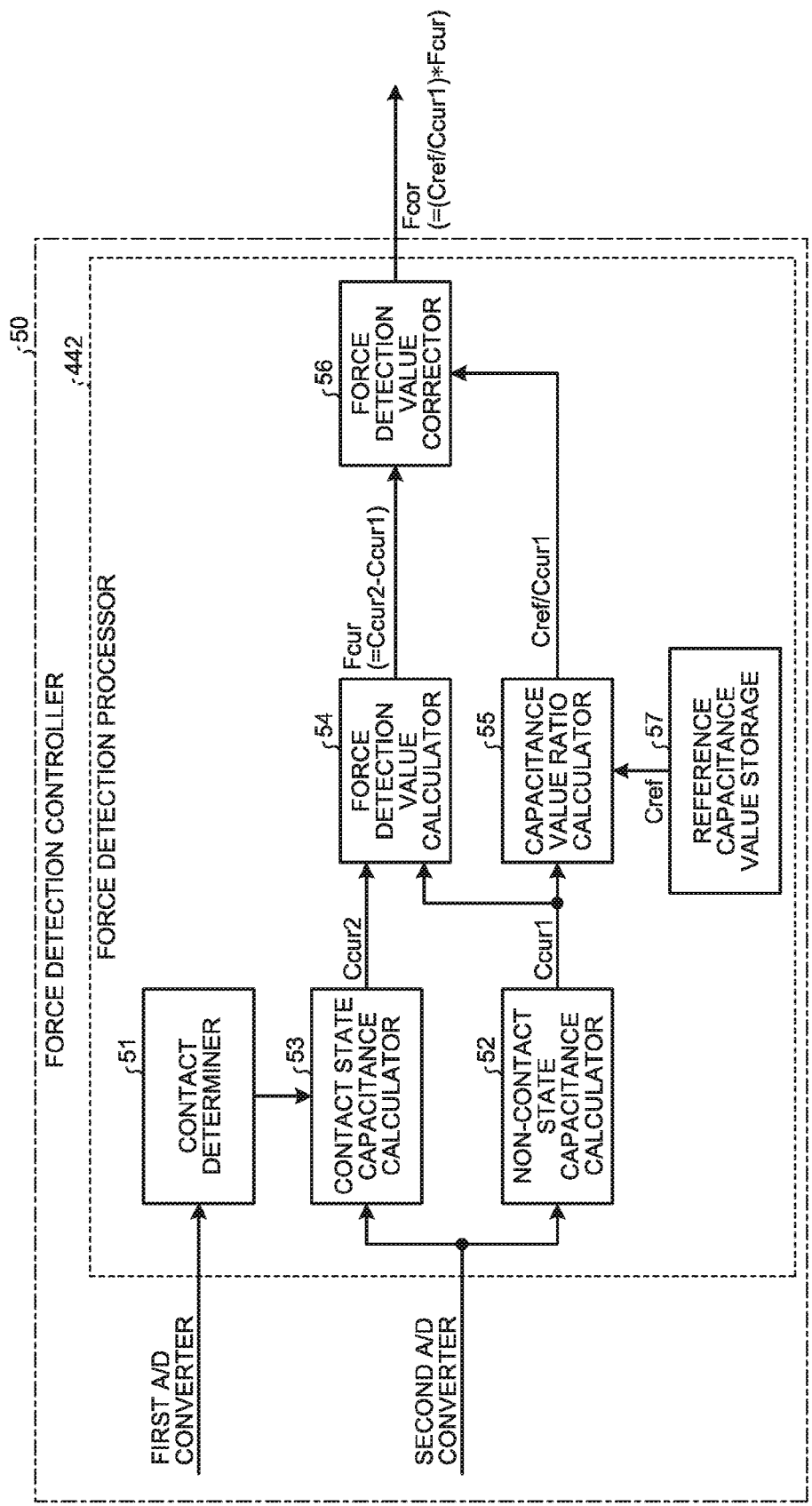
FIG. 26 is a diagram illustrating functional blocks of a force detection controller of the display apparatus with a touch detection function according to the first embodiment.

FIG. 26 is a diagram illustrating functional blocks of the force detection controller of the display apparatus with a touch detection function according to the first embodiment. In the present embodiment, the force detection processor 442 of the force detection controller 50 is exemplified as being included in the signal processor 44 of the detection controller 200.

The force detection controller 50 detects a force applied to the input surface IS by the detection target object OBJ based on the electrostatic capacitance generated between the drive electrodes COML and the electrodes SUS.

The force detection processor 442 of the force detection controller 50 includes a contact determiner 51, a non-contact state capacitance calculator 52, a contact state capacitance calculator 53, a force detection value calculator 54, a capacitance value ratio calculator 55, a force detection value corrector 56, and a reference capacitance value storage 57. The reference capacitance value storage 57 stores in advance the reference capacitance value Cref between the drive electrode COML and the electrode SUS in the non-contact state at the reference temperature Tref (for example, under the environment of room temperature 25° C.). The reference capacitance value Cref may be individually set before shipment of the display apparatus with a touch detection function 1 according to the first embodiment. The reference capacitance value storage 57 is made up of, for example, a register and/or the like.

The contact determiner 51, the non-contact state capacitance calculator 52, the contact state capacitance calculator 53, the force detection value calculator 54, the capacitance value ratio calculator 55, and the force detection value corrector 56 are configured, for example, as circuits. The contact determiner 51, the non-contact state capacitance calculator 52, the contact state capacitance calculator 53, the force detection value calculator 54, the capacitance value ratio calculator 55, and the force detection value corrector 56 may be implemented by execution of programs by the touch IC 49. In this case, the contact determiner 51, the non-contact state capacitance calculator 52, the contact state capacitance calculator 53, the force detection value calculator 54, the capacitance value ratio calculator 55, and the force detection value corrector 56 may be implemented by execution of the programs by the COG 19 or the host HST, or may be implemented by execution of the programs by cooperation of two or more of the COG 19, the touch IC 49, and the host HST.

The contact determiner 51 determines whether or not the detection target object OBJ is in contact with or in proximity to the input surface IS, based on the signal output from the first A/D converter 43-1 (refer to FIG. 2). As a method for determining whether or not the detection target object OBJ is in contact with or in proximity to the input surface IS, for example, the absolute value $|\Delta V|$ of the difference between the waveform $V_0$ and the waveform $V_1$ illustrated in FIG. 5 may be detected, or the change in the capacitance value of the capacitive element C11 illustrated in FIGS. 3 and 4 may be detected. The present invention is not limited by the method for determining whether or not the detection target object OBJ is in contact with or in proximity to the input surface IS.

While the drive signal Vcomtm is applied to the drive electrode COML, if the contact determiner 51 determines that the detection target object OBJ is neither in contact with nor in proximity to the input surface IS, the non-contact state capacitance calculator 52 calculates the capacitance value Ccur1 between the drive electrode COML and the electrode SUS in the non-contact state based on the signal output from the second A/D converter 43-2 (refer to FIG. 2), and outputs the capacitance value Ccur1 to the force detection value calculator 54 and the capacitance value ratio calculator 55.

While the drive signal Vcomtm is applied to the drive electrode COML, if the contact determiner 51 determines that the detection target object OBJ is in contact with or in proximity to the input surface IS, the contact state capacitance calculator 53 calculates the capacitance value Ccur2 between the drive electrode COML and the electrode SUS in the contact state based on the signal output from the second A/D converter 43-2 (refer to FIG. 2), and outputs the capacitance value Ccur2 to the force detection value calculator 54.

The force detection value calculator 54 calculates, as the force detection value Fcur, the amount of change (Ccur2−Ccur1) of the capacitance value Ccur2 in the contact state relative to the capacitance value Ccur1 in the non-contact state, and outputs the force detection value Fcur to the force detection value corrector 56.

The capacitance value ratio calculator 55 calculates the ratio (Cref/Ccur1) between the reference capacitance value Cref in the non-contact state at the reference temperature Tref and the capacitance value Ccur1 detected in the non-contact state, and outputs the ratio (Cref/Ccur1) to the force detection value corrector 56.

The force detection value corrector 56 calculates the corrected force detection value Fcor (=(Cref/Ccur1)*Fcur) by multiplying the force detection value Fcur by the ratio (Cref/Ccur1), and outputs the corrected force detection value Fcor. The force detection value Fcur is input from the force detection value calculator 54. The ratio (Cref/Ccur1) is input from the capacitance value ratio calculator 55 and is a ratio between the reference capacitance value Cref in the non-contact state at the reference temperature Tref and the capacitance value Ccur1 detected in the non-contact state.

Figure 27:
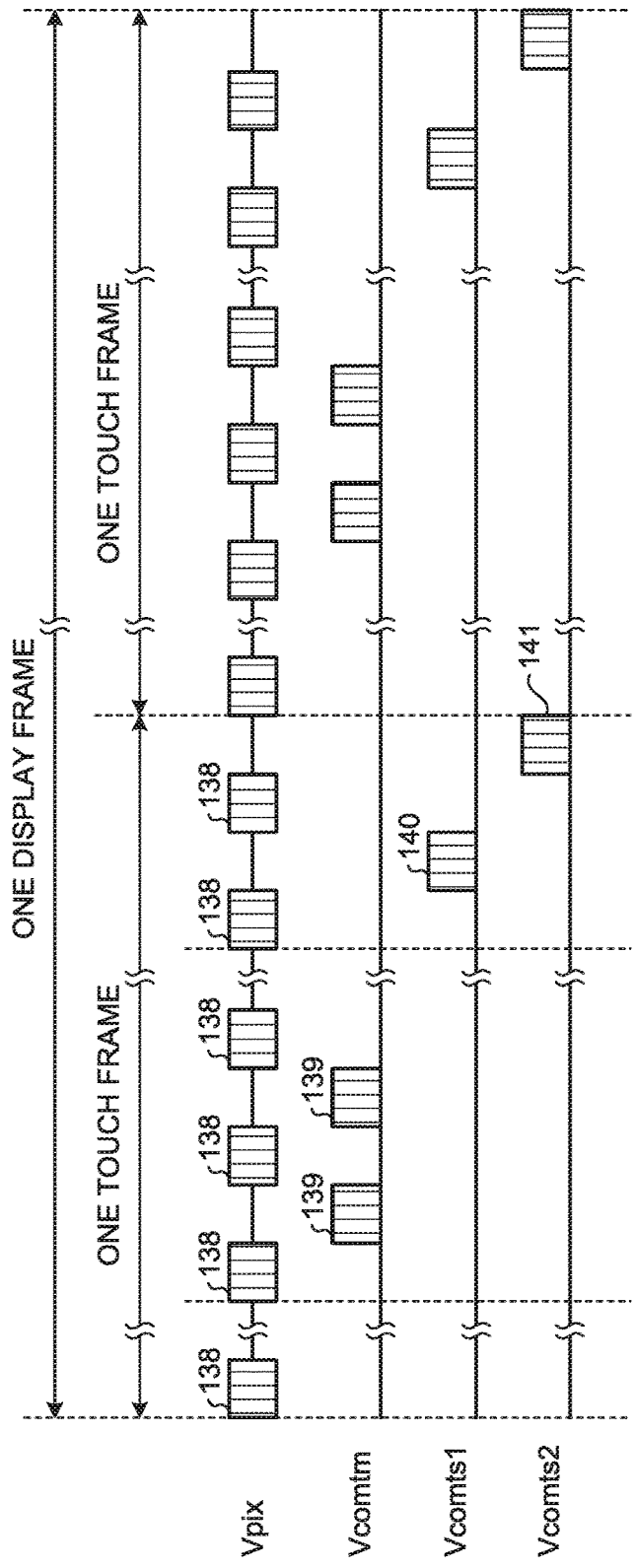
FIG. 27 is a timing diagram illustrating exemplary operation timing of the display apparatus with a touch detection function according to the first embodiment.

FIG. 27 is a timing diagram illustrating exemplary operation timing of the display apparatus with a touch detection function according to the first embodiment.

In the display apparatus with a touch detection function 1 according to the first embodiment, one display frame includes two touch frames. In one display frame, one image (one frame) is displayed. In one touch frame, the touch detection and the force detection on the input surface IS are performed. One display frame may include one touch frame, or may include three or more touch frames.

In the present embodiment, a mutual capacitance detection period 139, a self-capacitance detection period 140, and a self-capacitance detection period 141 are provided in blanking intervals that are periods other than display periods 138. In the display period 138, the pixel signals Vpix are applied to the display device DP, and the display device DP writes and displays an image. In the mutual capacitance detection period 139, the mutual capacitance between the drive electrode COML and the touch detection electrode TDL and the mutual capacitance between the drive electrode COML and the electrode SUS are detected. In the self-capacitance detection period 141, the self-capacitance of the touch detection electrode TDL is detected. In the self-capacitance detection period 141, the self-capacitance of the drive electrode COML is detected.

During the mutual capacitance detection period 139, the drive signal Vcomtm is applied to the drive electrodes COML. The mutual capacitances between the drive electrodes COML and the touch detection electrodes TDL detected during the mutual capacitance detection period 139 are used for the touch detection by the touch detection controller 40. The mutual capacitances between the drive electrodes COML and the electrodes SUS detected during the mutual capacitance detection period 139 are used for the force detection by the force detection controller 50.

During the self-capacitance detection period 140, the drive signal Vcomts1 is sequentially applied to the touch detection electrodes TDL, and the self-capacitances of the touch detection electrodes TDL are detected. The self-capacitances of the touch detection electrodes TDL detected during the self-capacitance detection period 140 are used for the touch detection by the touch detection controller 40.

During the self-capacitance detection period 141, the drive signal Vcomts2 is applied to the drive electrodes COML, and the self-capacitances of the drive electrodes COML are detected. The self-capacitances of the drive electrodes COML detected during the self-capacitance detection period 141 are used for the touch detection by the touch detection controller 40.

The touch detection controller 40 performs the touch detection based on the mutual capacitances between the drive electrodes COML and the touch detection electrodes TDL detected during the mutual capacitance detection period 139, the self-capacitances of the touch detection electrodes TDL detected during the self-capacitance detection period 140, and the self-capacitances of the drive electrodes COML detected during the self-capacitance detection period 141. The touch detection controller 40 takes into account the self-capacitances of the touch detection electrodes TDL and the self-capacitances of the drive electrodes COML in addition to the mutual capacitances between the drive electrodes COML and the touch detection electrodes TDL, and thereby, can suitably reduce the influence of moisture beads or the like, and can suitably detect a stylus pen or the like.

In the present embodiment, the force detection controller 50 performs the force detection based on the capacitance values detected by the electrodes SUS during the mutual capacitance detection period 139.

Figure 28:
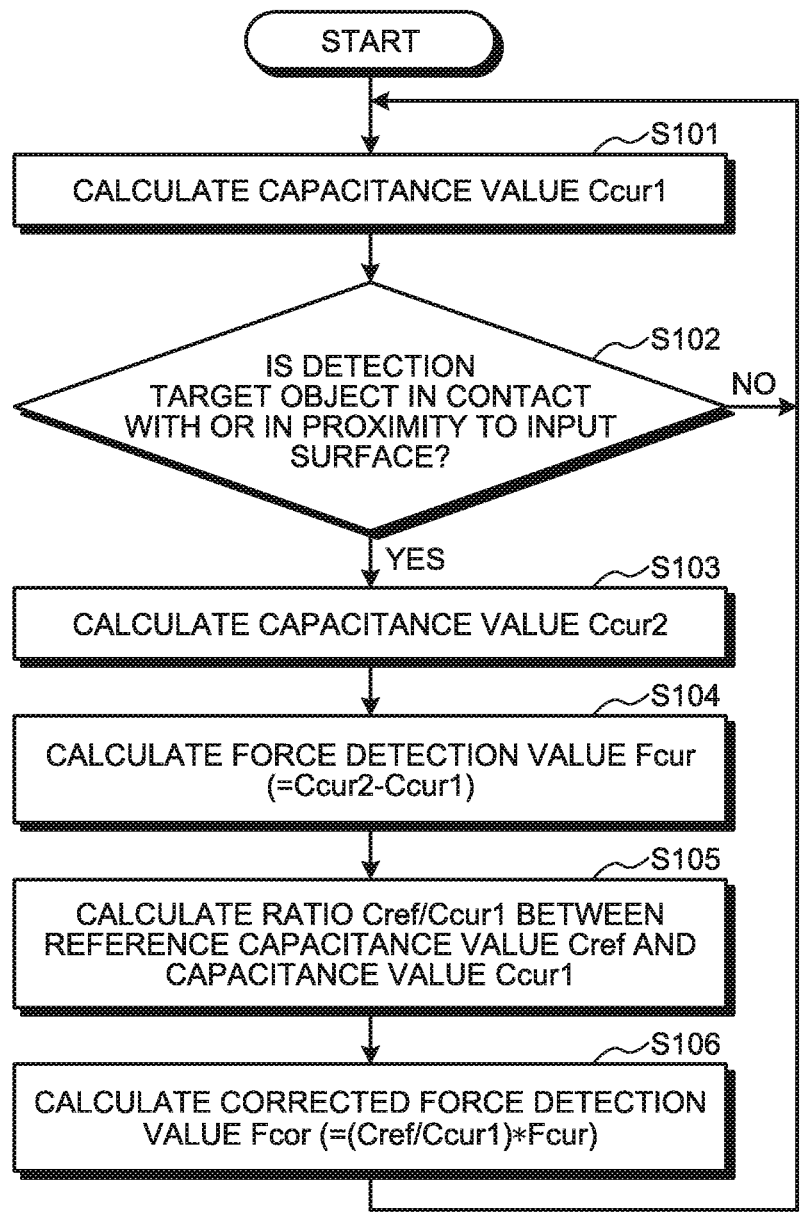
FIG. 28 is a flowchart illustrating a process executed by the force detection controller of the display apparatus with a touch detection function according to the first embodiment.

FIG. 28 is a flowchart illustrating a process executed by the force detection controller of the display apparatus with a touch detection function according to the first embodiment. The process illustrated in FIG. 28 is executed during the mutual capacitance detection period 139 described above.

The non-contact state capacitance calculator 52 calculates the capacitance value Ccur1 between the drive electrode COML and the electrode SUS in the non-contact state based on the signal output from the second A/D converter 43-2 (refer to FIG. 2) (Step S101).

The contact determiner 51 determines whether or not the detection target object OBJ is in contact with or in proximity to the input surface IS (Step S102). If the contact determiner 51 determines that the detection target object OBJ is neither in contact with nor in proximity to the input surface IS, that is, no force is applied to the input surface IS (No at Step S102), the process returns to Step S101, and the processing of Steps S101 and S102 is repeatedly performed until the detection target object OBJ is determined to be in contact with or in proximity to the input surface IS at Step S102. As a method used by the contact determiner 51 to determine whether or not the detection target object OBJ is in contact with or in proximity to the input surface IS, for example, the absolute value |ΔV| of the difference between the waveform $V_0$ and the waveform $V_1$ illustrated in FIG. 5 may be detected, or the change in the capacitance value of the capacitive element C11 illustrated in FIGS. 3 and 4 may be detected.

If the contact determiner 51 determines that the detection target object OBJ is in contact with or in proximity to the input surface IS (Yes at Step S102), the contact state capacitance calculator 53 calculates the capacitance value Ccur2 between the drive electrode COML and the electrode SUS in the contact state based on the signal output from the second A/D converter 43-2 (refer to FIG. 2) (Step S103).

The force detection value calculator 54 calculates, as the force detection value Fcur, the amount of change (Ccur2−Ccur1) of the capacitance value Ccur2 in the contact state relative to the capacitance value Ccur1 in the non-contact state, and outputs the force detection value Fcur to the force detection value corrector 56 (Step S104).

The capacitance value ratio calculator 55 calculates the ratio (Cref/Ccur1) between the reference capacitance value Cref in the non-contact state at the reference temperature Tref and the capacitance value Ccur1 detected in the non-contact state, and outputs the ratio (Cref/Ccur1) to the force detection value corrector 56 (Step S105).

The force detection value corrector 56 receives the force detection value Fcur from the force detection value calculator 54. The force detection value corrector 56 receives the ratio (Cref/Ccur1) between the reference capacitance value Cref and the capacitance value Ccur1, from the capacitance value ratio calculator 55. The force detection value corrector 56 calculates the corrected force detection value Fcor (=(Cref/Ccur1)*Fcur) by multiplying the force detection value Fcur by the ratio (Cref/Ccur1) between the reference capacitance value Cref and the capacitance value Ccur1, and outputs the corrected force detection value Fcor (Step S106). The reference capacitance value Cref represents a capacitance value in the non-contact state at the reference temperature Tref, and the capacitance value Ccur1 is a capacitance value detected in the non-contact state. The process then returns to the processing at Step S101.

The execution of the process described above can reduce the influence of the temperature characteristics of the dielectric materials, which are included in the air layer AG and the layered body LB provided between the drive electrodes COML and the electrodes SUS, on the force detection processing, and thus can restrain the reduction in accuracy of the detection in the force detection processing.

1-5. Modification
First Modification

Figure 29:
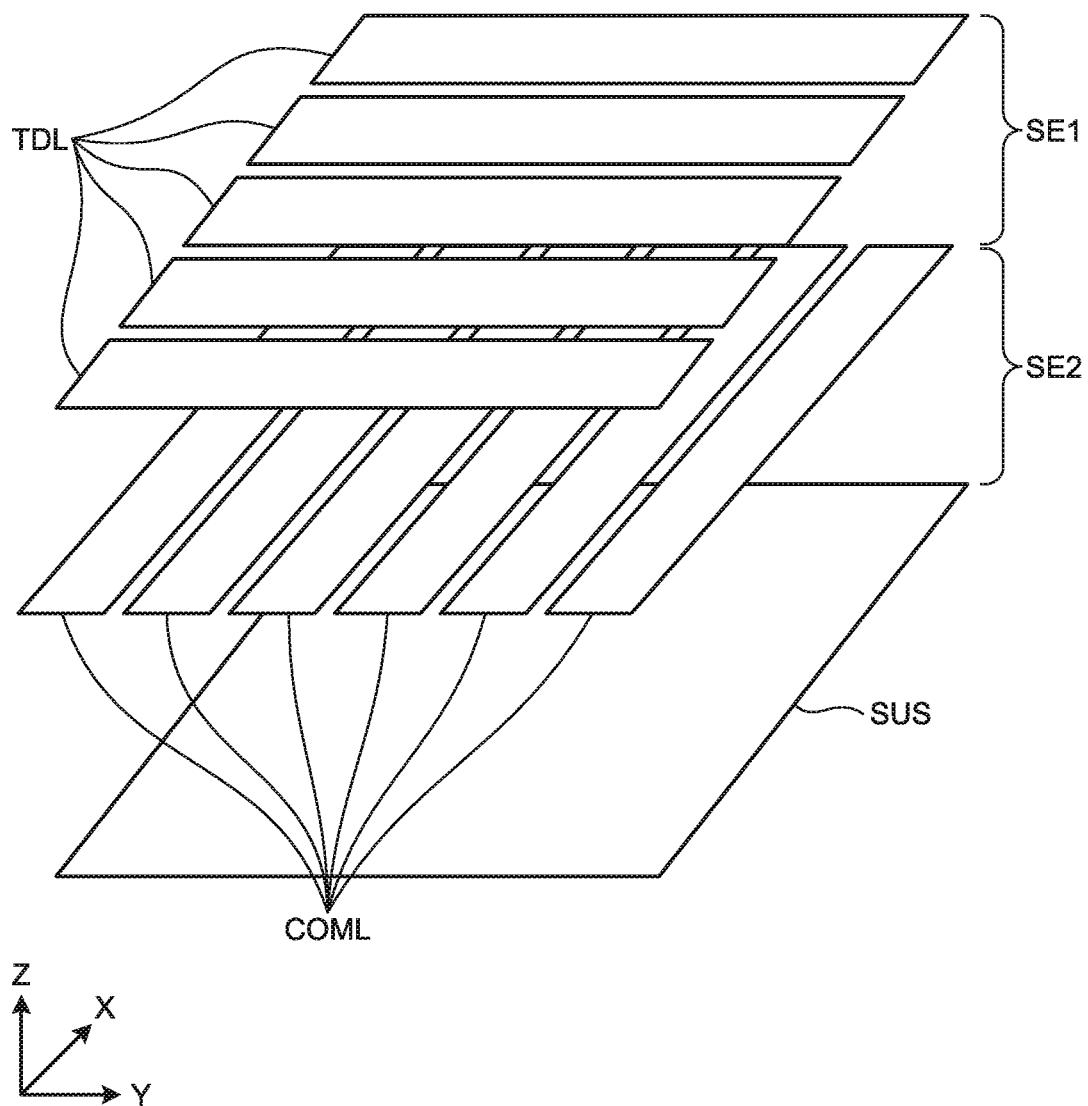
FIG. 29 is a perspective view illustrating electrodes of the display apparatus with a touch detection function according to a first modification of the first embodiment.

FIG. 29 is a perspective view illustrating the touch detection electrodes, the drive electrodes, and an electrode of the display apparatus with a touch detection function according to a first modification of the first embodiment. The electrodes SUS may consist of one electrode, as illustrated in FIG. 29. Alternatively, the electrodes SUS may include a larger number of electrode patterns than that of the example illustrated (in FIG. 17), or may include electrode patterns obtained by arranging a plurality of electrodes in a matrix having a row-column configuration.

Second Modification

Figure 30:
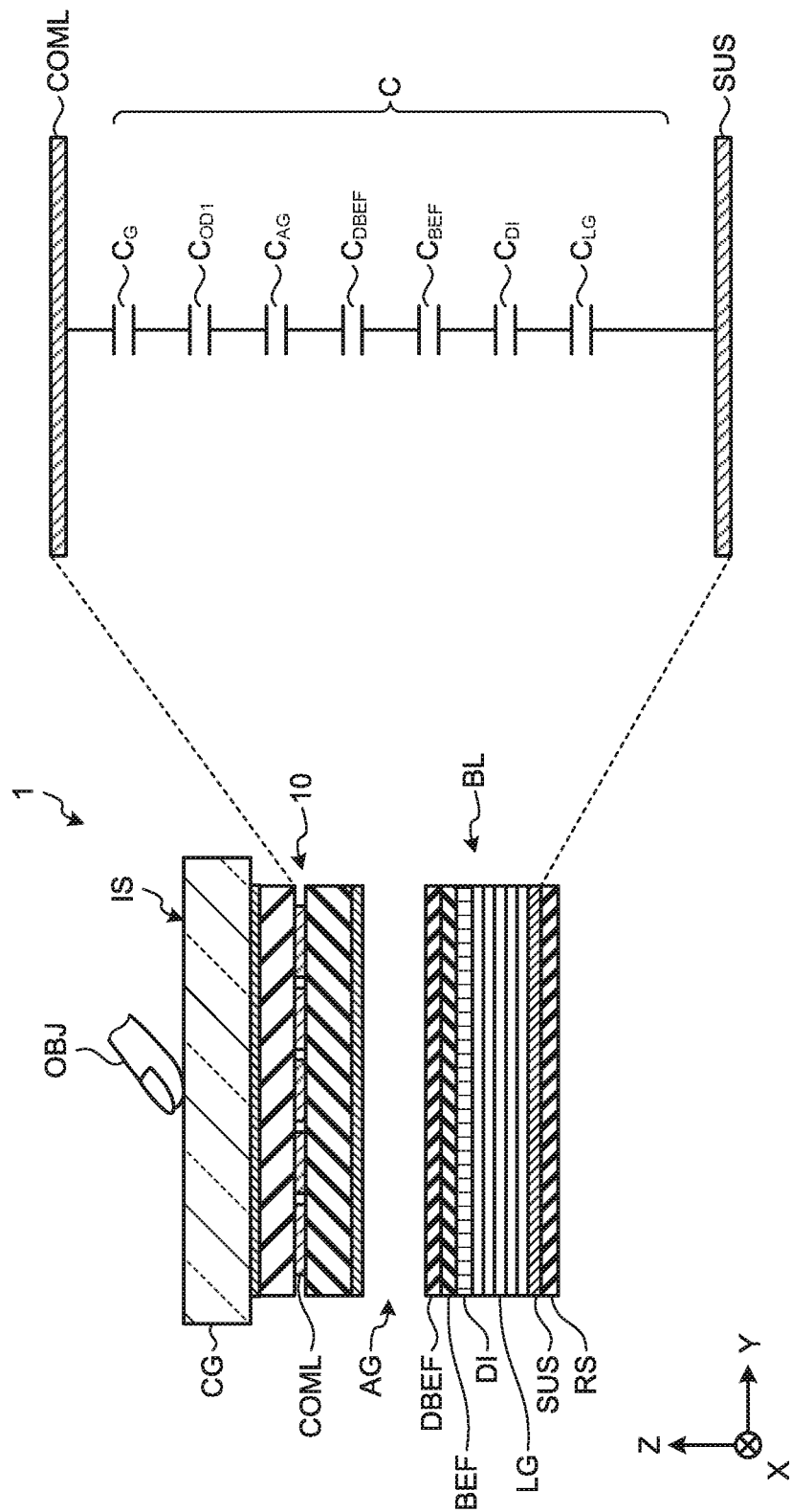
FIG. 30 illustrates a sectional view and an equivalent circuit diagram of the display apparatus with a touch detection function according to a second modification of the first embodiment when no force is applied to the input surface thereof.
Figure 31:
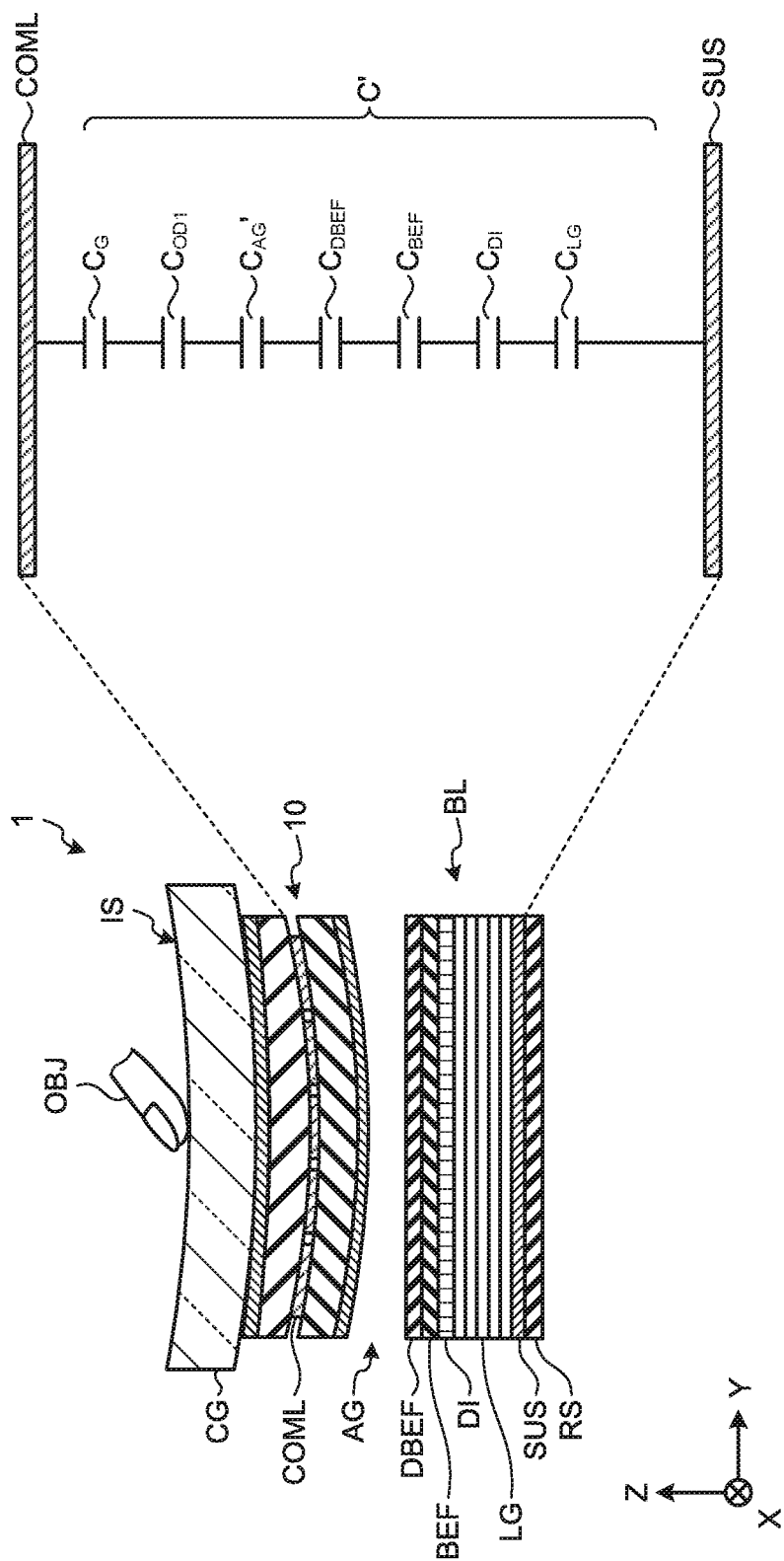
FIG. 31 illustrates a sectional view and an equivalent circuit diagram of the display apparatus with a touch detection function according to the second modification of the first embodiment when a force is applied to the input surface thereof.

FIG. 30 illustrates a sectional view and an equivalent circuit diagram of the display apparatus with a touch detection function according to a second modification of the first embodiment when no force is applied to the input surface thereof. FIG. 31 illustrates a sectional view and an equivalent circuit diagram of the display apparatus with a touch detection function according to the second modification of the first embodiment when a force is applied to the input surface thereof. As illustrated in FIGS. 30 and 31, in the second modification of the first embodiment, the electrodes SUS are provided between the light guide LG and the light reflector RS. In this case, the capacitance value C between the drive electrode COML and the electrode SUS when no force is applied to the input surface IS can be represented by Expression (8) below.

$$C = C_G \times C_{OD1} \times C_{AG} \times C_{DBEF} \times C_{BEF} \times C_{DI} \times C_{LG}/(C_G + C_{OD1} + C_{AG} + C_{DBEF} + C_{BEF} + C_{DI} + C_{LG}) \quad (8)$$

In the second modification of the first embodiment, the capacitance value C' between the drive electrode COML and the electrode SUS when a force is applied to the input surface IS can be represented by Expression (9) below.

$$C' = C_G \times C_{OD1} \times C_{AG}' \times C_{DBEF} \times C_{BEF} \times C_{DI} \times C_{LG}/(C_G + C_{OD1} + C_{AG}' + C_{DBEF} + C_{BEF} + C_{DI} + C_{LG}) \quad (9)$$

At this time, the capacitance $C_{AG}'$ generated by the air layer AG increases by $\Delta C_{AG}$ from capacitance $C_{AG}$ generated by the air layer AG when no force is applied to the input surface IS, and is represented by Expression (2) above.

Third Modification

Figure 32:
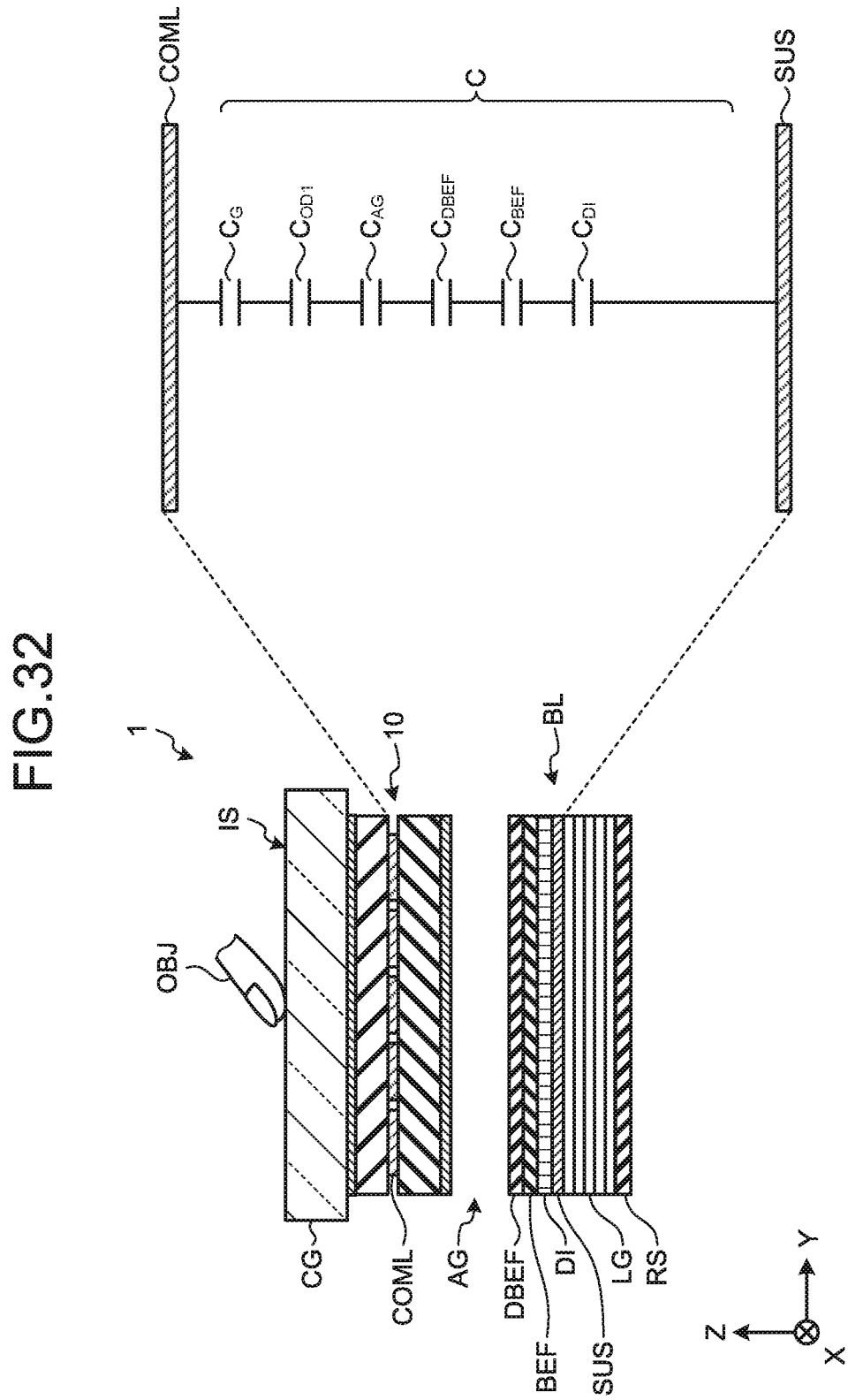
FIG. 32 illustrates a sectional view and an equivalent circuit diagram of the display apparatus with a touch detection function according to a third modification of the first embodiment when no force is applied to the input surface thereof.
Figure 33:
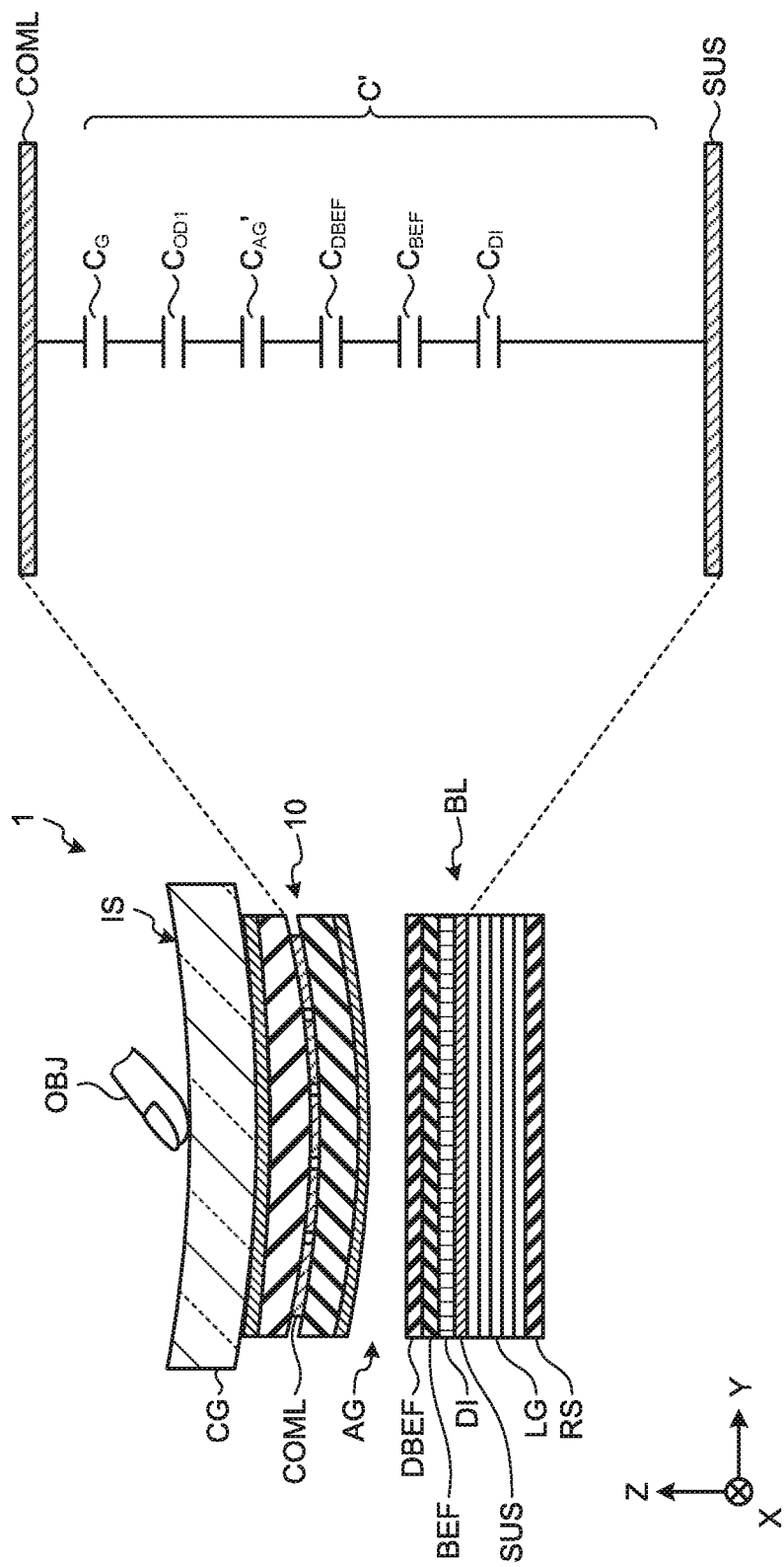
FIG. 33 illustrates a sectional view and an equivalent circuit diagram of the display apparatus with a touch detection function according to the third modification of the first embodiment when a force is applied to the input surface thereof.

FIG. 32 illustrates a sectional view and an equivalent circuit diagram of the display apparatus with a touch detection function according to a third modification of the first embodiment when no force is applied to the input surface thereof. FIG. 33 illustrates a sectional view and an equivalent circuit diagram of the display apparatus with a touch detection function according to the third modification of the first embodiment when a force is applied to the input surface thereof. As illustrated in FIGS. 32 and 33, in the third modification of the first embodiment, the electrodes SUS are provided between the light diffusing sheet DI and the light guide LG. In this case, the capacitance value C between the drive electrode COML and the electrode SUS when no force is applied to the input surface IS can be represented by Expression (10) below.

$$C = C_G \times C_{OD1} \times C_{AG} \times C_{DBEF} \times C_{BEF} \times C_{DI}/(C_G + C_{OD1} + C_{AG} + C_{DBEF} + C_{BEF} + C_{DI}) \quad (10)$$

In the third modification of the first embodiment, the capacitance value C' between the drive electrode COML and the electrode SUS when a force is applied to the input surface IS can be represented by Expression (11) below.

$$C'=C_G \times C_{OD1} \times C_{AG}' \times C_{DBEF} \times C_{BEF} \times C_{DI}/(C_G+C_{OD1}+C_{AG}'+C_{DBEF}+C_{BEF}+C_{DI}) \quad (11)$$

At this time, the capacitance $C_{AG}'$ generated by the air layer AG increases by $\Delta C_{AG}$ from capacitance $C_{AG}$ generated by the air layer AG when no force is applied to the input surface IS, and is represented by Expression (2) above.

Fourth Modification

Figure 34:
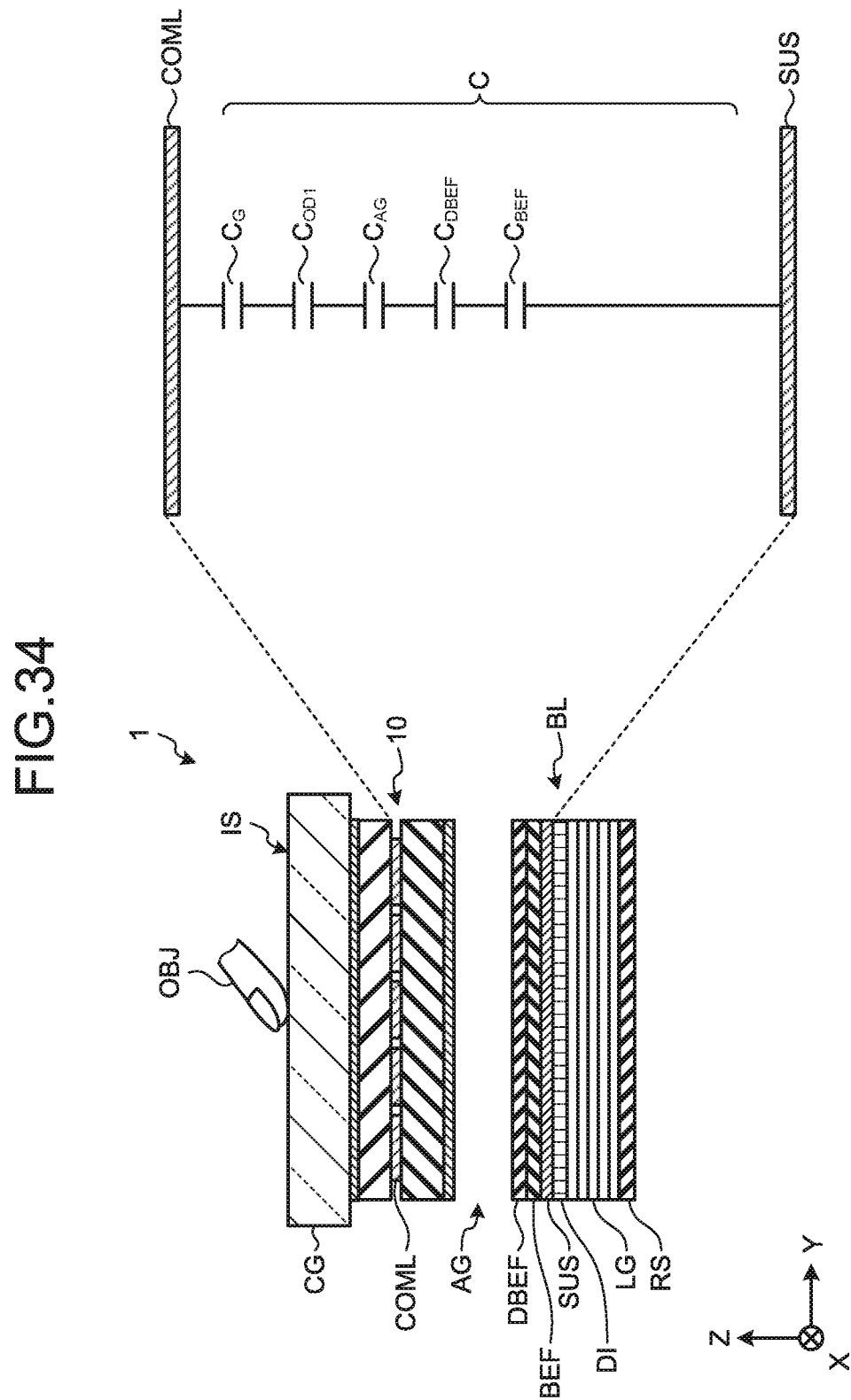
FIG. 34 illustrates a sectional view and an equivalent circuit diagram of the display apparatus with a touch detection function according to a fourth modification of the first embodiment when no force is applied to the input surface thereof.
Figure 35:
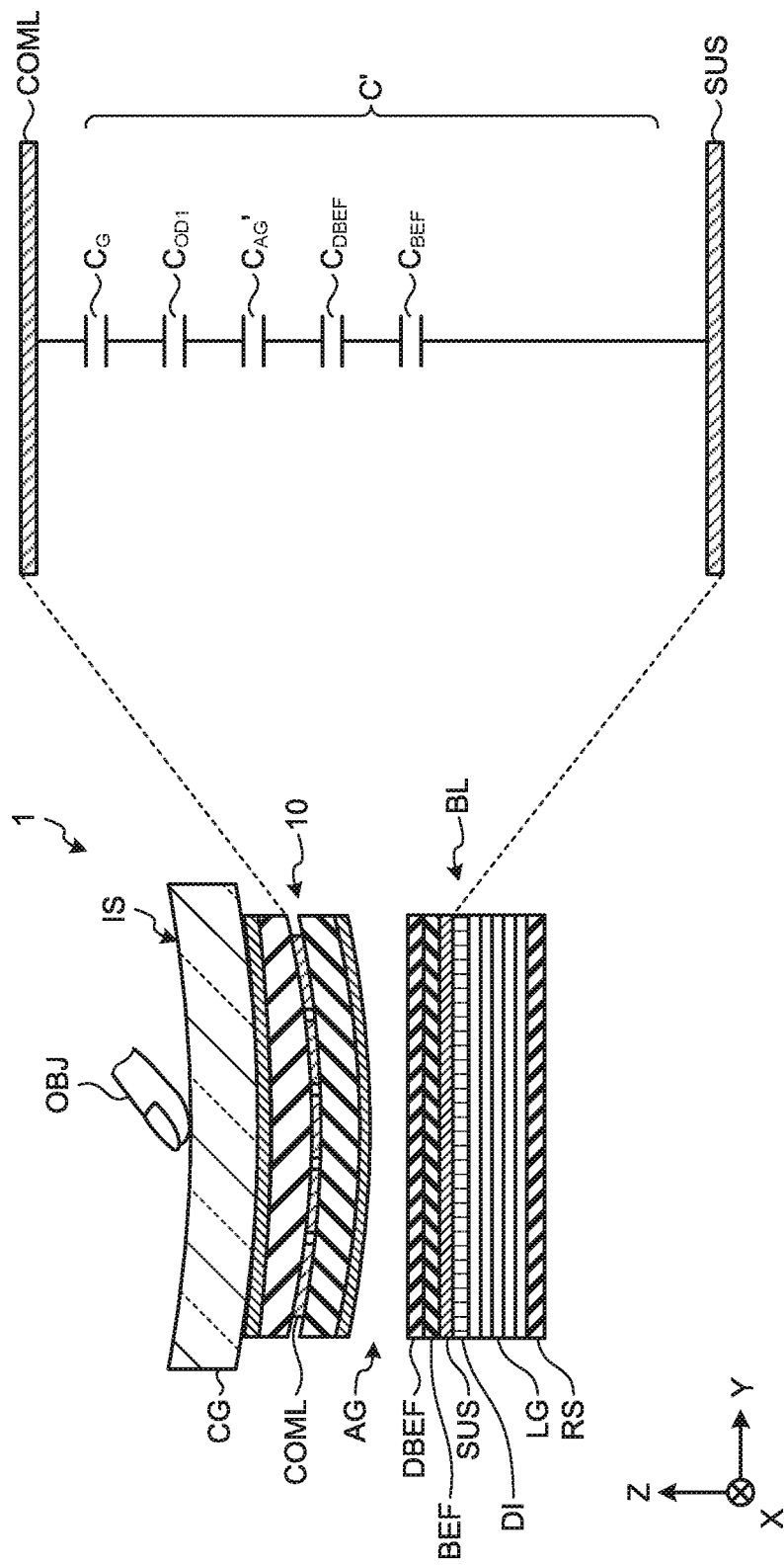
FIG. 35 illustrates a sectional view and an equivalent circuit diagram of the display apparatus with a touch detection function according to the fourth modification of the first embodiment when a force is applied to the input surface thereof.

FIG. 34 illustrates a sectional view and an equivalent circuit diagram of the display apparatus with a touch detection function according to a fourth modification of the first embodiment when no force is applied to the input surface thereof. FIG. 35 illustrates a sectional view and an equivalent circuit diagram of the display apparatus with a touch detection function according to the fourth modification of the first embodiment when a force is applied to the input surface thereof. As illustrated in FIGS. 34 and 35, in the fourth modification of the first embodiment, the electrodes SUS are provided between the brightness enhancement film BEF and the light diffusing sheet DI. In this case, the capacitance value C between the drive electrode COML and the electrode SUS when no force is applied to the input surface IS can be represented by Expression (12) below.

$$C=C_G \times C_{OD1} \times C_{AG} \times C_{DBEF} \times C_{BEF}/(C_G+C_{OD1}+C_{AG}+C_{DBEF}+C_{BEF}) \quad (12)$$

In the fourth modification of the first embodiment, the capacitance value C' between the drive electrode COML and the electrode SUS when a force is applied to the input surface IS can be represented by Expression (13) below.

$$C'=C_G \times C_{OD1} \times C_{AG}' \times C_{DBEF} \times C_{BEF}/(C_G+C_{OD1}+C_{AG}'+C_{DBEF}+C_{BEF}) \quad (13)$$

At this time, the capacitance $C_{AG}'$ generated by the air layer AG increases by $\Delta C_{AG}$ from capacitance $C_{AG}$ generated by the air layer AG when no force is applied to the input surface IS, and is represented by Expression (2) above.

Fifth Modification

Figure 36:
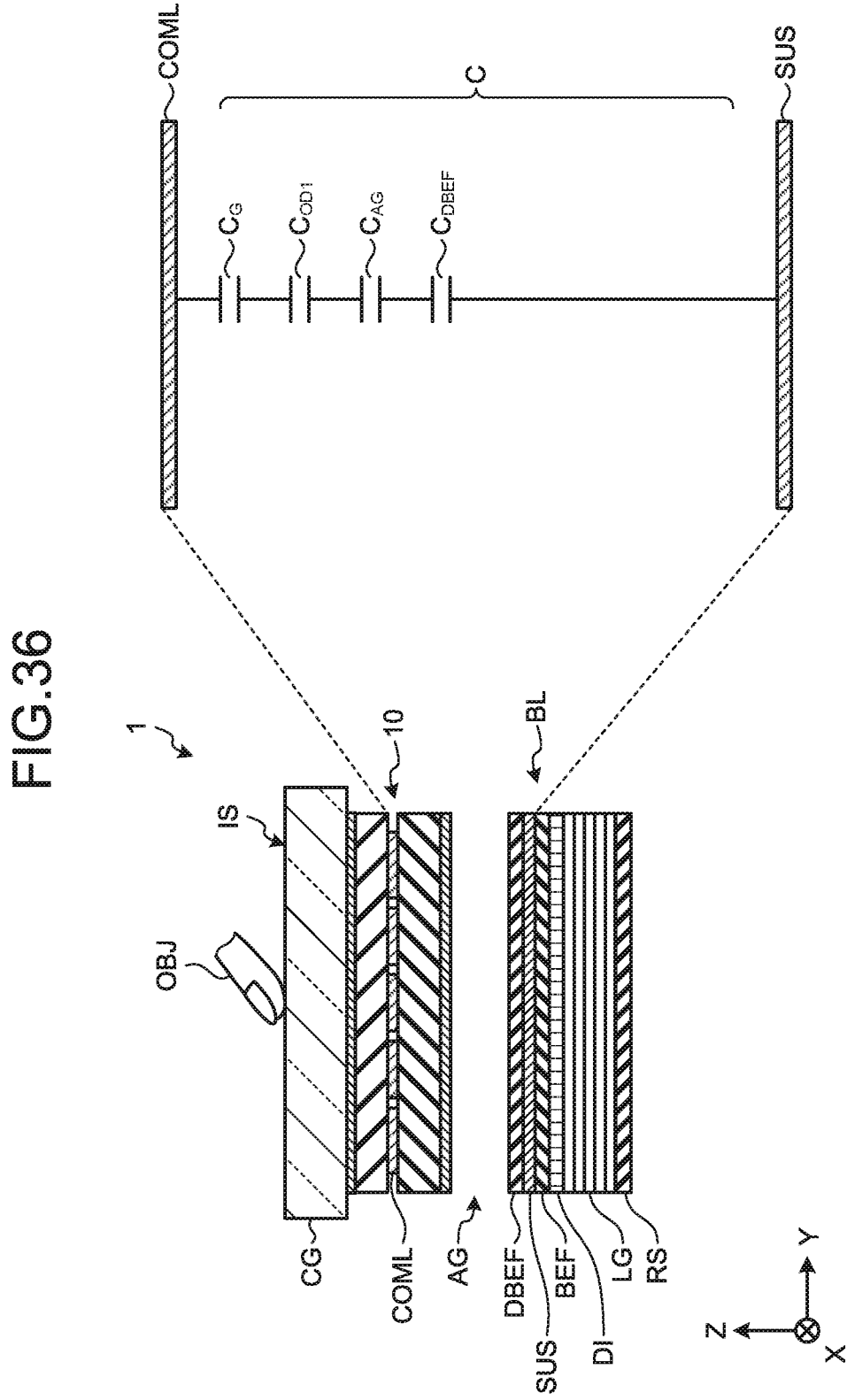
FIG. 36 illustrates a sectional view and an equivalent circuit diagram of the display apparatus with a touch detection function according to a fifth modification of the first embodiment when no force is applied to the input surface thereof.
Figure 37:
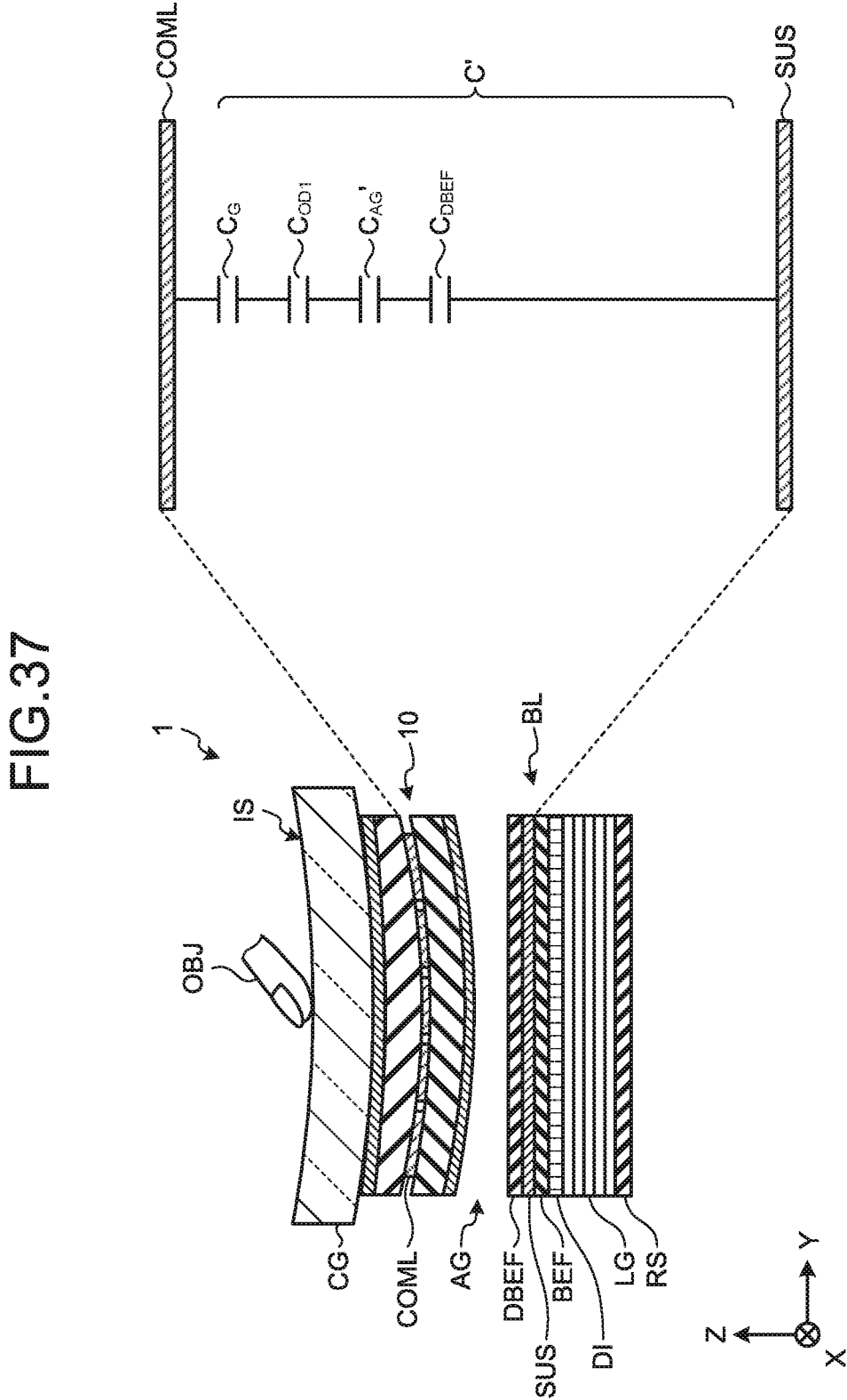
FIG. 37 illustrates a sectional view and an equivalent circuit diagram of the display apparatus with a touch detection function according to the fifth modification of the first embodiment when a force is applied to the input surface thereof.

FIG. 36 illustrates a sectional view and an equivalent circuit diagram of the display apparatus with a touch detection function according to a fifth modification of the first embodiment when no force is applied to the input surface thereof. FIG. 37 illustrates a sectional view and an equivalent circuit diagram of the display apparatus with a touch detection function according to the fifth modification of the first embodiment when a force is applied to the input surface thereof. As illustrated in FIGS. 36 and 37, in the fifth modification of the first embodiment, the electrodes SUS are provided between the reflective polarizing film DBEF and the brightness enhancement film BEF. In this case, the capacitance value C between the drive electrode COML and the electrode SUS when no force is applied to the input surface IS can be represented by Expression (14) below.

$$C=C_G \times C_{OD1} \times C_{AG} \times C_{DBEF}/(C_G+C_{OD1}+C_{AG}+C_{DBEF}) \quad (14)$$

In the fifth modification of the first embodiment, the capacitance value C' between the drive electrode COML and the electrode SUS when a force is applied to the input surface IS can be represented by Expression (15) below.

$$C'=C_G \times C_{OD1} \times C_{AG}' \times C_{DBEF}/(C_G+C_{OD1}+C_{AG}'+C_{DBEF}) \quad (15)$$

At this time, the capacitance $C_{AG}'$ generated by the air layer AG increases by $\Delta C_{AG}$ from capacitance $C_{AG}$ generated by the air layer AG when no force is applied to the input surface IS, and is represented by Expression (2) above.

Sixth Modification

Figure 38:
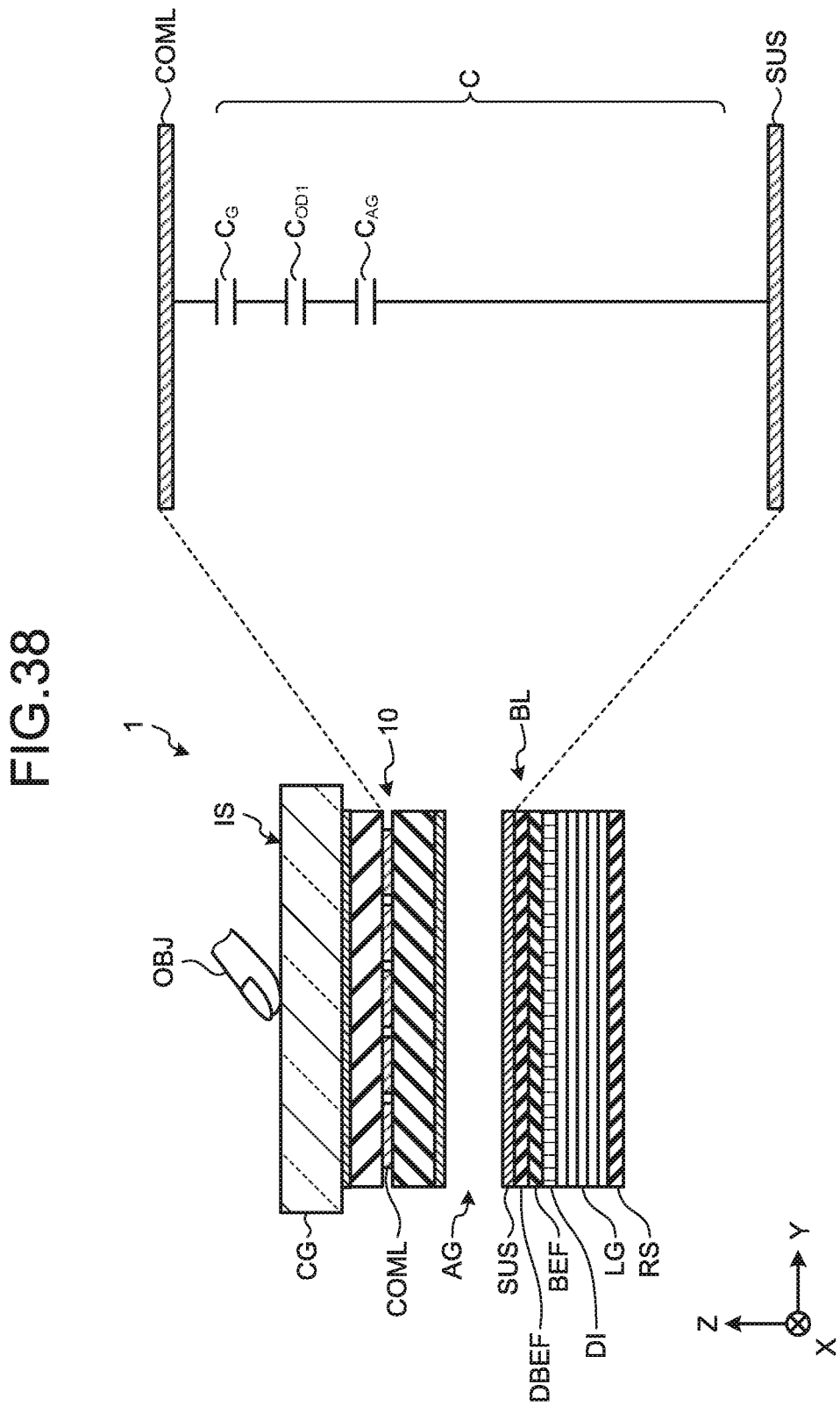
FIG. 38 illustrates a sectional view and an equivalent circuit diagram of the display apparatus with a touch detection function according to a sixth modification of the first embodiment when no force is applied to the input surface thereof.
Figure 39:
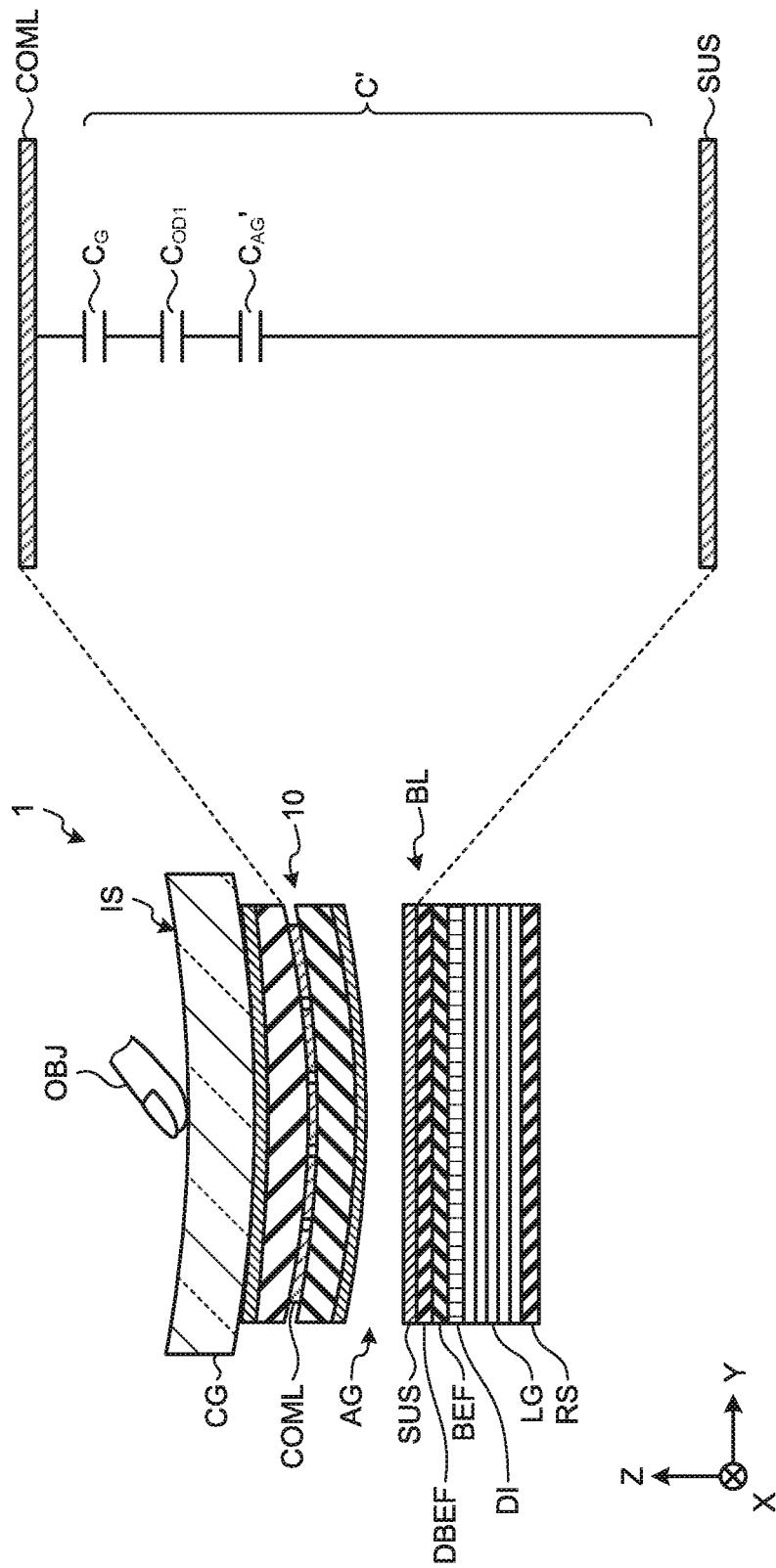
FIG. 39 illustrates a sectional view and an equivalent circuit diagram of the display apparatus with a touch detection function according to the sixth modification of the first embodiment when a force is applied to the input surface thereof.

FIG. 38 illustrates a sectional view and an equivalent circuit diagram of the display apparatus with a touch detection function according to a sixth modification of the first embodiment when no force is applied to the input surface thereof. FIG. 39 illustrates a sectional view and an equivalent circuit diagram of the display apparatus with a touch detection function according to the sixth modification of the first embodiment when a force is applied to the input surface thereof. As illustrated in FIGS. 38 and 39, in the sixth modification of the first embodiment, the electrodes SUS are provided on a surface on the input surface IS side of the layered body LB constituting the backlight device BL. In this case, the capacitance value C between the drive electrode COML and the electrode SUS when no force is applied to the input surface IS can be represented by Expression (16) below.

$$C=C_G \times C_{OD1} \times C_{AG}/(C_G+C_{OD1}+C_{AG}) \quad (16)$$

In the sixth modification of the first embodiment, the capacitance value C' between the drive electrode COML and the electrode SUS when a force is applied to the input surface IS can be represented by Expression (17) below.

$$C'=C_G \times C_{OD1} \times C_{AG}'/(C_G+C_{OD1}+C_{AG}') \quad (17)$$

At this time, the capacitance $C_{AG}'$ generated by the air layer AG increases by $\Delta C_{AG}$ from capacitance $C_{AG}$ generated by the air layer AG when no force is applied to the input surface IS, and is represented by Expression (2) above.

The above-described configurations according to the second to sixth modifications of the first embodiment can be obtained, for example, by making the electrodes SUS using light-transmitting conductive films, such as indium tin oxide (ITO) films.

As presented in the second to sixth modifications of the first embodiment, the display apparatus with a touch detection function 1 according to the first embodiment has a configuration in which the air layer AG (dielectric layer) is provided between the electrodes SUS and the drive electrodes COML, the air layer AG (dielectric layer) being changed in thickness by the bending of the display device with a touch detection function 10 when the detection target object OBJ applies a force to the input surface IS. With this configuration, the force information can be detected by detection of the change in the electrostatic capacitance between the drive electrode COML and the electrode SUS with the change in the distance d from the electrode SUS to the drive electrode COML.

In the first embodiment described above, both the mutual capacitance touch detection and the self-capacitance touch detection are performed. However, the display apparatus with a touch detection function 1 according to the first embodiment can be applied to a configuration of performing only the mutual capacitance touch detection, without performing the self-capacitance touch detection.

As described above, the display apparatus with a touch detection function 1 according to the embodiment includes the input surface IS, the touch detection electrode TDL, the drive electrode COML (first electrode), the electrode SUS (second electrode), the touch detection controller 40, and the force detection controller 50. The input surface IS is a surface to which a force is applied by the detection target object OBJ. The touch detection electrode TDL is provided on the first substrate 31 and faces the input surface IS. The drive electrode COML is provided on the second substrate 21 and faces the touch detection electrodes TDL. The electrode SUS faces the drive electrode COML across the dielectric layer. The touch detection controller 40 detects the contact or proximity of the detection target object OBJ to the input surface IS based on the electrostatic capacitance between the drive electrode COML and the touch detection electrode TDL. The force detection controller 50 detects a force applied to the input surface IS by the detection target object OBJ based on the electrostatic capacitance between the drive electrode COML and the electrode SUS. The force detection controller 50 corrects the force detection value Fcur based on the reference capacitance value Cref between the drive electrode COML and the electrode SUS in the non-contact state of the detection target object OBJ with the input surface IS at the reference temperature Tref, and outputs the corrected force detection value Fcor.

Alternatively, the display apparatus with a touch detection function 1 according to the first embodiment includes the input surface IS, the drive electrode COML (first electrode), the electrode SUS (second electrode), the touch detection controller 40, and the force detection controller 50. The input surface IS is a surface to which a force is applied by the detection target object OBJ. The drive electrode COML and the electrode SUS are disposed facing each other across the dielectric layer. The touch detection controller 40 detects the contact or proximity of the detection target object OBJ to the input surface IS. The force detection controller 50 detects a force applied to the input surface IS by the detection target object OBJ based on the electrostatic capacitance between the drive electrode COML and the electrode SUS. The force detection controller 50 corrects the force detection value Fcur based on the ratio (Cref/Ccur1) between the reference capacitance value Cref and the capacitance value Ccur1. The reference capacitance value Cref represents a capacitance value between the drive electrode COML and the electrode SUS in the non-contact state of the detection target object OBJ with the input surface IS at the reference temperature Tref. The capacitance value Ccur1 represents a capacitance value between the drive electrode COML and the electrode SUS in the non-contact state of the detection target object OBJ with the input surface IS.

More specifically, the force detection controller 50 corrects the force detection value Fcur by multiplying the force detection value Fcur by the ratio (Cref/Ccur1) between the reference capacitance value Cref and the capacitance value Ccur1. The reference capacitance value Cref represents a capacitance value between the drive electrode COML (first electrode) and the electrode SUS (second electrode) in the non-contact state of the detection target object OBJ with the input surface IS at the reference temperature Tref. The capacitance value Ccur1 represents a capacitance value between the drive electrode COML (first electrode) and the electrode SUS (second electrode) in the non-contact state of the detection target object OBJ with the input surface IS.

The configuration described above can reduce the influence of the temperature characteristics of the dielectric materials, which are included in the air layer AG and the layered body LB provided between the drive electrode COML (first electrode) and the electrode SUS (second electrode), on the force detection processing, and thus can restrain the reduction in accuracy of the detection in the force detection processing.

According to the present embodiment, the display apparatus with a touch detection function is obtained that is capable of restraining the reduction in accuracy of detection of a force applied to the input surface of the touchscreen panel.

2. Second Embodiment

Figure 40:
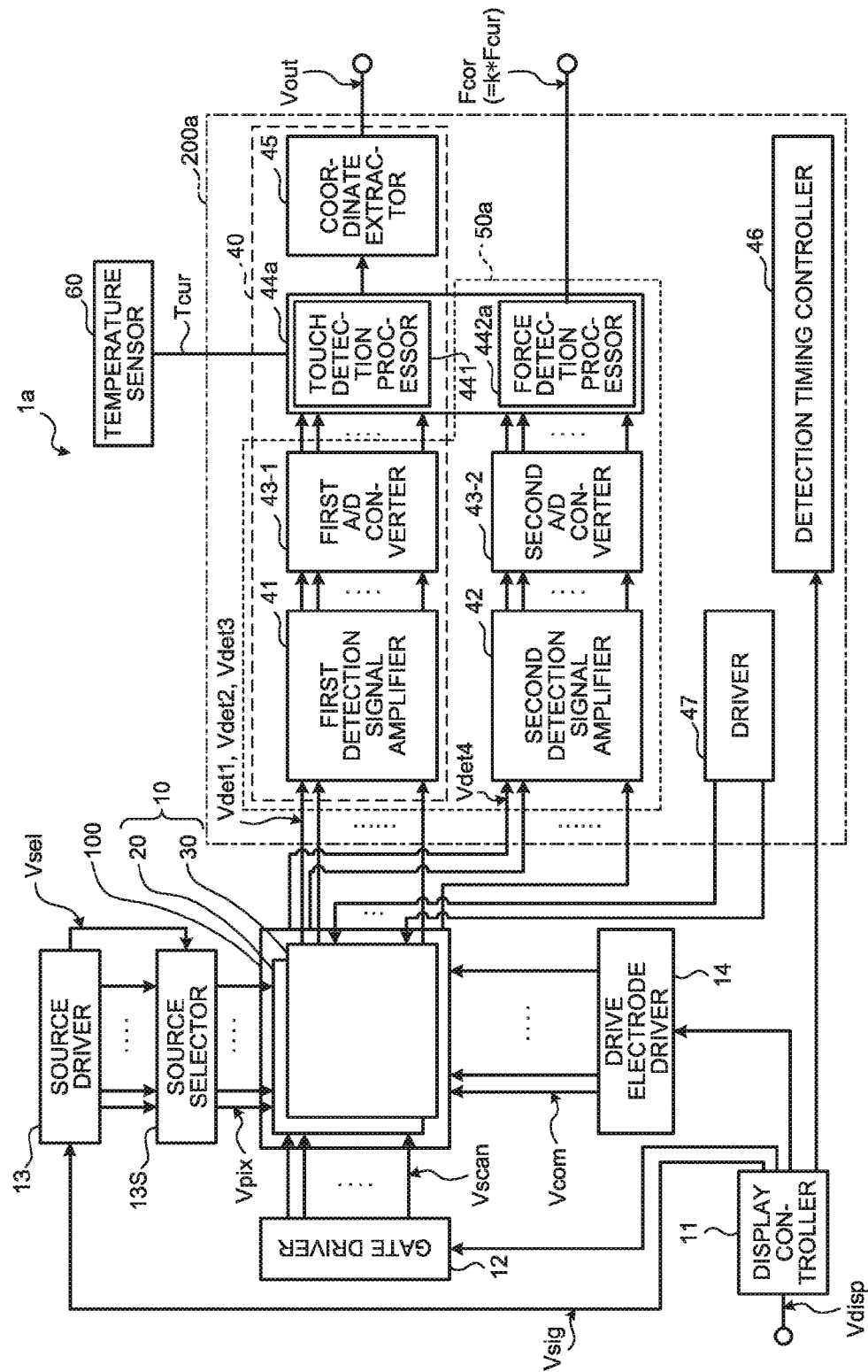
FIG. 40 is a block diagram illustrating a configuration example of a touch detector and a display device of a display apparatus with a touch detection function according to a second embodiment.

FIG. 40 is a block diagram illustrating a configuration example of a touch detector and a display device of a display apparatus with a touch detection function according to a second embodiment. Description will not be repeated for components that are equivalent to or the same as those of the first embodiment.

As described in the first embodiment, the display apparatus with a touch detection function 1*a*, includes members such as the cover member CG, the adhesive layer AL, the second optical device OD2, the first substrate 31, the second substrate 21, the first optical device OD1, the air layer AG, the reflective polarizing film DBEF, the brightness enhancement film BEF, the light diffusing sheet DI, the light guide LG, and the light reflector RS. Each of the above members includes a dielectric material having its own temperature characteristics. Thus, the capacitance C between the drive electrode COML and the electrode SUS changes due to the temperature characteristics of the dielectric materials provided between the drive electrode COML and the electrode SUS. The change in the capacitance C between the drive electrode COML and the electrode SUS is also caused by changes in thickness of the respective layers due to thermal expansion of these dielectric materials. The change in the capacitance C between the drive electrode COML and the electrode SUS with the change in thickness of respective layers due to the temperature characteristics and the thermal expansion of the dielectric materials can affect the force detection processing.

As illustrated in FIG. 40, the present embodiment includes a temperature sensor 60 in addition to the configuration of the first embodiment. A force detection controller 50*a* corrects the force detection value by multiplying the force detection value by a predetermined correction coefficient (first correction coefficient) depending on the temperature detected by the temperature sensor 60.

Figure 41:
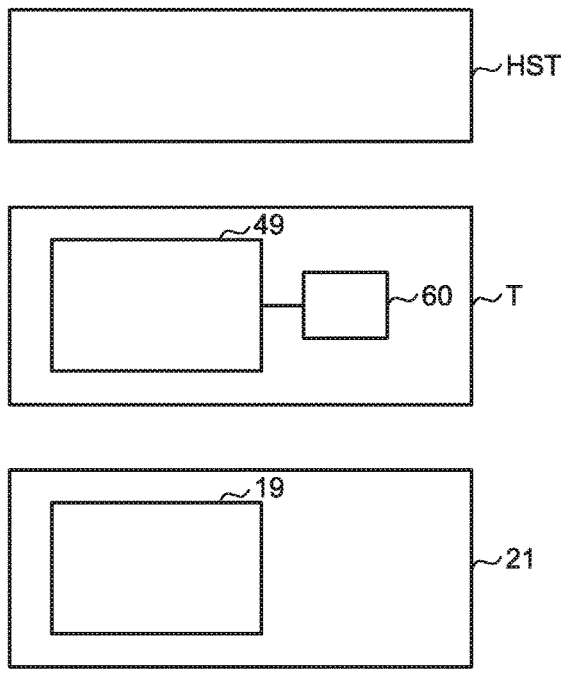
FIG. 41 is a diagram illustrating a first arrangement example of a temperature sensor of the display apparatus with a touch detection function according to the second embodiment.
Figure 42:
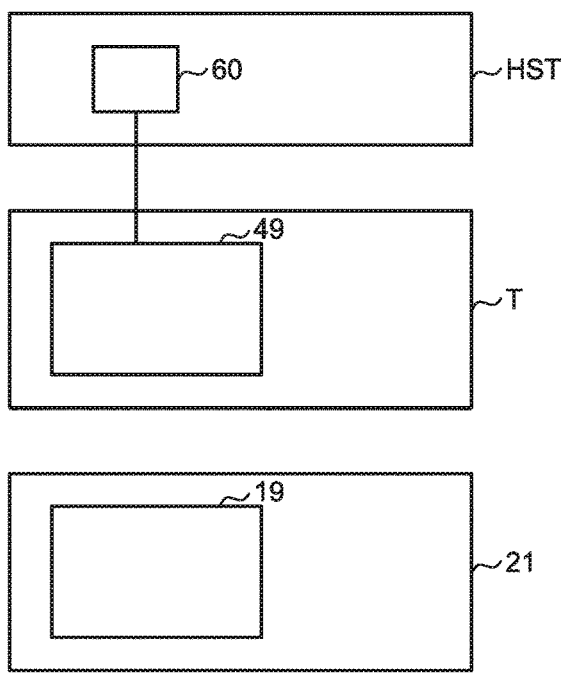
FIG. 42 is a diagram illustrating a second arrangement example of the temperature sensor of the display apparatus with a touch detection function according to the second embodiment.
Figure 45:
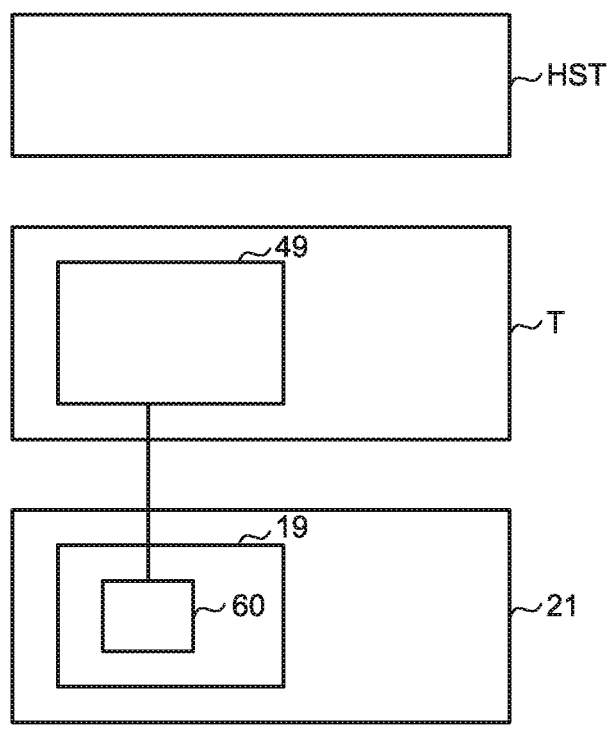
FIG. 45 is a diagram illustrating a fifth arrangement example of the temperature sensor of the display apparatus with a touch detection function according to the second embodiment.

FIG. 41 is a diagram illustrating a first arrangement example of the temperature sensor of the display apparatus with a touch detection function according to the second embodiment. FIG. 42 is a diagram illustrating a second arrangement example of the temperature sensor of the display apparatus with a touch detection function according to the second embodiment. FIG. 43 is a diagram illustrating a third arrangement example of the temperature sensor of the display apparatus with a touch detection function according to the second embodiment. FIG. 44 is a diagram illustrating a fourth arrangement example of the temperature sensor of the display apparatus with a touch detection function according to the second embodiment. FIG. 45 is a diagram illustrating a fifth arrangement example of the temperature sensor of the display apparatus with a touch detection function according to the second embodiment.

The present embodiment is configured to detect the temperature in the casing of the display apparatus with a touch detection function 1*a* that is substitutable for the temperature of each of the dielectric materials included in the display apparatus with a touch detection function 1*a*. The temperature sensor 60 can be mounted, for example, on the flexible printed circuit board T on which the touch IC 49 is mounted, as illustrated in FIG. 41. Alternatively, for example, as illustrated in FIG. 42, the host HST may include the temperature sensor 60. Still alternatively, for example, as illustrated in FIG. 43, the temperature sensor 60 may be mounted together with the COG 19 on the second substrate 21. Still alternatively, for example, the temperature sensor 60 may be included in the touch IC 49 as illustrated in FIG. 44, or may be included in the COG 19 as illustrated in FIG. 45.

FIG. 46 is a diagram illustrating an exemplary relation between the correction coefficient and the temperature of the display apparatus with a touch detection function according to the second embodiment. FIG. 47 is a diagram illustrating an example of a first correction coefficient table of the display apparatus with a touch detection function according to the second embodiment. In FIG. 46, the horizontal axis represents the temperature, and the vertical axis represents the correction coefficient for multiplying the force detection value. The examples in FIGS. 46 and 47 illustrate an example in which the temperature b is the reference temperature Tref, and a correction coefficient k is 1 (k=1) at that temperature.

Depending on the location of the temperature sensor 60, a temperature different from those of the dielectric materials included in the display apparatus with a touch detection function 1a is detected in some cases. For example, FIG. 42 illustrates an example in which the host HST includes the temperature sensor 60, specifically, in which the temperature sensor 60 is included in the CPU package. FIG. 44 illustrates an example in which the temperature sensor 60 is included in the touch IC 49. FIG. 45 illustrates an example in which the temperature sensor 60 is included in the COG 19. If the display apparatus with a touch detection function 1a has a configuration illustrated in FIG. 42, 44 or 45, the temperature may increase due to heat generation by an IC chip, such as the CPU, the touch IC 49, or the COG 19. Consequently, the reference temperature Tref (that is, the temperature at which the correction coefficient k is 1 (k=1)) varies depending on the location of the temperature sensor 60. For this reason, the reference temperature Tref is preferably set to a temperature detected by the temperature sensor 60 at a recommended operating temperature (for example, under the environment of room temperature 25° C.) assumed in the display apparatus with a touch detection function 1a, for example.

FIG. 46 illustrates an example in which the value of the correction coefficient k decreases with increase in the temperature, that is, the slope of the graph is negative. The slope of the graph, however, varies depending on the material types of the dielectric materials and/or the combination of the dielectric materials, and can be positive. FIG. 46 illustrates an example in which the correction coefficient k linearly changes with the temperature. The correction coefficient k can, however, change along a quadratic curve.

The following describes the correction coefficient k of the display apparatus with a touch detection function 1a according to the second embodiment.

As described using FIG. 23 in the first embodiment, the proportional relation represented by Expressions (4) and (5) holds between the force detection value F and the capacitance value between the drive electrode COML and the electrode SUS corresponding to the temperature. Expressions (18) and (19) below are obtained by deforming Expressions (4) and (5) with respect to the force detection value Fb at the temperature b.

$$Fb=(Cb/Ca)Fa \qquad (18)$$

$$Fb=(Cb/Cc)Fc \qquad (19)$$

Assume that Cref denotes the reference capacitance value between the drive electrode COML and the electrode SUS in the non-contact state at the reference temperature Tref (for example, under the environment of room temperature 25° C.), Ccur1 denotes the capacitance value (first capacitance value) between the drive electrode COML and the electrode SUS in the non-contact state, Ccur2 denotes the capacitance value (second capacitance value) between the drive electrode COML and the electrode SUS in the contact state, Fcur denotes the force detection value that is the amount of change in the electrostatic capacitance between the drive electrode COML and the electrode SUS, and Fcor denotes the corrected force detection value to be obtained. In this case, Expressions (20) and (21) below are obtained.

$$Fcur=Ccur2-Ccur1 \qquad (20)$$

$$Fcor=(Cref/Ccur1)*Fcur \qquad (21)$$

In Expression (21) above, (Cref/Ccur1) is a fixed value determined as the ratio between the reference capacitance value Cref and the capacitance value Ccur1 (first capacitance value). The reference capacitance value Cref represents a capacitance value between the drive electrode COML and the electrode SUS in the non-contact state at the reference temperature Tref. The capacitance value Ccur1 represents a capacitance value between the drive electrode COML and the electrode SUS in the non-contact state. Hence, Expression (22) below is obtained by setting this value (Cref/Ccur1) as the correction coefficient k ((Cref/Ccur1)=k).

$$Fcor=k*Fcur \qquad (22)$$

In the force detection controller 50a, the ratio (Cref/Ccur1) between the reference capacitance value Cref and the capacitance value Ccur1 is set in advance as the correction coefficient k. As described above, the reference capacitance value Cref represents a capacitance value between the drive electrode COML and the electrode SUS in the non-contact state at the reference temperature Tref, and the capacitance value Ccur1 represents a capacitance value between the drive electrode COML and the electrode SUS in the non-contact state. The force detection controller 50a can obtain the corrected force detection value Fcor corrected from the force detection value Fcur by multiplying the force detection value Fcur (=Ccur2−Ccur1) by the correction coefficient k.

Figure 48:
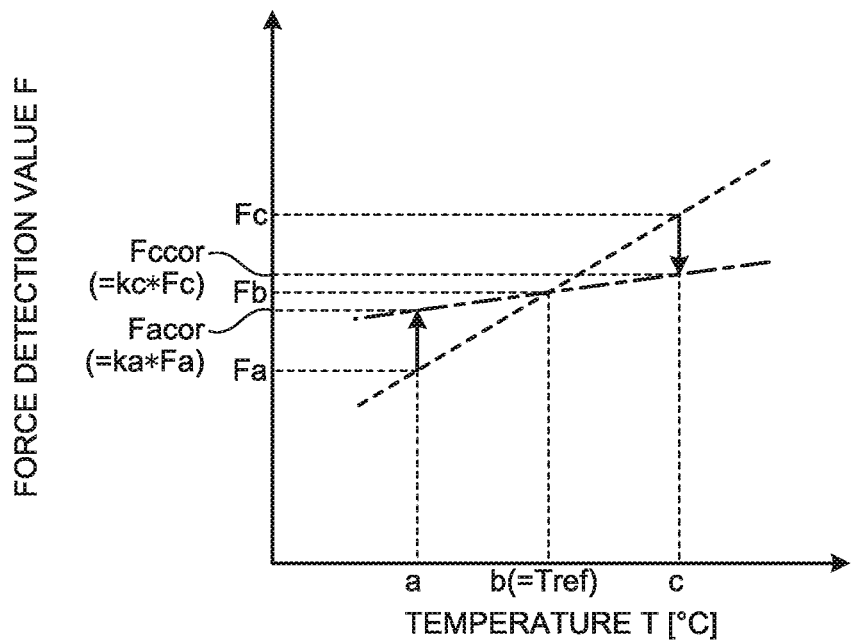
FIG. 48 is a diagram illustrating exemplary corrected force detection values when the force applied to the input surface is constant, in the display apparatus with a touch detection function according to the second embodiment.

FIG. 48 is a diagram illustrating examples of the corrected force detection value when the force applied to the input surface is constant, in the display apparatus with a touch detection function according to the second embodiment. In FIG. 48, the horizontal axis represents the temperature, and the vertical axis represents the force detection value F. In FIG. 48, the dashed line represents the force detection value before being corrected, and the long-dashed short-dashed line represents the force detection value after being corrected.

Figure 49:
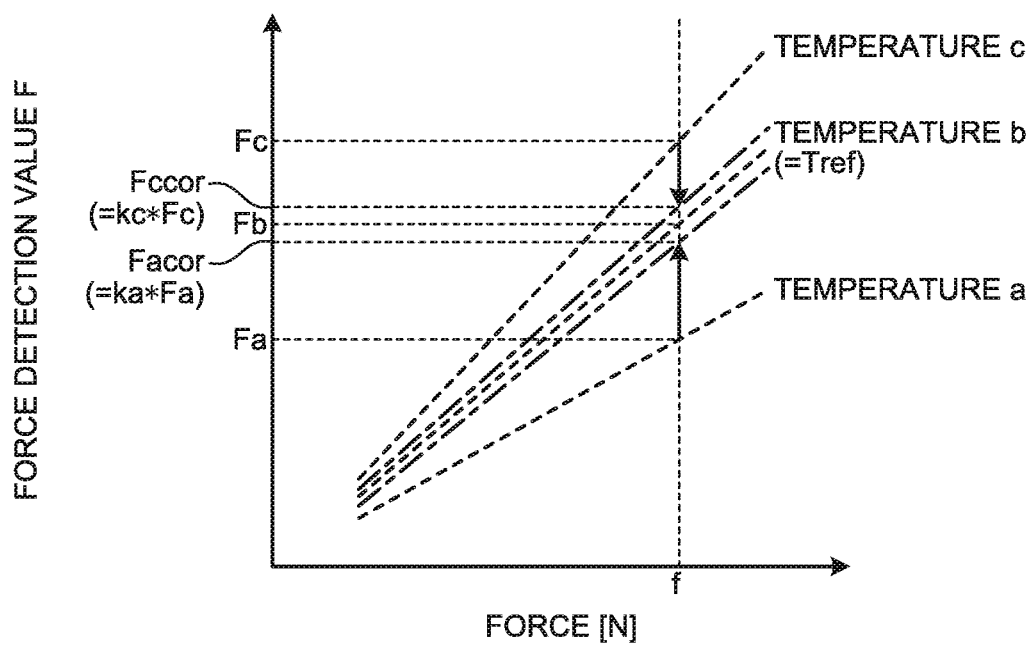
FIG. 49 is a diagram illustrating relations between a force applied to the input surface and the corrected force detection value in the display apparatus with a touch detection function according to the second embodiment.

FIG. 49 is a diagram illustrating relations between a force applied to the input surface and the corrected force detection value in the display apparatus with a touch detection function according to the second embodiment. In FIG. 49, the horizontal axis represents a force applied to the input surface, and the vertical axis represents a force detection value F. In FIG. 49, the dashed line represents the force detection value before being corrected, and the long-dashed short-dashed line represents the force detection value after being corrected.

FIGS. 48 and 49 illustrate an example in which the temperature b is assumed to be the reference temperature Tref.

For example, as illustrated in FIG. 48, the force detection value Fa at the temperature a can be corrected by using Expressions (20) and (22) above, thereby obtaining the corrected force detection value Facor. Specifically, the corrected force detection value Facor can be obtained by multiplying the force detection value Fa at the temperature a by a correction coefficient ka, the correction coefficient ka being determined as the ratio between the reference capacitance value Cref and the capacitance value Cacur1. The reference capacitance value Cref represents a capacitance value between the drive electrode COML and the electrode SUS in the non-contact state at the reference temperature Tref, and the capacitance value Cacur1 represents a capacitance value between the drive electrode COML and the electrode SUS in the non-contact state.

For example, as illustrated in FIG. 48, the force detection value Fc at the temperature c can be corrected by using Expressions (20) and (22) above, thereby obtaining the corrected force detection value Fccor. Specifically, the corrected force detection value Fccor can be obtained by multiplying the force detection value Fc at the temperature c by a correction coefficient kc, the correction coefficient kc being determined as the ratio between the reference capacitance value Cref and the capacitance value Cccur1. The reference capacitance value Cref represents a capacitance value between the drive electrode COML and the electrode SUS in the non-contact state at the reference temperature Tref, and the capacitance value Cccur1 represents a capacitance value between the drive electrode COML and the electrode SUS in the non-contact state.

These calculations correct the force detection value based on the change in the capacitance value between the drive electrode COML and the electrode SUS generated due to the temperature characteristics of the dielectric materials included in the second substrate 21, the first optical device OD1, the air layer AG, the reflective polarizing film DBEF, the brightness enhancement film BEF, the light diffusing sheet DI, the light guide LG, and the light reflector RS, which are arranged between the drive electrode COML and the electrode SUS, as illustrated in FIG. 49.

2-1. Configuration and Operation of Force Detection Controller

In the present embodiment, for example, a force detection processor 442a of a signal processor 44a in the force detection controller 50a illustrated in FIG. 40 performs the force detection processing described above.

Figure 50:
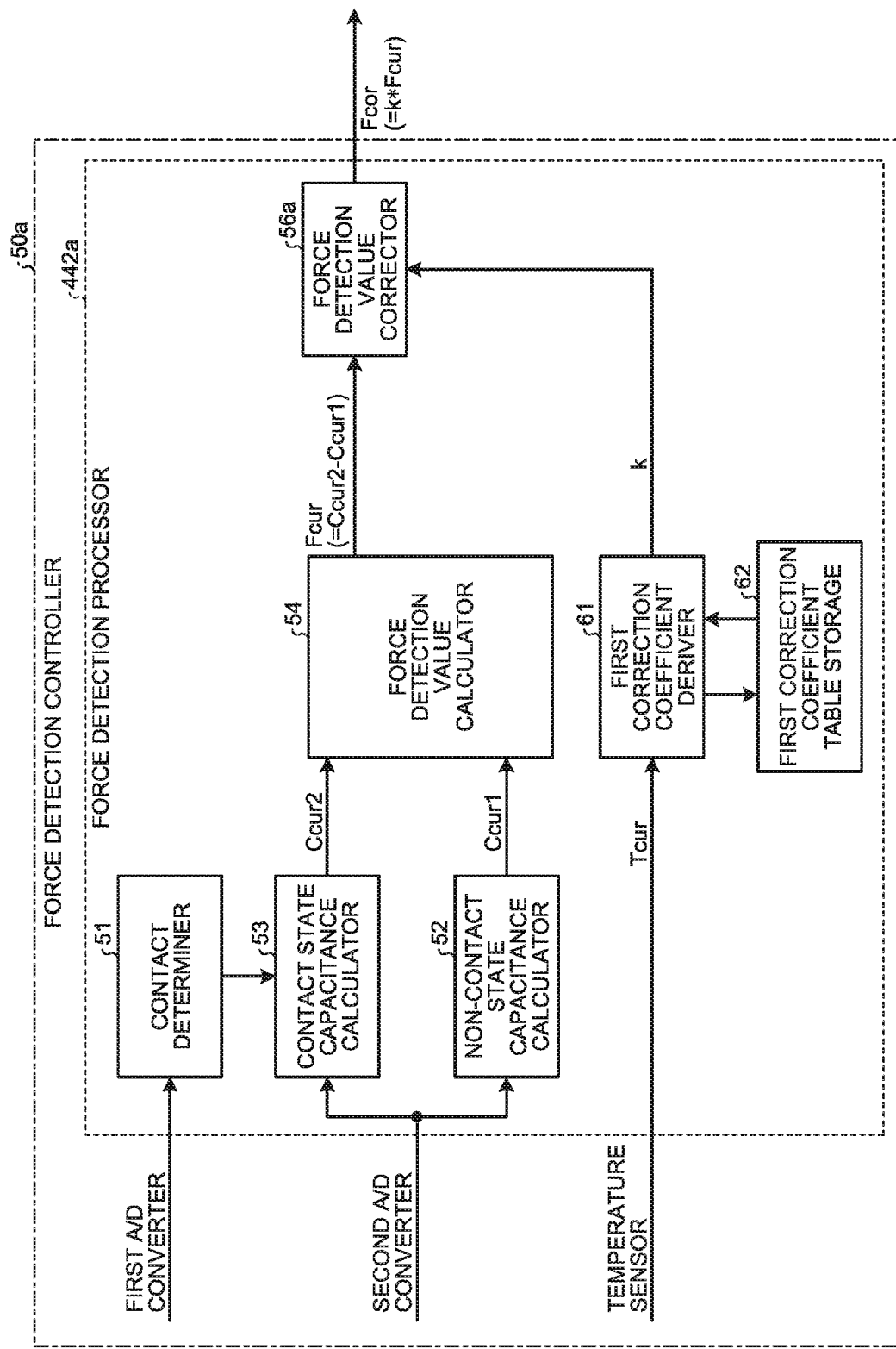
FIG. 50 is a diagram illustrating functional blocks of a force detection controller of the display apparatus with a touch detection function according to the second embodiment.

FIG. 50 is a diagram illustrating functional blocks of the force detection controller of the display apparatus with a touch detection function according to the second embodiment.

The force detection processor 442a of the force detection controller 50a includes the contact determiner 51, the non-contact state capacitance calculator 52, the contact state capacitance calculator 53, the force detection value calculator 54, a force detection value corrector 56a, a first correction coefficient deriver 61, and a first correction coefficient table storage 62. The first correction coefficient table storage 62 stores in advance the first correction coefficient table. The first correction coefficient table may be individually set before shipment of the display apparatus with a touch detection function 1a according to the second embodiment. The first correction coefficient table storage 62 is made up of, for example, a register and/or the like.

The contact determiner 51, the non-contact state capacitance calculator 52, the contact state capacitance calculator 53, the force detection value calculator 54, the force detection value corrector 56a, and the first correction coefficient deriver 61 are configured, for example, as circuits. The contact determiner 51, the non-contact state capacitance calculator 52, the contact state capacitance calculator 53, the force detection value calculator 54, the force detection value corrector 56a, and the first correction coefficient deriver 61 may be implemented by execution of programs by the touch IC 49. In this case, the contact determiner 51, the non-contact state capacitance calculator 52, the contact state capacitance calculator 53, the force detection value calculator 54, the force detection value corrector 56a, and the first correction coefficient deriver 61 may be implemented by execution of the programs by the COG 19 or the host HST, or may be implemented by execution of the programs by cooperation of two or more of the COG 19, the touch IC 49, and the host HST.

The operations of the contact determiner 51, the non-contact state capacitance calculator 52, the contact state capacitance calculator 53, and the force detection value calculator 54 are the same as those in the first embodiment.

The first correction coefficient deriver 61 refers to the first correction coefficient table stored in the first correction coefficient table storage 62 to derive the correction coefficient k corresponding to a temperature Tcur detected by the temperature sensor 60, and outputs the correction coefficient k to the force detection value corrector 56a.

The force detection value corrector 56a receives the force detection value Fcur from the force detection value calculator 54. The force detection value corrector 56a receives the correction coefficient k from the first correction coefficient deriver 61. The force detection value corrector 56a outputs the corrected force detection value Fcor (=k*Fcur) obtained by multiplying the force detection value Fcur by the correction coefficient k.

In the present embodiment, the force detection controller 50a performs the force detection based on the capacitance values detected by the electrodes SUS during the mutual capacitance detection period 139 described in the first embodiment (refer to FIG. 27).

Figure 51:
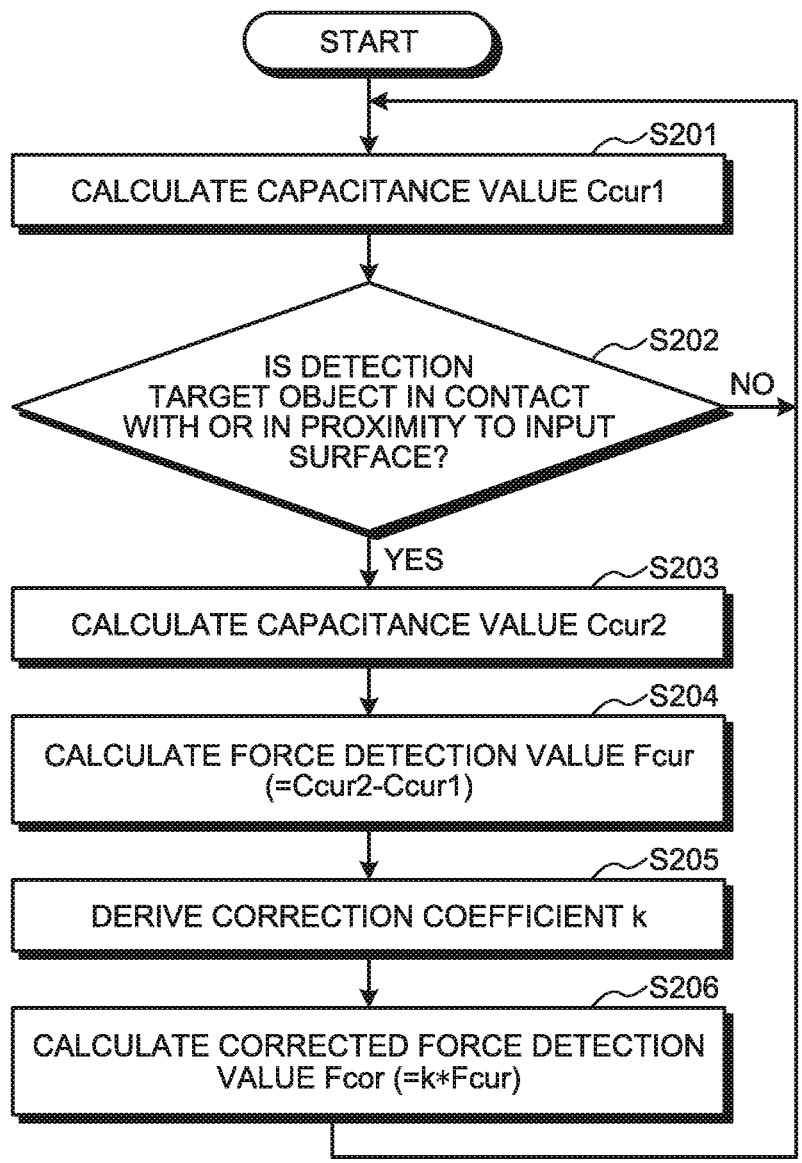
FIG. 51 is a flowchart illustrating a process executed by the force detection controller of the display apparatus with a touch detection function according to the second embodiment.

FIG. 51 is a flowchart illustrating a process executed by the force detection controller of the display apparatus with a touch detection function according to the second embodiment. The process illustrated in FIG. 51 is executed during the mutual capacitance detection period 139 described above.

In the flowchart illustrated in FIG. 51, processing from Step S201 to Step S204 is substantially the same as the processing from Step S101 to Step S104 in the flowchart of the first embodiment illustrated in FIG. 28, and thus, the description thereof will not be repeated.

The first correction coefficient deriver 61 refers to the first correction coefficient table stored in the first correction coefficient table storage 62 to derive the correction coefficient k corresponding to the temperature Tcur detected by the temperature sensor 60, and outputs the correction coefficient k to the force detection value corrector 56a (Step S205).

The force detection value corrector 56a receives the force detection value Fcur from the force detection value calculator 54. The force detection value corrector 56a receives the correction coefficient k from the first correction coefficient deriver 61. The force detection value corrector 56a multiplies the force detection value Fcur by the correction coefficient k to calculate the corrected force detection value Fcor (=k*Fcur), and outputs the corrected force detection value Fcor (Step S206). The process then returns to the processing at Step S201.

The execution of the process described above can reduce the influence of the temperature characteristics of the dielectric materials, which are included in the air layer AG and the layered body LB provided between the drive electrode COML and the electrode SUS, on the force detection processing, and thus can restrain the reduction in accuracy of the detection in the force detection processing.

As described above, the display apparatus with a touch detection function 1a according to the second embodiment includes the temperature sensor 60 for detecting the temperature in the casing. The force detection controller 50a corrects the force detection value Fcur according to the temperature Tcur detected by the temperature sensor 60.

More specifically, in the force detection controller 50a, the ratio (Cref/Ccur1) between the reference capacitance value Cref and the capacitance value Ccur1 is set in advance as the correction coefficient k. The reference capacitance value Cref represents a capacitance value between the drive electrode COML (first electrode) and the electrode SUS (second electrode) in the non-contact state of the detection target object OBJ with the input surface IS at the reference temperature Tref. The capacitance value Ccur1 represents a capacitance value between the drive electrode COML (first electrode) and the electrode SUS (second electrode) in the non-contact state of the detection target object OBJ with the input surface IS. The force detection controller 50a corrects the force detection value Fcur by multiplying the force detection value Fcur by the correction coefficient (first correction coefficient) k.

Furthermore, the force detection controller 50a corrects the force detection value Fcur according to the temperature detected by the temperature sensor 60 based on the first correction coefficient table associating the temperature with the correction coefficient (first correction coefficient) k.

The configuration described above can reduce the influence of the temperature characteristics of the dielectric materials, which are included in the air layer AG and the layered body LB arranged between the drive electrode COML (first electrode) and the electrode SUS (second electrode), on the force detection processing, and thus can restrain the reduction in accuracy of the detection in the force detection processing.

According to the present embodiment, the display apparatus with a touch detection function is obtained that is capable of restraining the reduction in accuracy of detection of a force applied to the input surface of the touchscreen panel.

3. Third Embodiment

Figure 52:
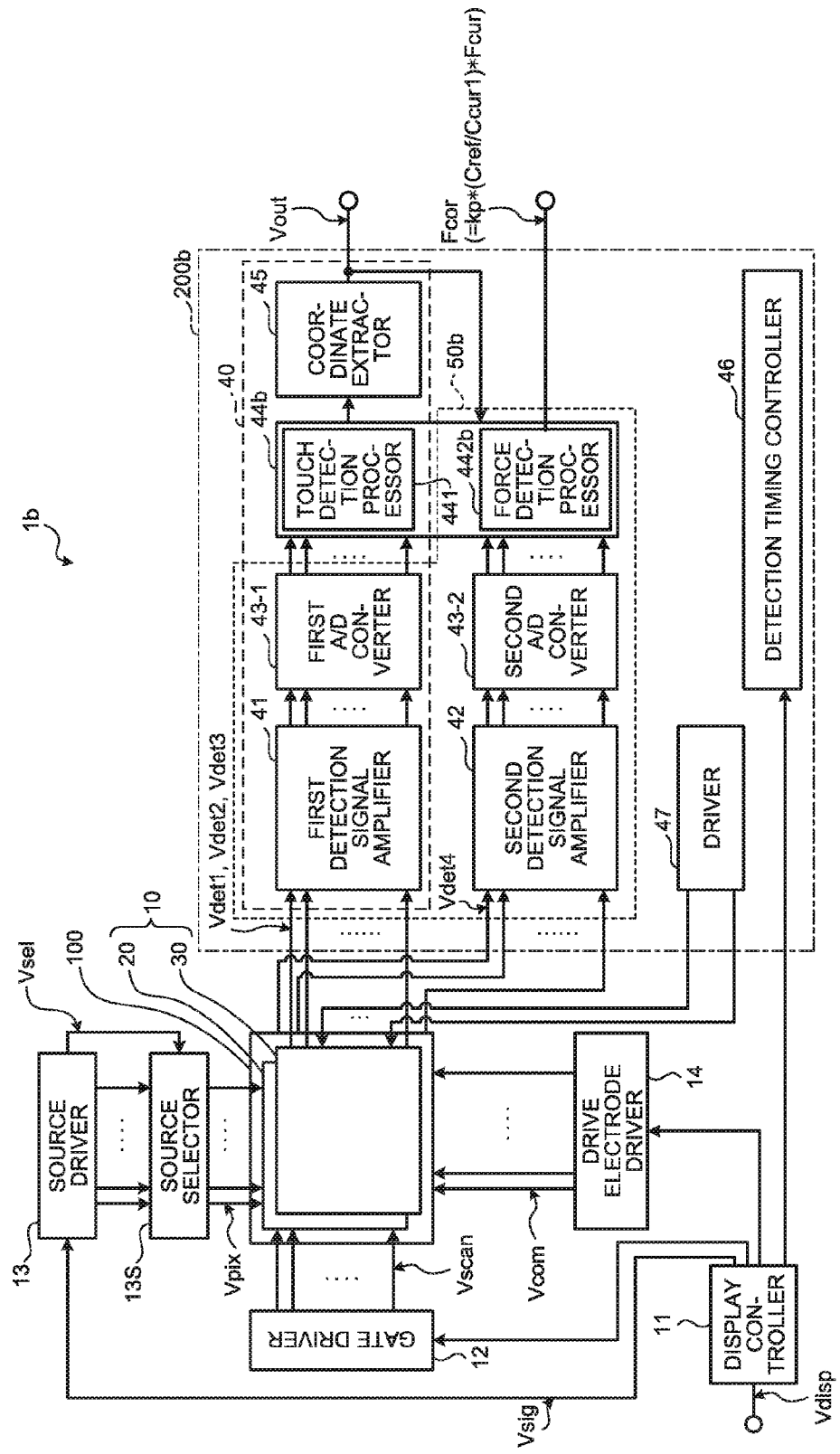
FIG. 52 is a block diagram illustrating a configuration example of a touch detector and a display device of a display apparatus with a touch detection function according to a third embodiment.

FIG. 52 is a block diagram illustrating a configuration example of the touch detector and the display device of the display apparatus with a touch detection function according to the third embodiment. Description will not be repeated for components that are equivalent to or the same as those of the first embodiment.

In the present embodiment, as illustrated in FIG. 52, the touch detection position Vout output from the coordinate extractor 45 of the touch detection controller 40 is entered into a force detection controller 50b. The force detection controller 50b corrects the force detection value by multiplying the force detection value by a predetermined correction coefficient (second correction coefficient) depending on the touch detection position Vout output from the coordinate extractor 45 of the touch detection controller 40.

Figure 53:
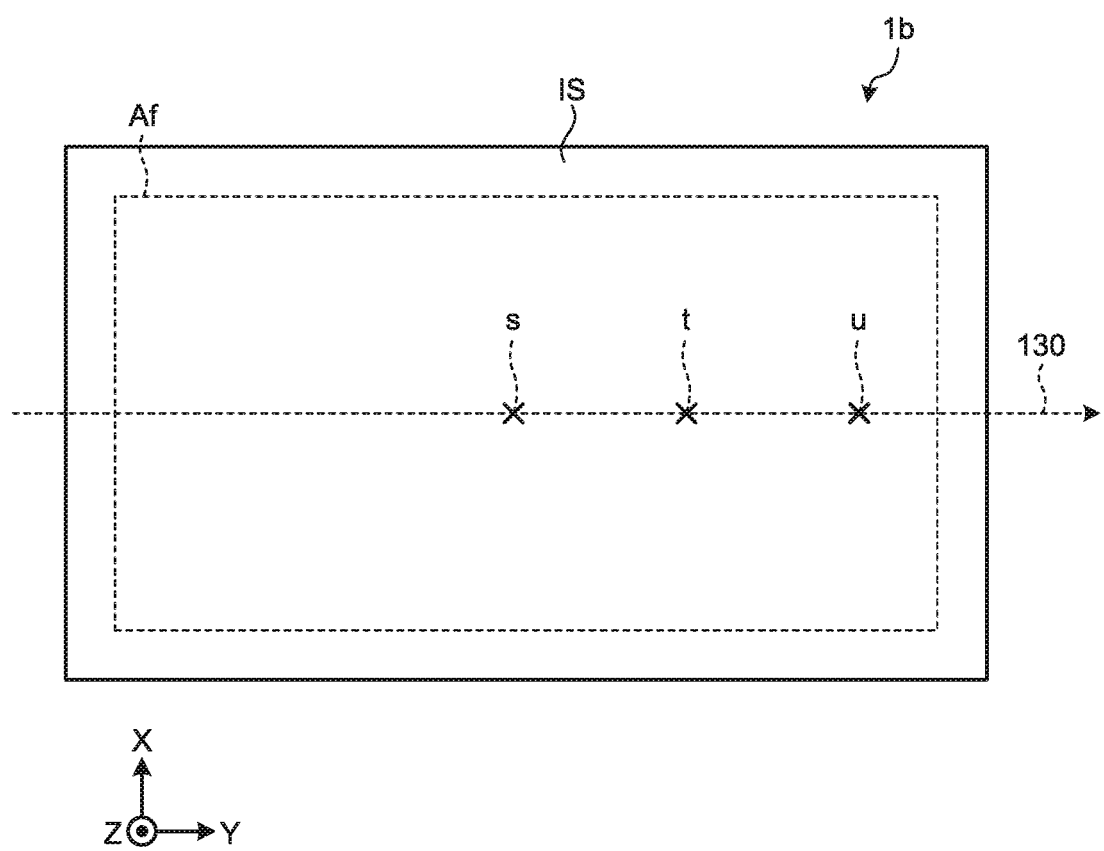
FIG. 53 is a plan view of the display apparatus with a touch detection function according to the third embodiment.

FIG. 53 is a plan view of the display apparatus with a touch detection function according to the third embodiment. In a force detection area Af, a straight line 130 parallel to the Y-axis direction and passing through the center in the X-axis direction of the force detection area Af is assumed.

Coordinates s are located at the central portion of the force detection area Af on the straight line 130. Coordinates u are located at a peripheral portion of the force detection area Af on the straight line 130. Coordinates t are located in the middle between the coordinates s and the coordinates u on the straight line 130.

A region including the central portion and the vicinity of the central portion of the input surface IS, that is, a region including the coordinates s and the vicinity of the coordinates s illustrated in FIG. 53 is more flexible than a region including the peripheral portion and the vicinity of the peripheral portion of the input surface IS, that is, a region including the coordinates u and the vicinity of the coordinates u illustrated in FIG. 53. In other words, the bending amount (deformation amount) of the display device with a touch detection function 10 when a certain force is applied to the central portion and/or the vicinity of the central portion of the input surface IS is larger than the bending amount of the display device with a touch detection function 10 when the same force is applied to the peripheral portion and/or the vicinity of the peripheral portion of the input surface IS.

That is to say, the bending amount of the display device with a touch detection function 10 when a certain force is applied to the coordinates s and/or the vicinity of the coordinates s is larger than the bending amount of the display device with a touch detection function 10 when the same force is applied to the coordinates t and/or the vicinity of the coordinates t; and the bending amount of the display device with a touch detection function 10 when the same force is applied to the coordinates t and/or the vicinity of the coordinates t is smaller than the bending amount of the display device with a touch detection function 10 when the same force is applied to the coordinates s and/or the vicinity of the coordinates s and larger than the bending amount of the display device with a touch detection function 10 when the same force is applied to the coordinates u and/or the vicinity of the coordinates u.

Figure 54:
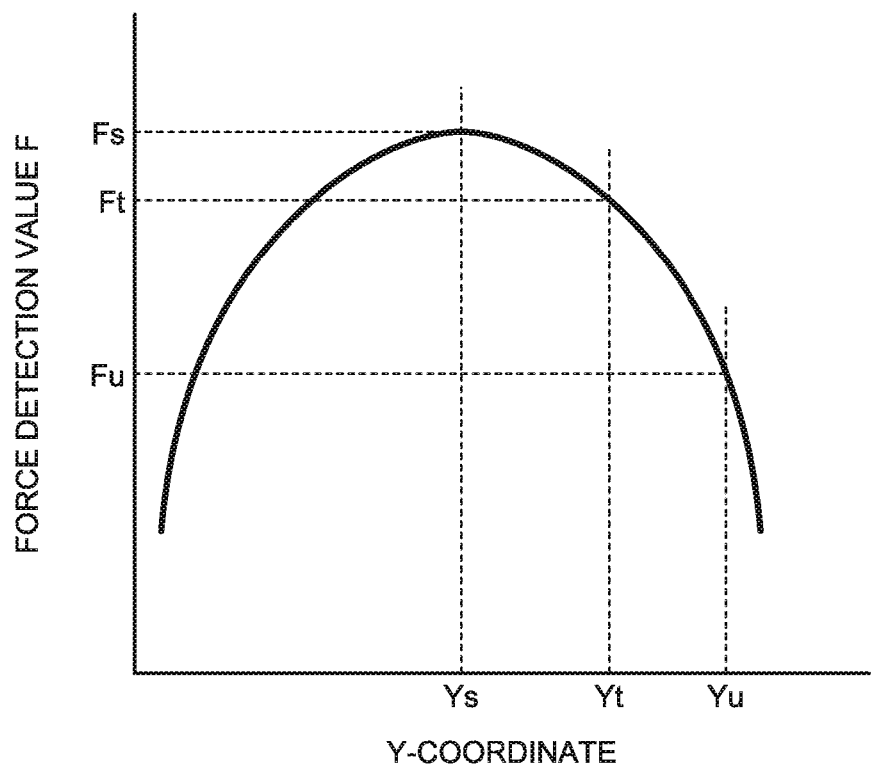
FIG. 54 is a graph illustrating a relation between the force detection value and a touch detection position in the Y-direction in the center position in the X-axis direction of an area to which a force is applied, on the input surface of the display apparatus with a touch detection function according to the third embodiment.

FIG. 54 is a graph illustrating a relation between the force detection value and the touch detection position in the Y-direction in the center position in the X-axis direction of the area to which a force is applied, on the input surface of the display apparatus with a touch detection function according to the third embodiment. In FIG. 54, the horizontal axis represents the Y-coordinate, and the vertical axis represents the force detection value F.

As described above, the region including the central portion and the vicinity of the central portion of the input surface IS, that is, the region including the coordinates s and the vicinity of the coordinates s illustrated in FIG. 53 is most flexible. Consequently, the force detection value F reaches a maximum at a Y-coordinate Ys. The force detection value at the Y-coordinate Ys is denoted as Fs. In the same manner, the force detection value at a Y-coordinate Yt is denoted as Ft, and the force detection value at a Y-coordinate Yu is denoted as Fu.

Figure 55:
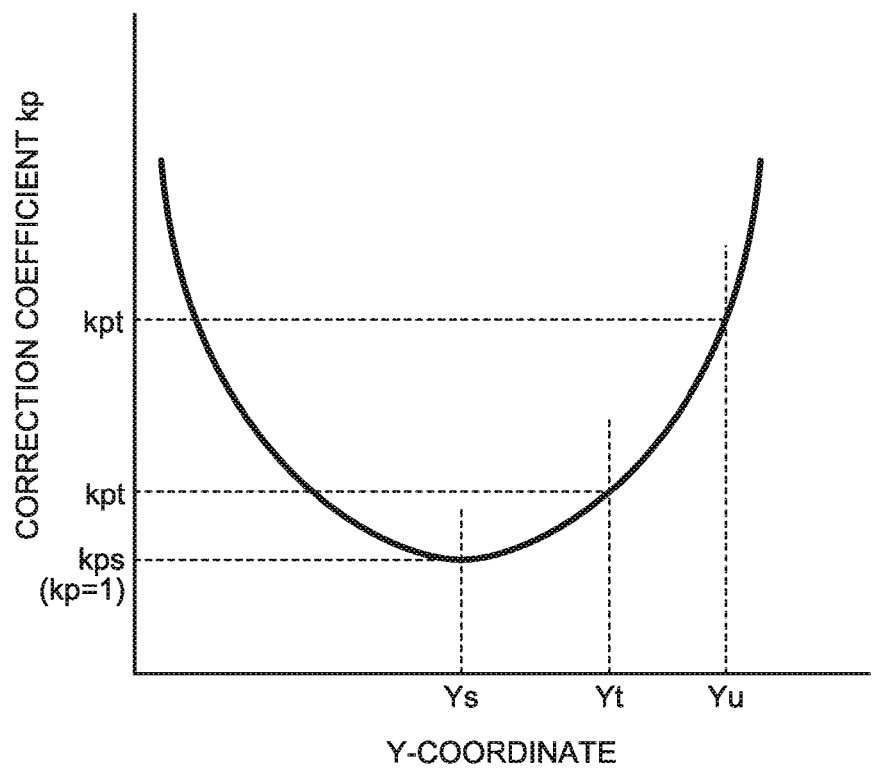
FIG. 55 is a graph illustrating a relation between the correction coefficient and the touch detection position in the Y-direction in the center position in the X-axis direction of the area to which a force is applied, on the input surface of the display apparatus with a touch detection function according to the third embodiment.

FIG. 55 is a graph illustrating a relation between the correction coefficient and the touch detection position in the Y-direction in the center position in the X-axis direction of the area to which a force is applied, on the input surface of the display apparatus with a touch detection function according to the third embodiment. FIG. 55 illustrates an example in which, assuming the center position in the X-axis direction and the Y-axis direction of the input surface IS as a reference position, that is, assuming the coordinates s as a reference position, a correction coefficient kp in this reference position is set to 1 (kp=1).

The reference position in which the correction coefficient kp is set to 1 (kp=1) is not limited to the center position in the X-axis direction and the Y-axis direction of the input surface IS, but any position in the force detection area Af on the input surface IS can serve as the reference position.

The following describes the correction coefficient kp of a display apparatus with a touch detection function 1b according to the third embodiment.

If the same corrected force detection value Fcor is intended to be obtained at the coordinates s, t, and u when the same force is applied to the coordinates s, t, and u illustrated in FIG. 53, Expression (23) below is satisfied.

$$Fcor=kps*Fs=kpt*Ft=kpu*Fu \quad (23)$$

Expressions (24), (25), and (26) below are obtained by deforming Expression (23) with respect to correction coefficients kps, kpt, and kpu.

$$kps=Fcor/Fs \quad (24)$$

$$kpt=Fcor/Ft \quad (25)$$

$$kpu=Fcor/Fu \quad (26)$$

Assuming that Fcur denotes the force detection value in any position in the force detection area Af on the input surface IS and kp denotes the correction coefficient, Expression (27) below is obtained by generalizing Expressions (24), (25), and (26) above.

$$kp=Fcor/Fcur \quad (27)$$

In Expression (27) above, assuming any position in the force detection area Af on the input surface IS as the reference position, if the correction coefficient kp in this reference position is 1 (kp=1), the force detection value Fcur in this reference position is equal to the corrected force detection value Fcor (Fcor=Fcur). In this case, Expressions (24), (25), (26) can be deformed into Expressions (28), (29), (30).

$$kps=Fcur/Fs \quad (28)$$

$$kpt=Fcur/Ft \quad (29)$$

$$kpu=Fcur/Fu \quad (30)$$

In Expressions (28), (29), (30) above, Fcur/Fs, Fcur/Ft, and Fcur/Fu are fixed values each determined as a ratio between the force detection value Fcur at the reference position in the force detection area AF on the input surface IS and a force detection value at any position in the force detection area Af, under the same temperature condition. The force detection value at any position in the force detection area Af is, for example, a force detection value at the coordinates, s, t, or u. The force detection value Fcur at the reference position is, for example, the force detection value Fs at the coordinates s, the force detection value Ft at the coordinates t, or the force detection value Fu at the coordinates u. Hence, Expression (31) below is obtained from Expression (7) described in the first embodiment by setting Fcur/Fs, Fcur/Ft, and Fcur/Fu as the correction coefficient kp.

$$Fcor=kp*(Cref/Ccur1)*Fcur \quad (31)$$

In the force detection controller 50b, the ratio between the force detection value Fcur at the reference position in the force detection area Af and the force detection value at any position in the force detection area Af on the input surface IS under the same temperature condition is set in advance as the correction coefficient kp. The force detection controller 50b can obtain the corrected force detection value Fcor, which is corrected from the force detection value Fcur according to the touch detection position, by multiplying the force detection value Fcur by the ratio (Cref/Ccur1) between the reference capacitance value Cref and the capacitance value Ccur1, and by further multiplying the multiplication result by the above-described correction coefficient kp. The reference capacitance value Cref represents a capacitance value between the drive electrode COML and the electrode SUS in the non-contact state at the reference temperature Tref, and the capacitance value Ccur1 represents a capacitance value between the drive electrode COML and the electrode SUS in the non-contact state.

The above description has exemplified the case where the coordinates, s, t, and u are located on the straight line 130 (refer to FIG. 53). Actually, however, the force detection area Af is two-dimensional, as illustrated in FIG. 53. For this reason, the display apparatus with a touch detection function 1b uses the different correction coefficient kp for each two-dimensional position to which a force is applied. More specifically, the force detection area Af on the input surface IS is divided into a plurality of regions, and the correction coefficient kp depending on the touch detection position is applied using a second correction coefficient table in which the correction coefficient kp is set for each of the regions.

FIG. 56 is a diagram illustrating a division example of the force detection area on the input surface of the display apparatus with a touch detection function according to the third embodiment. FIG. 57 is a diagram illustrating an example of the second correction coefficient table of the display apparatus with a touch detection function according to the third embodiment. FIGS. 56 and 57 illustrate an example in which the correction coefficient kp in a region (Xp,Yq) including the center position in the X-axis direction and the Y-axis direction of the input surface IS is set to 1 (kp(p,q)=1).

Figure 58:
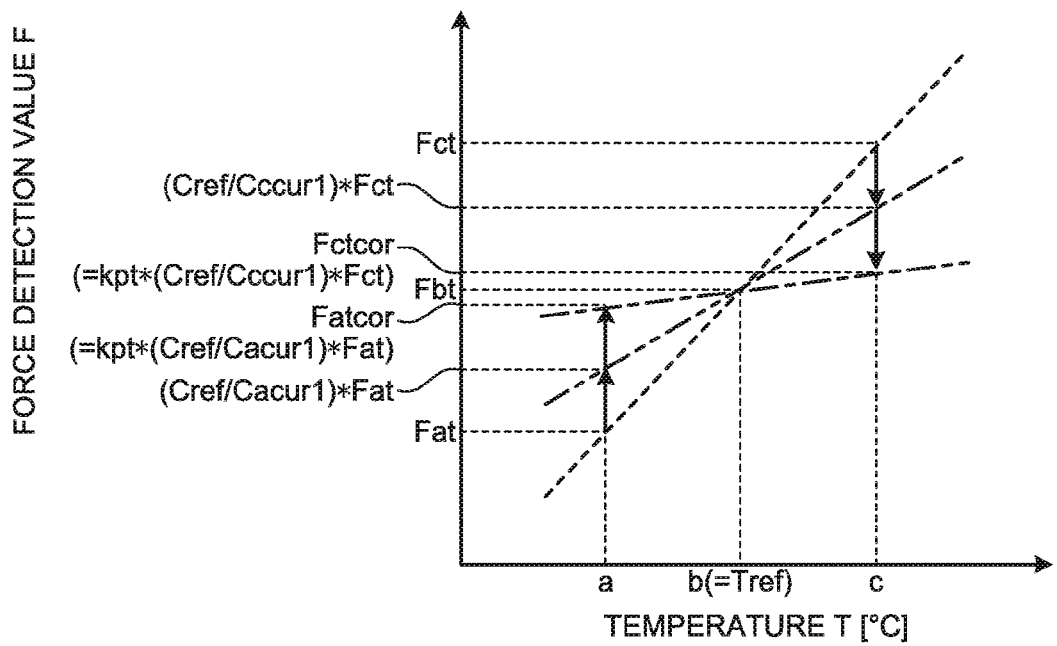
FIG. 58 is a diagram illustrating exemplary corrected force detection values when the force applied to the input surface is constant, in the display apparatus with a touch detection function according to the third embodiment.

FIG. 58 is a diagram illustrating examples of the corrected force detection value when the force applied to the input surface is constant, in the display apparatus with a touch detection function according to the third embodiment. In FIG. 58, the horizontal axis represents the temperature, and the vertical axis represents the force detection value F. In FIG. 58, the dashed line represents the force detection value before being corrected, and the long-dashed short-dashed line represents the force detection value after being corrected.

Figure 59:
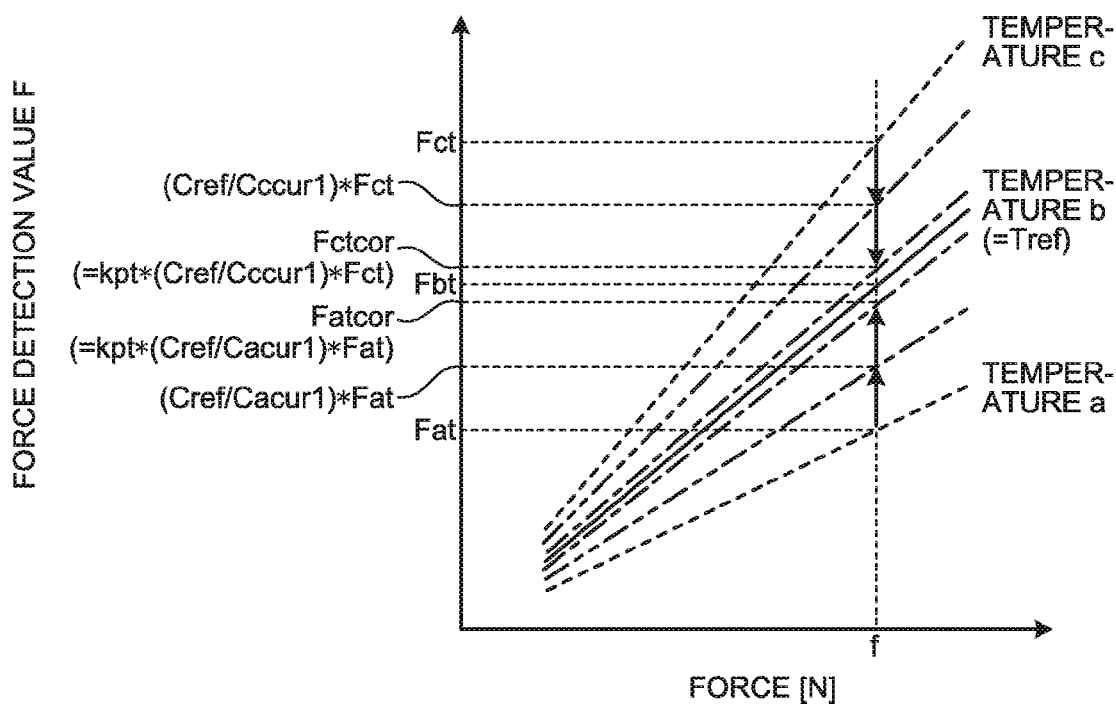
FIG. 59 is a diagram illustrating relations between a force applied to the input surface and the corrected force detection value, in the display apparatus with a touch detection function according to the third embodiment.

FIG. 59 is a diagram illustrating relations between a force applied to the input surface and the corrected force detection value, in the display apparatus with a touch detection function according to the third embodiment. In FIG. 59, the horizontal axis represents a force applied to the input surface, and the vertical axis represents a force detection value F. In FIG. 59, the dashed line represents the force detection value before being corrected, and the long-dashed short-dashed line represents the force detection value after being corrected.

FIGS. 58 and 59 illustrate an example in which the temperature b is assumed to be the reference temperature Tref, and a constant force is applied to the coordinates t in the force detection area Af illustrated in FIG. 53.

In the force detection controller 50b, the ratio (Fcur/Fat) between the force detection value Fcur at the reference position in the force detection area Af and a force detection value Fat at the coordinates t in the force detection area Af on the input surface IS under the same temperature condition is set in advance as the correction coefficient kpt.

The force detection controller 50b can obtain a corrected force detection value Fatcor corrected from the force detection value Fat by multiplying the force detection value Fat by the ratio (Cref/Cacur1) between the reference capacitance value Cref and the capacitance value Cacur1 (long-dashed double-short dashed line), and by further multiplying the multiplication result by the correction coefficient kpt at the coordinates t (long-dashed short-dashed line). The reference capacitance value Cref represents a capacitance value between the drive electrode COML and the electrode SUS in the non-contact state at the reference temperature Tref. The capacitance value Cacur1 represents a capacitance value between the drive electrode COML and the electrode SUS in the non-contact state at the temperature a. That is, the characteristic represented by long-dashed double-short dashed line is obtained by performing correction based on the temperature, and the characteristic represented by the long-dashed short-dashed line is obtained by performing further correction based on the coordinates.

The force detection controller 50b can obtain a corrected force detection value Fctcor corrected from a force detection value Fct by multiplying the force detection value Fct by the ratio (Cref/Cccur1) between the reference capacitance value Cref and the capacitance value Cccur1, and by further multiplying the multiplication result by the correction coefficient kpt at the coordinates t. The reference capacitance value Cref represents a capacitance value between the drive electrode COML and the electrode SUS in the non-contact state at the reference temperature Tref. The capacitance value Cccur1 represents a capacitance value between the drive electrode COML and the electrode SUS in the non-contact state at the temperature c (long-dashed double-short dashed line).

These calculations correct the force detection value based on the change in the capacitance value between the drive electrode COML and the electrode SUS generated due to the temperature characteristics of the dielectric materials included in the second substrate 21, the first optical device OD1, the air layer AG, the reflective polarizing film DBEF, the brightness enhancement film BEF, the light diffusing sheet DI, the light guide LG, and the light reflector RS, which are provided between the drive electrode COML and the electrode SUS, as illustrated in FIG. 59.

3.1 Configuration and Operation of Force Detection Controller

In the present embodiment, for example, a force detection processor 442b of a signal processor 44b in the force detection controller 50b illustrated in FIG. 52 performs the force detection processing described above.

Figure 60:
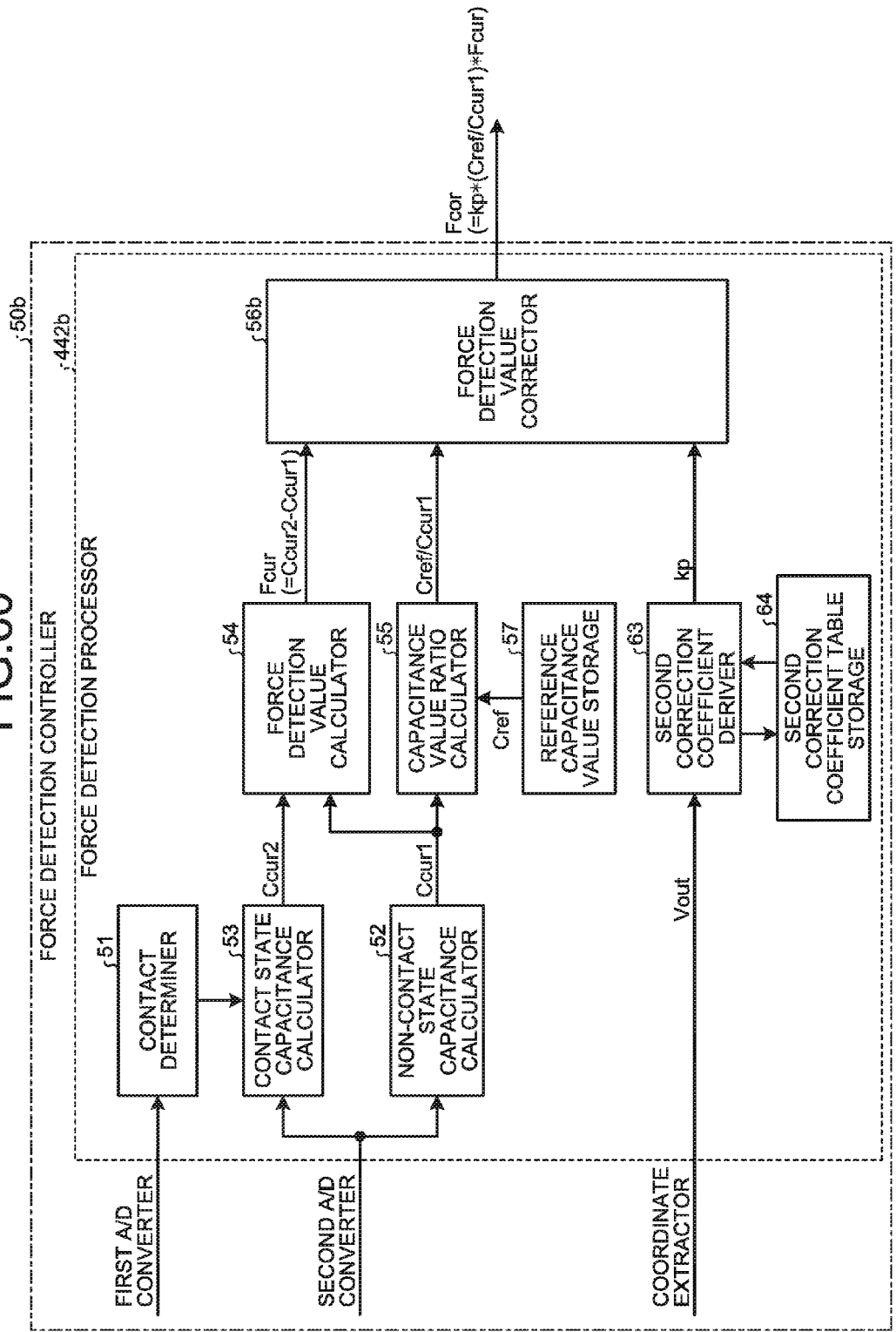
FIG. 60 is a diagram illustrating functional blocks of a force detection controller of the display apparatus with a touch detection function according to the third embodiment.

FIG. 60 is a diagram illustrating functional blocks of the force detection controller of the display apparatus with a touch detection function according to the third embodiment.

The force detection processor 442b of the force detection controller 50b includes the contact determiner 51, the non-contact state capacitance calculator 52, the contact state capacitance calculator 53, the force detection value calculator 54, the capacitance value ratio calculator 55, a force detection value corrector 56b, the reference capacitance value storage 57, a second correction coefficient deriver 63, and a second correction coefficient table storage 64. The second correction coefficient table storage 64 stores in advance the second correction coefficient table. The second correction coefficient table may be individually set before shipment of the display apparatus with a touch detection function 1b according to the third embodiment. The second correction coefficient table storage 64 is made up of, for example, a register and/or the like.

The contact determiner 51, the non-contact state capacitance calculator 52, the contact state capacitance calculator 53, the force detection value calculator 54, the capacitance value ratio calculator 55, the force detection value corrector 56b, and the second correction coefficient deriver 63 are configured, for example, as circuits. The contact determiner 51, the non-contact state capacitance calculator 52, the contact state capacitance calculator 53, the force detection value calculator 54, the capacitance value ratio calculator 55, the force detection value corrector 56b, and the second correction coefficient deriver 63 may be implemented by execution of programs by the touch IC 49. In this case, the contact determiner 51, the non-contact state capacitance calculator 52, the contact state capacitance calculator 53, the force detection value calculator 54, the capacitance value ratio calculator 55, the force detection value corrector 56b, and the second correction coefficient deriver 63 may be implemented by execution of the programs by the COG 19 or the host HST, or may be implemented by execution of the programs by cooperation of two or more of the COG 19, the touch IC 49, and the host HST.

The operations of the contact determiner 51, the non-contact state capacitance calculator 52, the contact state capacitance calculator 53, the force detection value calculator 54, and the capacitance value ratio calculator 55 are the same as those in the first embodiment.

The second correction coefficient deriver 63 refers to the second correction coefficient table stored in the second correction coefficient table storage 64 to derive the correction coefficient kp corresponding to the touch detection position Vout output from the coordinate extractor 45 of the touch detection controller 40, that is, the correction coefficient kp corresponding to the coordinates of the touch detection position, and output the correction coefficient kp to the force detection value corrector 56b.

The force detection value corrector 56b receives the force detection value Fcur from the force detection value calculator 54. The force detection value corrector 56b receives the ratio (Cref/Ccur1) between the reference capacitance value Cref and the capacitance value Ccur1 from the capacitance value ratio calculator 55. The force detection value corrector 56b receives the correction coefficient kp from the second correction coefficient deriver 63. The force detection value corrector 56b outputs the corrected force detection value Fcor (=kp*(Cref/Ccur1)*Fcur) obtained by multiplying the force detection value Fcur by the ratio (Cref/Ccur1) between the reference capacitance value Cref and the capacitance value Ccur1, and by further multiplying the multiplication result by the correction coefficient kp. The reference capacitance value Cref represents a capacitance value between the drive electrode COML and the electrode SUS in the non-contact state at the reference temperature Tref. The capacitance value Ccur1 represents a capacitance value between the drive electrode COML and the electrode SUS in the non-contact state.

In the present embodiment, the force detection controller 50b performs the force detection based on the capacitance values detected by the electrodes SUS during the mutual capacitance detection period 139 described in the first embodiment (refer to FIG. 27).

Figure 61:
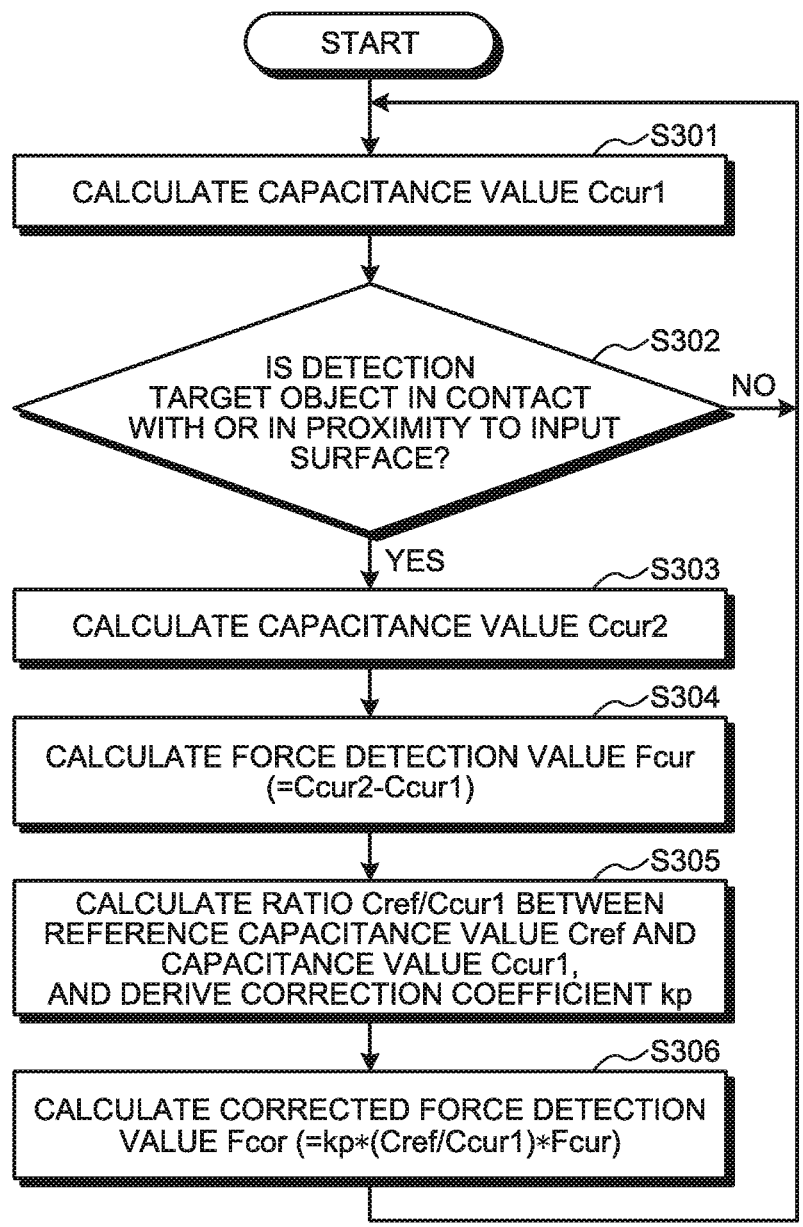
FIG. 61 is a flowchart illustrating a process executed by the force detection controller of the display apparatus with a touch detection function according to the third embodiment.

FIG. 61 is a flowchart illustrating a process executed by the force detection controller of the display apparatus with a touch detection function according to the third embodiment. The process illustrated in FIG. 61 is executed during the mutual capacitance detection period 139 described above.

In the flowchart illustrated in FIG. 61, processing from Step S301 to Step S304 is substantially the same as the processing from Step S101 to Step S104 in the flowchart of the first embodiment illustrated in FIG. 28, and thus, the description thereof will not be repeated.

The capacitance value ratio calculator 55 calculates the ratio (Cref/Ccur1) between the reference capacitance value Cref in the non-contact state at the reference temperature Tref and the capacitance value Ccur1 detected in the non-contact state, and outputs the ratio (Cref/Ccur1) to the force detection value corrector 56b. The second correction coefficient deriver 63 refers to the second correction coefficient table stored in the second correction coefficient table storage 64 to derive the correction coefficient kp corresponding to the touch detection position Vout output from the coordinate extractor 45 of the touch detection controller 40, that is, the correction coefficient kp corresponding to the coordinates of the touch detection position, and output the correction coefficient kp to the force detection value corrector 56b (Step S305).

The force detection value corrector 56b receives the force detection value Fcur from the force detection value calculator 54. The force detection value corrector 56b receives the ratio (Cref/Ccur1) between the reference capacitance value Cref and the capacitance value Ccur1 from the capacitance value ratio calculator 55. The force detection value corrector 56b receives the correction coefficient kp from the second correction coefficient deriver 63. The force detection value corrector 56b calculates the corrected force detection value Fcor (=kp*(Cref/Ccur1)*Fcur) by multiplying the force detection value Fcur by the ratio (Cref/Ccur1) between the reference capacitance value Cref in the non-contact state at the reference temperature Tref and the capacitance value Ccur1 detected in the non-contact state, and by further multiplying the multiplication result by the correction coefficient kp, and outputs the corrected force detection value Fcor (Step S306). The process then returns to the processing at Step S301.

The execution of the process described above can reduce the influence of the temperature characteristics of the dielectric materials, which are included in the air layer AG and the layered body LB provided between the drive electrode COML and the electrode SUS, on the force detection processing according to the touch detection position, and thus can restrain the reduction in accuracy of the detection in the force detection processing.

3-2. Modification

Figure 62:
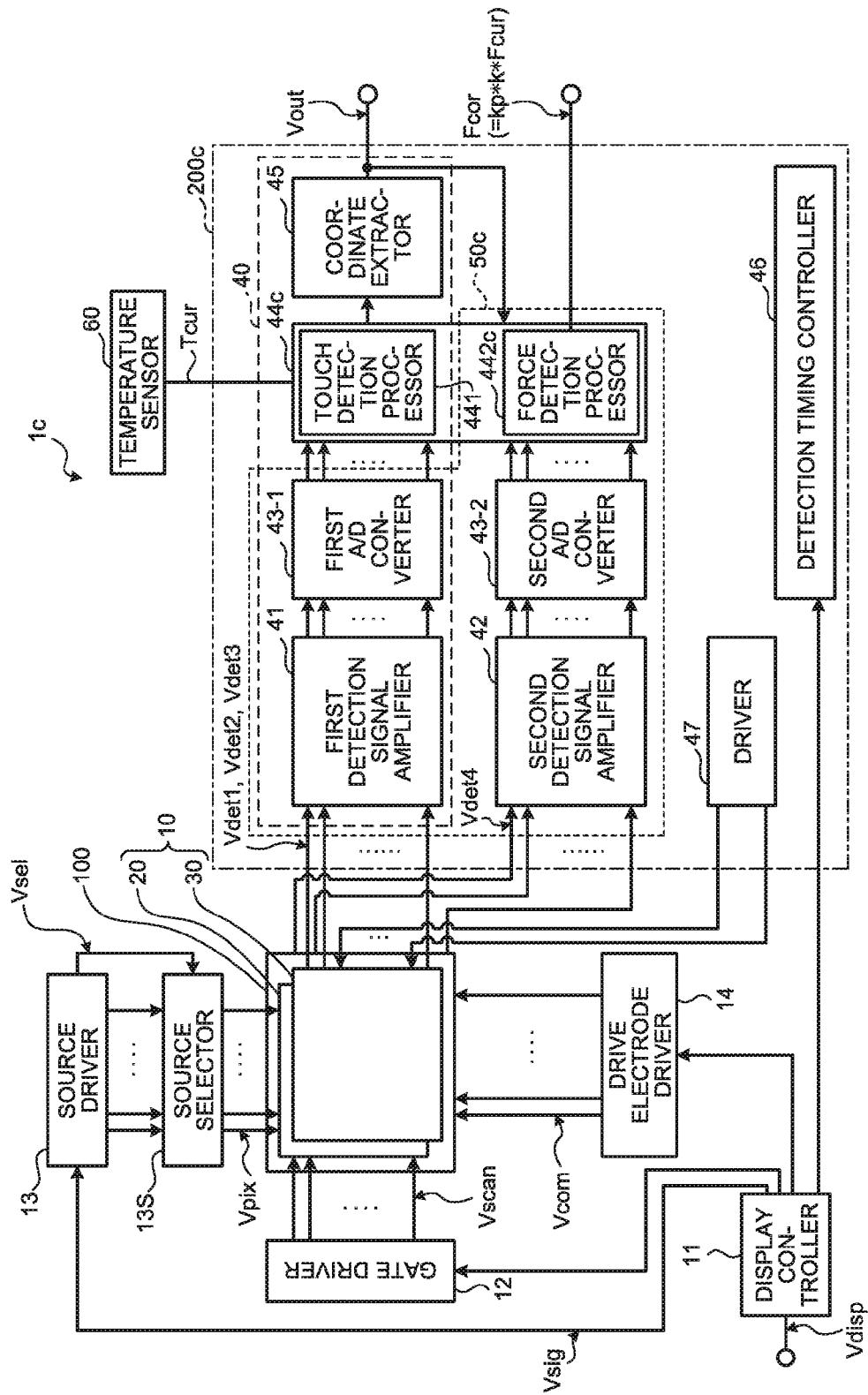
FIG. 62 is a block diagram illustrating a configuration example of a touch detector and a display device of a display apparatus with a touch detection function according to a modification of the third embodiment.

FIG. 62 is a block diagram illustrating a configuration example of a touch detector and a display device of a display apparatus with a touch detection function according to a modification of the third embodiment.

The configuration example illustrated in FIG. 62 includes the temperature sensor 60 described in the second embodiment in addition to the configuration of the third embodiment described above. A force detection controller 50c corrects the force detection value by multiplying the force detection value by a predetermined correction coefficient (first correction coefficient) depending on the temperature detected by the temperature sensor 60. That is, in the modification of the third embodiment, the force detection controller 50c corrects the force detection value Fcur using Expression (32) below in which (Cref/Ccur1) in the above Expression (31) is set as the correction coefficient k.

$$Fcor=kp*k*Fcur \quad (32)$$

Figure 63:
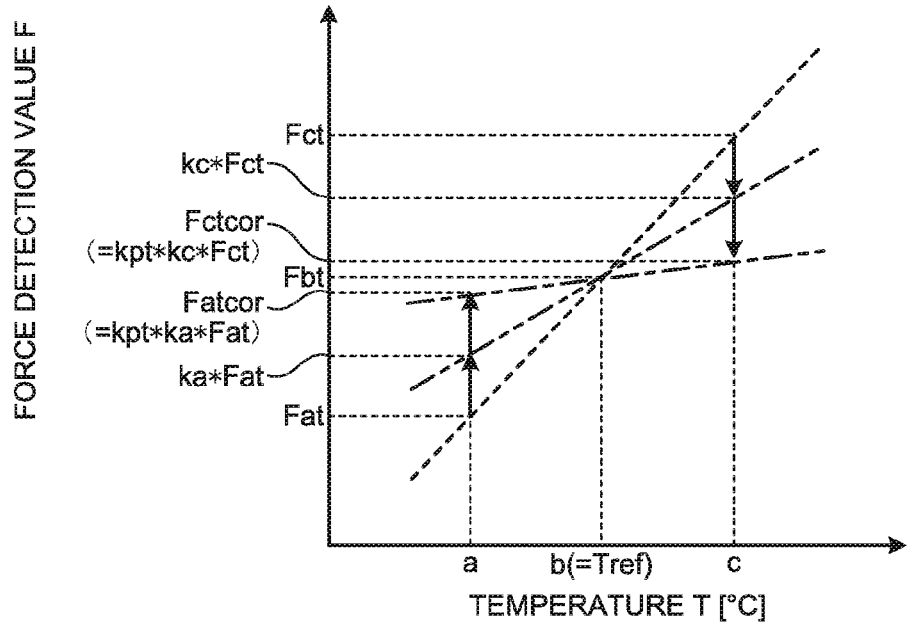
FIG. 63 is a diagram illustrating exemplary corrected force detection values when the force applied to the input surface is constant, in the display apparatus with a touch detection function according to the modification of the third embodiment.

FIG. 63 is a diagram illustrating exemplary corrected force detection values when the force applied to the input surface is constant, in the display apparatus with a touch detection function according to the modification of the third embodiment. In FIG. 63, the horizontal axis represents the temperature, and the vertical axis represents the force detection value F. In FIG. 63, the dashed line represents the force detection value before being corrected, and the long-dashed short-dashed line represents the force detection value after being corrected.

Figure 64:
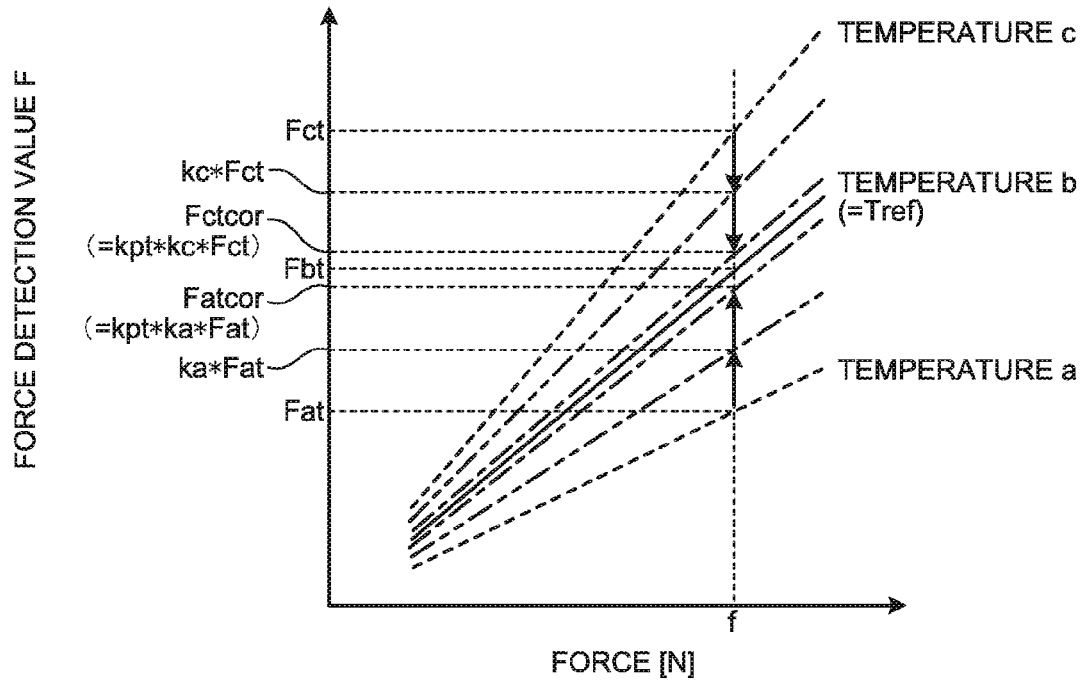
FIG. 64 is a diagram illustrating relations between a force applied to the input surface and the corrected force detection value, in the display apparatus with a touch detection function according to the modification of the third embodiment.

FIG. 64 is a diagram illustrating relations between a force applied to the input surface and the corrected force detection value, in the display apparatus with a touch detection function according to the modification of the third embodiment. In FIG. 64, the horizontal axis represents a force applied to the input surface, and the vertical axis represents the force detection value F. In FIG. 64, the dashed line represents the force detection value before being corrected, and the long-dashed short-dashed line represents the force detection value after being corrected.

FIGS. 63 and 64 illustrate an example in which the temperature b is assumed to be the reference temperature Tref, and a constant force is applied to the coordinates t in the force detection area Af illustrated in FIG. 53.

In the force detection controller 50c, the ratio (Fcur/Fat) between the force detection value Fcur at the reference position in the force detection area Af and a force detection value Fat at the coordinates t in the force detection area Af on the input surface IS under the same temperature condition is set in advance as the correction coefficient kpt.

In the force detection controller 50c, the ratio (Cref/Cacur1) between the reference capacitance value Cref and the capacitance value Cacur1 is set in advance as the correction coefficient ka. The reference capacitance value Cref represents a capacitance value between the drive electrode COML and the electrode SUS in the non-contact state at the reference temperature Tref. The capacitance value Cacur1 represents a capacitance value between the drive electrode COML and the electrode SUS in the non-contact state at the temperature a. The force detection controller 50c can obtain the corrected force detection value Fatcor corrected from the force detection value Fat by multiplying the force detection value Fat by the correction coefficient ka at the temperature a (long-dashed double-short dashed line), and by further multiplying the multiplication result by the correction coefficient kpt at the coordinates t (long-dashed short-dashed line). That is, the characteristic represented by long-dashed double-short dashed line is obtained by performing correction based on the temperature, and the characteristic represented by the long-dashed short-dashed line is obtained by performing further correction based on the coordinates.

In the force detection controller 50c, the ratio (Cref/Cccur1) between the reference capacitance value Cref and the capacitance value Cccur1 is set in advance as the correction coefficient kc. The reference capacitance value Cref represents a capacitance value between the drive electrode COML and the electrode SUS in the non-contact state at the reference temperature Tref. The capacitance value Cccur1 represents a capacitance value between the drive electrode COML and the electrode SUS in the non-contact state at the temperature c. The force detection controller 50c can obtain the corrected force detection value Fctcor corrected from the force detection value Fct by multiplying the force detection value Fct by the correction coefficient kc (long-dashed double-short dashed line), and by further multiplying the multiplication result by the correction coefficient kpt at the coordinates t (long-dashed short-dashed line).

These calculations correct the force detection value based on the change in the capacitance value between the drive electrode COML and the electrode SUS generated due to the temperature characteristics of the dielectric materials included in the second substrate 21, the first optical device OD1, the air layer AG, the reflective polarizing film DBEF, the brightness enhancement film BEF, the light diffusing sheet DI, the light guide LG, and the light reflector RS, which are provided between the drive electrode COML and the electrode SUS, as illustrated in FIG. 64.

Configuration and Operation of Force Detection Controller

In the modification of the present embodiment, for example, a force detection processor 442c of a signal processor 44c in the force detection controller 50c illustrated in FIG. 62 performs the force detection processing described above.

Figure 65:
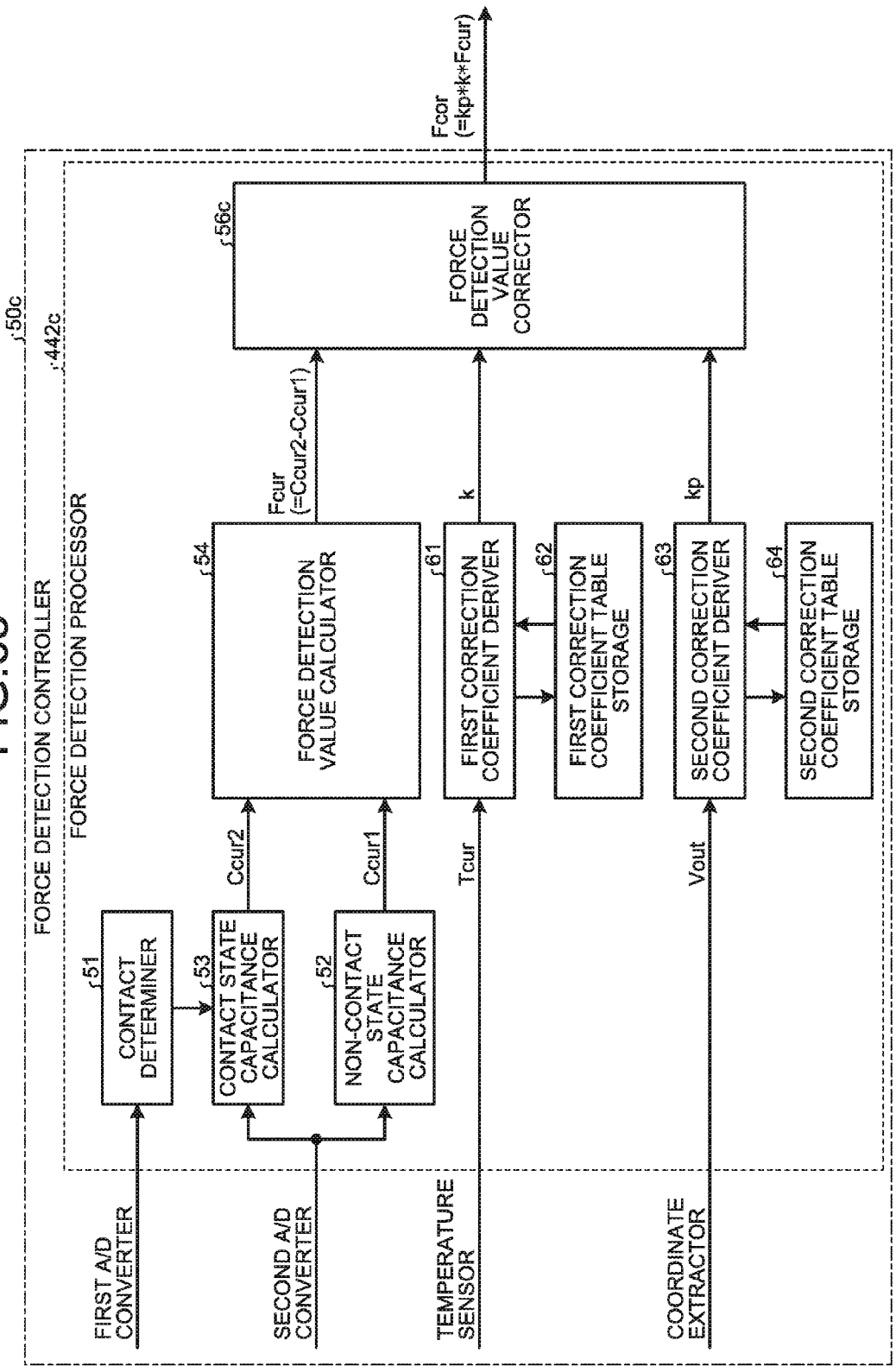
FIG. 65 is a diagram illustrating functional blocks of a force detection controller of the display apparatus with a touch detection function according to the modification of the third embodiment.

FIG. 65 is a diagram illustrating functional blocks of the force detection controller of the display apparatus with a touch detection function according to the modification of the third embodiment.

The force detection processor 442c of the force detection controller 50c includes the contact determiner 51, the non-contact state capacitance calculator 52, the contact state capacitance calculator 53, the force detection value calculator 54, a force detection value corrector 56c, the first correction coefficient deriver 61, the first correction coefficient table storage 62, the second correction coefficient deriver 63, and the second correction coefficient table storage 64.

The contact determiner 51, the non-contact state capacitance calculator 52, the contact state capacitance calculator 53, the force detection value calculator 54, the force detection value corrector 56c, the first correction coefficient deriver 61, and the second correction coefficient deriver 63 are configured, for example, as circuits. The contact determiner 51, the non-contact state capacitance calculator 52, the contact state capacitance calculator 53, the force detection value calculator 54, the force detection value corrector 56c, the first correction coefficient deriver 61, and the second correction coefficient deriver 63 may be implemented by execution of programs by, for example, the touch IC 49. In this case, the contact determiner 51, the non-contact state capacitance calculator 52, the contact state capacitance calculator 53, the force detection value calculator 54, the force detection value corrector 56c, the first correction coefficient deriver 61, and the second correction coefficient deriver 63 may be implemented by execution of the programs by, for example, the COG 19 or the host HST, or may be implemented by execution of the programs by, for example, cooperation of two or more of the COG 19, the touch IC 49, and the host HST.

The operations of the contact determiner 51, the non-contact state capacitance calculator 52, the contact state capacitance calculator 53, and the force detection value calculator 54 are the same as those in the first embodiment. The operation of the first correction coefficient deriver 61 is the same as that in the second embodiment. The operation of the second correction coefficient deriver 63 is the same as that in the third embodiment.

The force detection value corrector 56c receives the force detection value Fcur from the force detection value calculator 54. The force detection value corrector 56c receives the correction coefficient k from the first correction coefficient deriver 61. The force detection value corrector 56c receives the correction coefficient kp from the second correction coefficient deriver 63. The force detection value corrector 56c outputs the corrected force detection value Fcor (=kp*k*Fcur) obtained by multiplying the force detection value Fcur by the correction coefficient k, and by further multiplying the multiplication result by the correction coefficient kp.

In the modification of the present embodiment, the force detection controller 50c performs the force detection based on the capacitance values detected by the electrodes SUS during the mutual capacitance detection period 139 described in the first embodiment (refer to FIG. 27).

Figure 66:
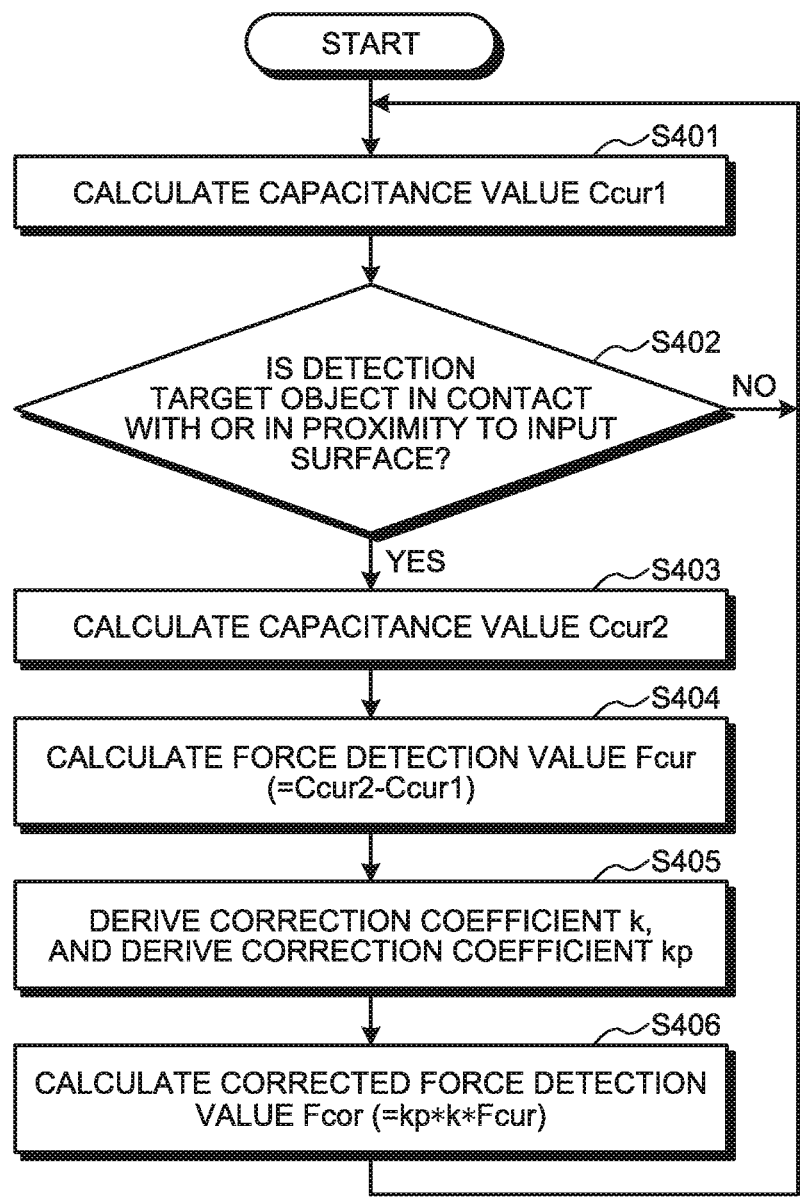
FIG. 66 is a flowchart illustrating a process executed by the force detection controller of the display apparatus with a touch detection function according to the modification of the third embodiment.

FIG. 66 is a flowchart illustrating a process executed by the force detection controller of the display apparatus with a touch detection function according to the modification of the third embodiment. The process illustrated in FIG. 66 is executed during the mutual capacitance detection period 139 described above.

In the flowchart illustrated in FIG. 66, processing from Step S401 to Step S404 is substantially the same as the processing from Step S101 to Step S104 in the flowchart of the first embodiment illustrated in FIG. 28, and thus the description thereof will not be repeated.

The first correction coefficient deriver 61 refers to the first correction coefficient table stored in the first correction coefficient table storage 62 to derive the correction coefficient k corresponding to the temperature Tcur detected by the temperature sensor 60, and outputs the correction coefficient k to the force detection value corrector 56c. The second correction coefficient deriver 63 refers to the second correction coefficient table stored in the second correction coefficient table storage 64 to derive the correction coefficient kp corresponding to the touch detection position Vout output from the coordinate extractor 45 of the touch detection controller 40, that is, the correction coefficient kp corresponding to the coordinates of the touch detection position, and output the correction coefficient kp to the force detection value corrector 56c (Step S405).

The force detection value corrector 56c receives the force detection value Fcur from the force detection value calculator 54. The force detection value corrector 56c receives the correction coefficient k from the first correction coefficient deriver 61. The force detection value corrector 56c receives the correction coefficient kp from the second correction coefficient deriver 63. The force detection value corrector 56c calculates the corrected force detection value Fcor (=kp*k*Fcur) by multiplying the force detection value Fcur by the correction coefficient k, and by further multiplying the multiplication result by the correction coefficient kp, and outputs the corrected force detection value Fcor (=kp*k*Fcur) (Step S406). The process then returns to the processing at Step S401.

The execution of the process described above can reduce the influence of the temperature characteristics of the dielectric materials, which are included in the air layer AG and the layered body LB provided between the drive electrode COML and the electrode SUS, on the force detection processing according to the touch detection position, and thus can restrain the reduction in accuracy of the detection in the force detection processing.

As described above, in display apparatuses with a touch detection function 1b and 1c according to the embodiment 3, the touch detection position Vout output from the coordinate extractor 45 of the touch detection controller 40 is entered into the force detection controllers 50b and 50c. The force detection controllers 50b and 50c correct the force detection value Fcur according to the coordinates of the touch detection position.

More specifically, in the force detection controller 50b, the ratio between the force detection value Fcur at the reference position in the force detection area Af and the force detection value at any position in the force detection area Af on the input surface IS under the same temperature condition is set in advance as the correction coefficient (second correction coefficient) kp. The force detection controller 50b corrects the force detection value Fcur by multiplying the force detection value Fcur by the ratio (Cref/Ccur1) between the reference capacitance value Cref and the capacitance value Ccur1, and by further multiplying the multiplication result by the correction coefficient (second correction coefficient) kp. The reference capacitance value Cref represents a capacitance value between the drive electrode COML and the electrode SUS in the non-contact state at the reference temperature Tref. The capacitance value Ccur1 represents a capacitance value between the drive electrode COML and the electrode SUS in the non-contact state.

In the force detection controller 50c, the ratio between the force detection value Fcur at the reference position in the force detection area Af and the force detection value at any position in the force detection area Af on the input surface IS under the same temperature condition is set in advance as the correction coefficient (second correction coefficient) kp. In the force detection controller 50c, the ratio (Cref/Ccur1) between the reference capacitance value Cref and the capacitance value Ccur1 is set in advance as the correction coefficient k (first correction coefficient). The reference capacitance value Cref represents a capacitance value between the drive electrode COML and the electrode SUS in the non-contact state at the reference temperature Tref. The capacitance value Ccur1 represents a capacitance value between the drive electrode COML and the electrode SUS in the non-contact state. The force detection controller 50b corrects the force detection value Fcur by multiplying the force detection value Fcur by the correction coefficient k, and by further multiplying the multiplication result by the correction coefficient (second correction coefficient) kp.

Furthermore, the force detection controllers 50b and 50c correct the force detection value Fcur according to the touch detection position detected by the touch detection controller 40 based on the second correction coefficient table associating the position in the force detection area Af with the correction coefficient (second correction coefficient) kp.

The configuration described above can reduce, according to the touch detection position, the influence of the temperature characteristics of the dielectric materials, which are included in the air layer AG and the layered body LB provided between the drive electrode COML (first electrode) and the electrode SUS (second electrode), on the force detection processing, and thus can restrain the reduction in accuracy of the detection in the force detection processing regardless of the touch detection position.

According to the present embodiment, the display apparatus with a touch detection function is obtained that is capable of restraining the reduction in accuracy of detection of a force applied to the input surface of the touchscreen panel.

4. Fourth Embodiment

Figure 67:
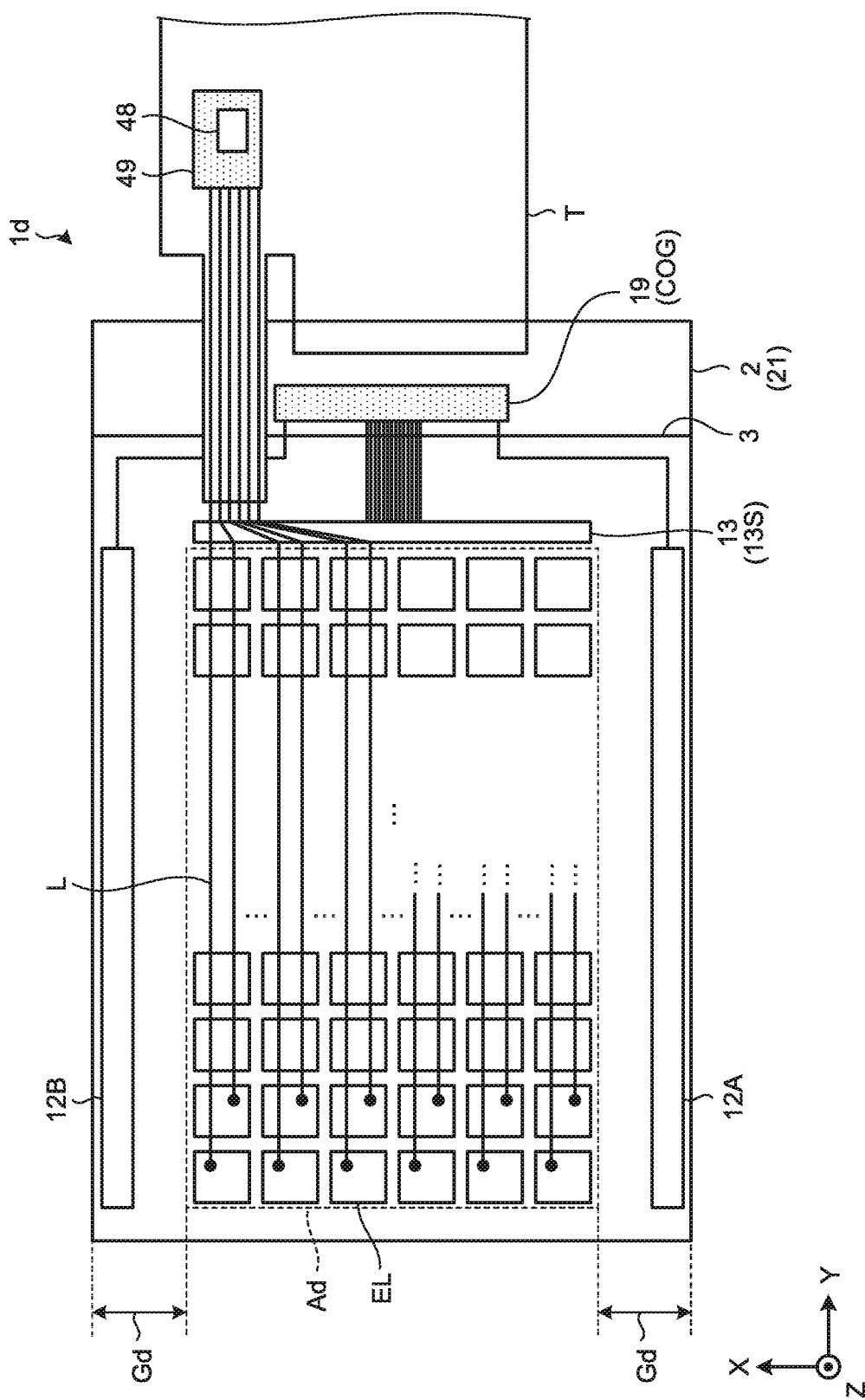
FIG. 67 is a diagram illustrating an exemplary module on which a display apparatus with a touch detection function according to a fourth embodiment is mounted.
Figure 68:
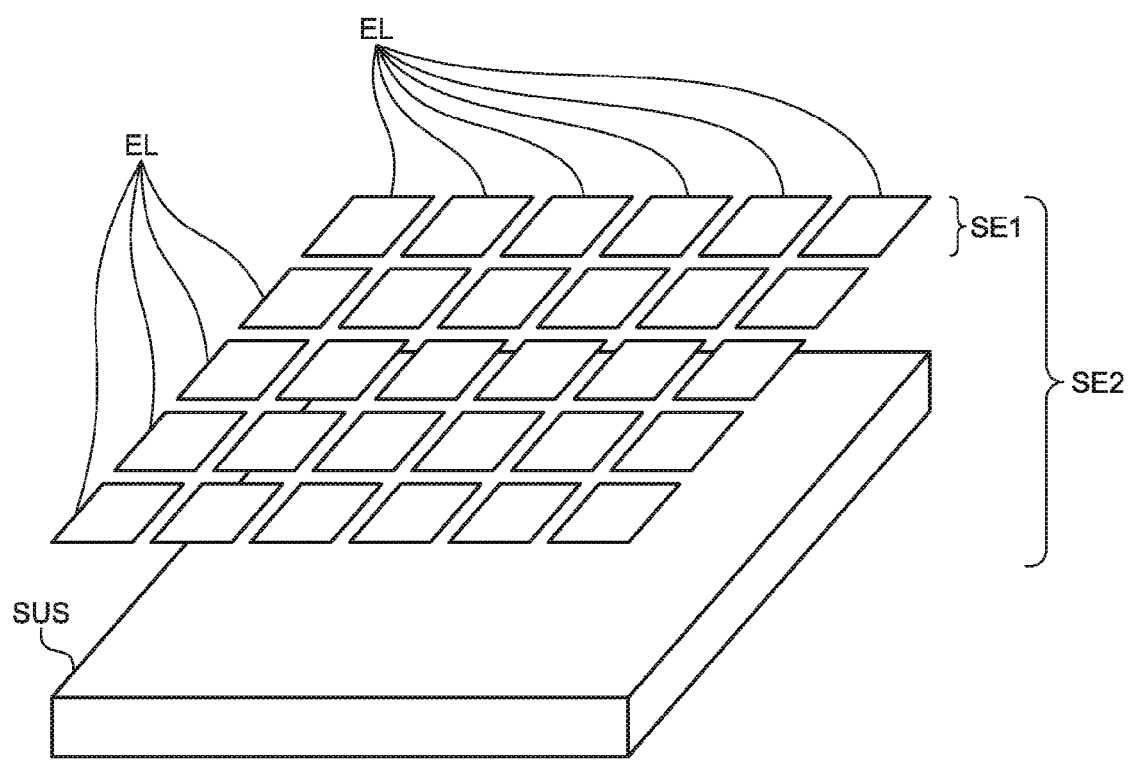
FIG. 68 is a perspective view illustrating electrodes of the display apparatus with a touch detection function according to the fourth embodiment.

FIG. 67 is a diagram illustrating an exemplary module on which the display apparatus with a touch detection function according to the fourth embodiment is mounted. FIG. 68 is a perspective view illustrating electrodes of the display apparatus with a touch detection function according to the fourth embodiment. Description will not be repeated for components that are equivalent to or the same as those of the first embodiment.

This display apparatus with a touch detection function 1d according to the fourth embodiment performs the touch detection based on the basic principle of the self-capacitance touch method. In the case of the self-capacitance touch method, a plurality of electrodes EL arranged in a matrix (row-column configuration) may be used as both the touch detection electrodes TDL and the drive electrodes COML. In this case, each of the electrodes EL is coupled to a drive electrode controller 48 provided in the touch IC 49 through coupling parts, such as wiring L. FIG. 67 illustrates the wiring L for only some of the electrodes EL. Actually, however, the wiring L or the coupling parts similar thereto is provided for each of the electrodes EL. The drive electrode controller 48 may be provided on the array substrate (pixel substrate 2).

While each of the electrodes EL can have any size and shape, the size of the electrode EL may correspond to the size of, for example, the pixel. In this case, one of electrodes (such as the pixel electrode 22 or the drive electrode COML as a counter electrode in the pixel of the liquid crystal display apparatus) making up the pixel may be used as the electrode EL. In other words, the electrode EL may be also used as the electrode provided in each pixel of the display apparatus having a plurality of pixels.

As illustrated in FIG. 68, in the fourth embodiment, the electrodes EL make up the touch detector SE1 of FIG. 1. The electrodes EL and the electrodes SUS make up the force detector SE2 of FIG. 1.

In the present configuration example, the electrodes SUS are made of an electrical conductor (such as aluminum). The potential of the electrodes SUS is a reference potential. Examples of the reference potential include a ground potential GND. The electrodes SUS may be electrically coupled to any one of the touch IC 49, the COG 19, and the host HST through coupling wiring or the like, and may be supplied with the reference potential from any one of the touch IC 49, the COG 19, and the host HST. The electrodes SUS may be configured, for example, as the rear frame RFR made of an electrically conductive material.

In the present embodiment, the electrode EL corresponds to the "first electrode", and the electrode SUS corresponds to the "second electrode".

If the electrodes SUS are configured as independent component members made of the electrical conductor, the same configuration as that of any of the first to third embodiments can be achieved by making the electrodes SUS capable of being switched between a mode in which the electrodes SUS are coupled to the force detection controller 50, 50a, 50b, or the 50c of the detection controller 200, 200a, 200b, or 200c, and a mode in which the electrodes SUS are set at the reference potential. That is, the display apparatus with a touch detection function 1d according to the fourth embodiment can have the same configuration as that of any of the display apparatuses with a touch detection function 1, 1a, 1b, and 1c of the first to third embodiments.

4-1. Principle of Force Detection
Basic Principle

Figure 69:
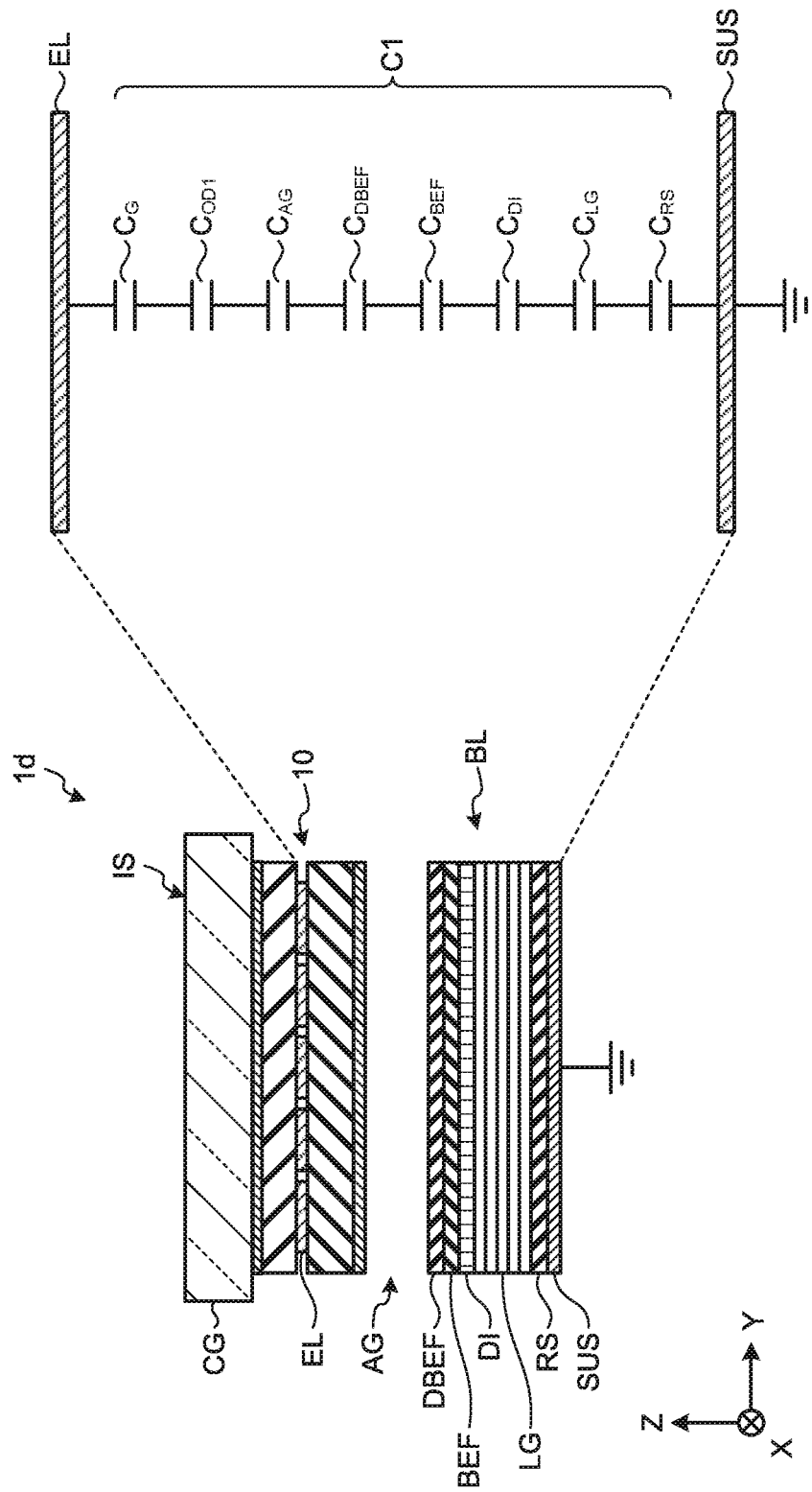
FIG. 69 illustrates a sectional view and an equivalent circuit diagram of the display apparatus with a touch detection function according to the fourth embodiment.

FIG. 69 illustrates a sectional view and an equivalent circuit diagram of the display apparatus with a touch detection function according to the fourth embodiment. As illustrated in FIG. 69, assume that $C_G$ denotes the capacitance generated by the second substrate 21, $C_{OD1}$ denotes the capacitance generated by the first optical device OD1, $C_{AG}$ denotes the capacitance generated by the air layer AG, $C_{DBEF}$ denotes the capacitance generated by the reflective polarizing film DBEF, $C_{BEF}$ denotes the capacitance generated by the brightness enhancement film BEF, $C_{DI}$ denotes the capacitance generated by the light diffusing sheet DI, $C_{LG}$ denotes the capacitance generated by the light guide LG, and $C_{RS}$ denotes the capacitance generated by the light reflector RS. In this case, a capacitance value C1 given by Expression (33) below is present between the electrode EL and the electrode SUS.

$$C1 = C_G \times C_{OD1} \times C_{AG} \times C_{DBEF} \times C_{BEF} \times C_{DI} \times C_{LG} \times C_{RS} / (C_G + C_{OD1} + C_{AG} + C_{DBEF} + C_{BEF} + C_{DI} + C_{LG} + C_{RS}) \quad (33)$$

In the state where the detection target object OBJ is neither in contact with nor in proximity to the input surface IS, the capacitance value C detected by the electrode EL can be represented by Expression (34) below.

$$C = C1 \quad (34)$$

Figure 70:
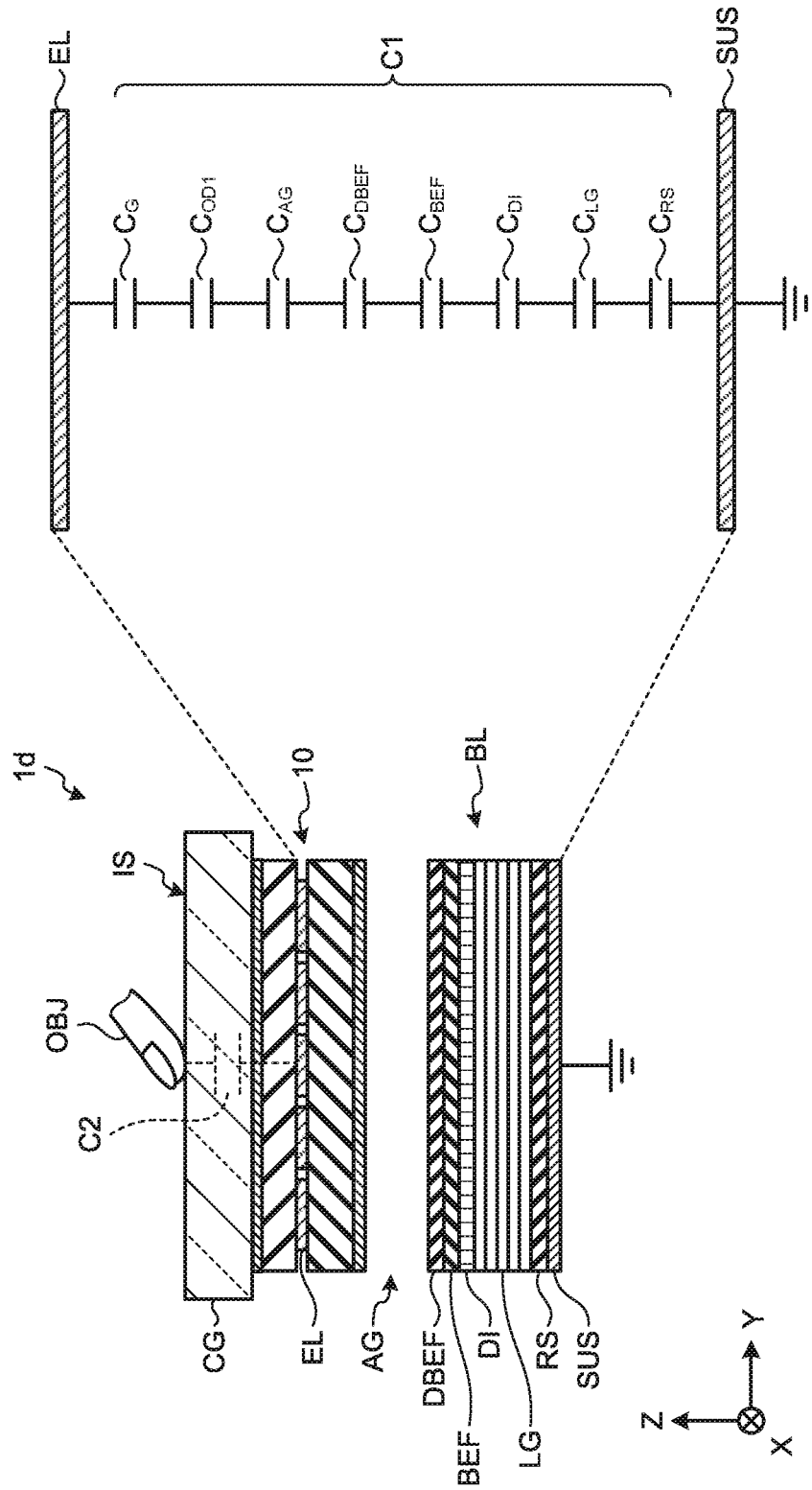
FIG. 70 illustrates a sectional view and an equivalent circuit diagram of the display apparatus with a touch detection function according to the fourth embodiment when the detection target object is in contact with or in proximity to the input surface thereof.

FIG. 70 illustrates a sectional view and an equivalent circuit diagram of the display apparatus with a touch detection function according to the fourth embodiment when the detection target object is in contact with or in proximity to the input surface thereof. As illustrated in FIG. 70, when the detection target object (finger in this case) OBJ is in contact with or in proximity to the input surface IS, capacitance C2 is generated between the electrode EL and the detection target object OBJ. At this time, the capacitance value C detected by the electrode EL can be represented by Expression (35) below.

$$C = C2 + C1 \quad (35)$$

Figure 71:
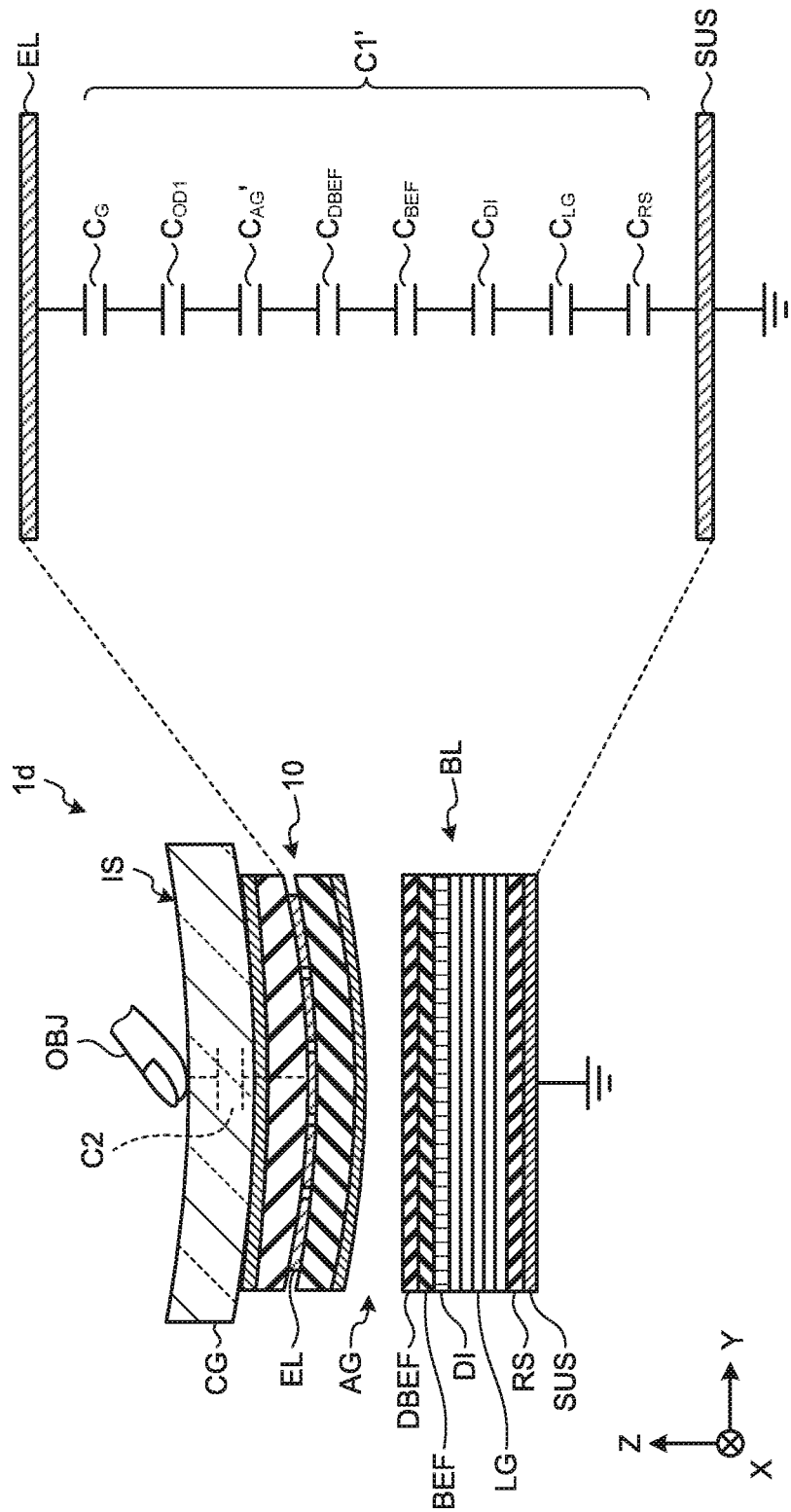
FIG. 71 illustrates a sectional view and an equivalent circuit diagram of the display apparatus with a touch detection function according to the fourth embodiment when a force is applied to the input surface thereof.

FIG. 71 illustrates a sectional view and an equivalent circuit diagram of the display apparatus with a touch detection function according to the fourth embodiment when a force is applied to the input surface thereof. As illustrated in FIG. 71, the display device with a touch detection function 10 bends when the detection target object OBJ applies the force to the input surface IS. The bending of the display device with a touch detection function 10 reduces the thickness of the air layer AG. At this time, capacitance $C_{AG}'$ generated by the air layer AG increases by $\Delta C_{AG}$ from capacitance $C_{AG}$ generated by the air layer AG when no force is applied to the input surface IS, and is represented by Expression (36) below.

$$C_{AG}' = C_{AG} + \Delta C_{AG} \quad (36)$$

At this time, capacitance value C1' between the electrode EL and the electrode SUS can be represented by Expression (37) below.

$$C1' = C_G \times C_{OD1} \times C_{AG}' \times C_{DBEF} \times C_{BEF} \times C_{DI} \times C_{LG} \times C_{RS} / (C_G + C_{OD1} + C_{AG}' + C_{DBEF} + C_{BEF} + C_{DI} + C_{LG}) \quad (37)$$

At this time, the capacitance value C detected by the electrode EL can be represented by Expression (38) below.

$$C = C2 + C1' \quad (38)$$

The display apparatus with a touch detection function 1d according to the fourth embodiment simultaneously performs the self-capacitance touch detection and the self-capacitance force detection using the electrodes EL. That is, the touch detection and the force detection can be performed by detecting the capacitance value C1 in the state where the detection target object OBJ is neither in contact with nor in proximity to the input surface IS, the capacitance value C2 in the state where the detection target object OBJ is in contact with or in proximity to the input surface IS, and a capacitance value C3 in the state where a force is applied to the input surface IS by the detection target object OBJ.

Figure 72:
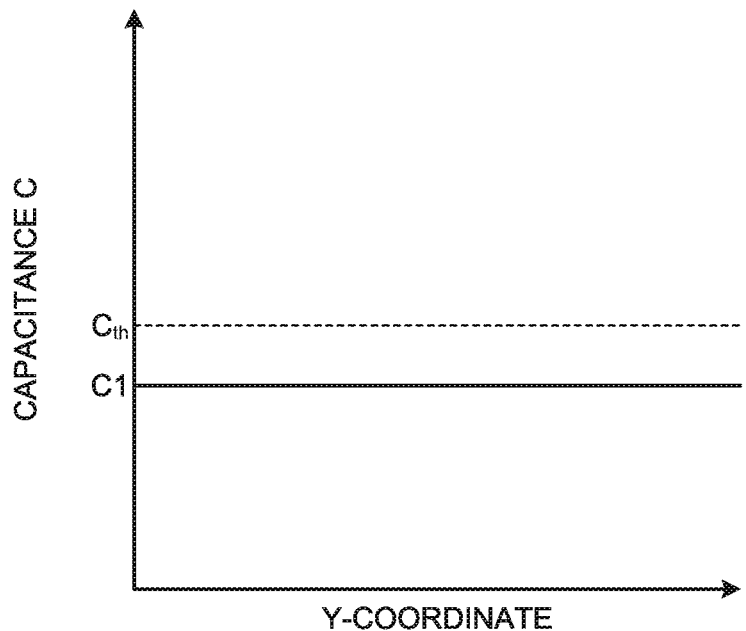
FIG. 72 is a graph illustrating a capacitance value C in the Y-axis direction when the detection target object is neither in contact with nor in proximity to the input surface.
Figure 73:
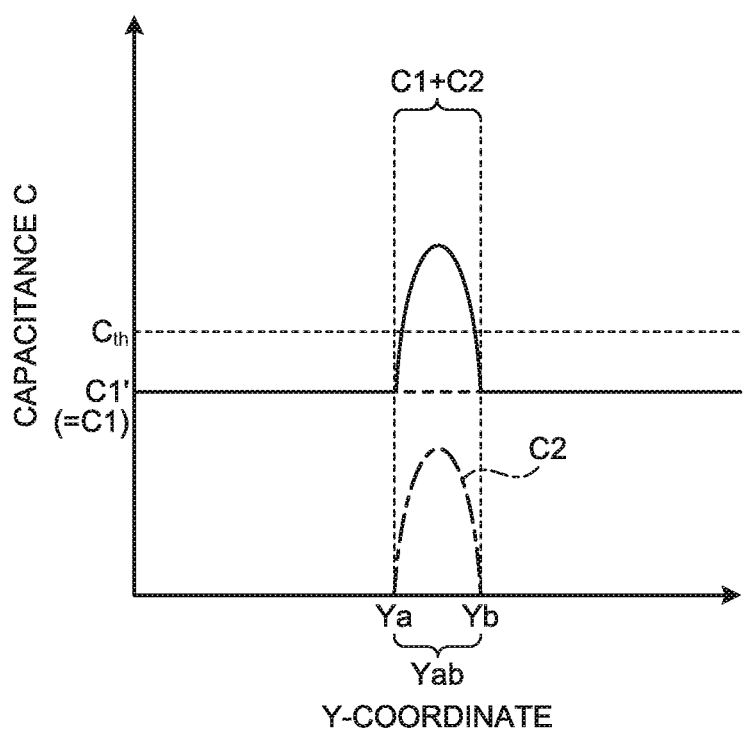
FIG. 73 is a graph illustrating the capacitance value C in the Y-axis direction when the detection target object is in contact with or in proximity to the input surface.
Figure 74:
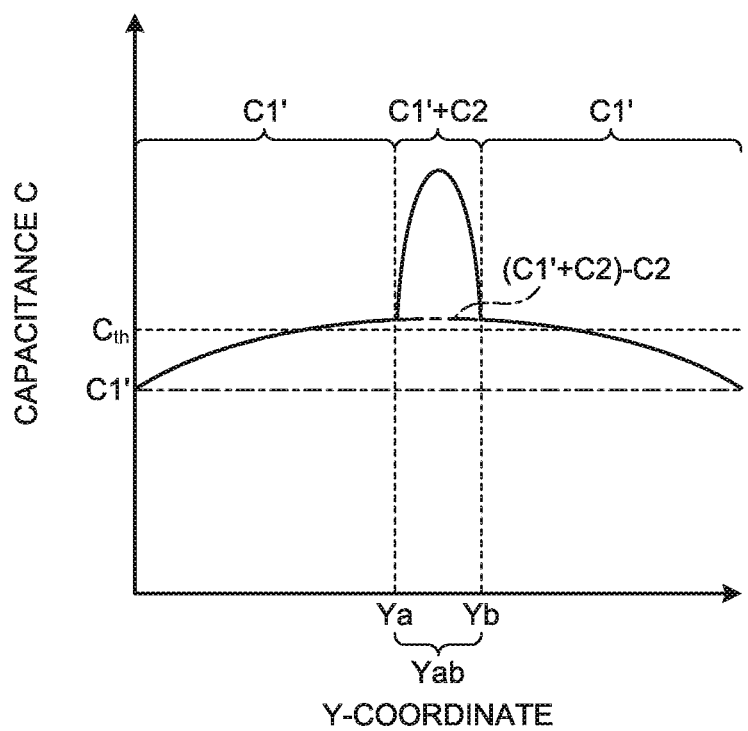
FIG. 74 is a graph illustrating the capacitance value C in the Y-axis direction when a force is applied to the input surface.

FIG. 72 is a graph illustrating the capacitance value C in the Y-axis direction when the detection target object is neither in contact with nor in proximity to the input surface. FIG. 73 is a graph illustrating the capacitance value C in the Y-axis direction when the detection target object is in contact with or in proximity to the input surface. FIG. 74 is a graph illustrating the capacitance value C in the Y-axis direction when a force is applied to the input surface. In FIGS. 72 to 74, the horizontal axis represents the Y-coordinate, and the vertical axis represents the capacitance value C detected by the electrodes EL. In the examples illustrated in FIGS. 72 to 74, the coordinate in the X-axis direction is that of a position on the input surface IS where the detection target object OBJ is in contact therewith or in proximity thereto. While these examples are illustrated with respect to the Y-axis direction of the force detection area Af on the input surface IS, the same applies with respect to the X-axis direction thereof.

In the present embodiment, as illustrated in FIGS. 72 to 74, a predetermined threshold $C_{th}$ is set for the capacitance value C detected by the electrodes EL.

In the state where the detection target object OBJ is neither in contact with nor in proximity to the input surface IS, the capacitance value C1 between the electrode EL and the electrode SUS is uniformly detected in the entire area of the force detection area Af on the input surface IS (C=C1), as illustrated in FIG. 72.

In the state where the detection target object OBJ is in contact with or in proximity to the input surface IS, the capacitance C2 generated between the electrode EL and the detection target object OBJ is added to the capacitance value C1 between the electrode EL and the electrode SUS. Thus, a capacitance value C obtained by adding the capacitance values C1 and C2 is detected in a region Yab from a coordinate Ya to a coordinate Yb where the detection target object OBJ is in contact therewith or in proximity thereto (C=C1+C2), as illustrated in FIG. 73. In the present embodiment, if a region is present in which the capacitance value C detected by the electrode EL exceeds the threshold $C_{th}$, the detection target object OBJ is determined to be in contact with or in proximity to the input surface IS.

The capacitance C2 generated between the electrodes EL and the detection target object OBJ can be obtained by calculating the difference between the capacitance value C(=C1+C2) detected in the state where the detection target object OBJ is in contact with or in proximity to the input surface IS and the capacitance value C(=C1) detected in the state where the detection target object OBJ is neither in contact with nor in proximity to the input surface IS (C2=(C1+C2)−C1).

Furthermore, in the state where a force is applied to the input surface IS, the capacitance values C1 between the electrodes EL and the electrodes SUS increase in the entire area including the region Yab with which the detection target object OBJ is in contact (C1<C1'), as illustrated in FIG. 74. At this time, the capacitance values C in the entire area of the force detection area Af on the input surface IS can be obtained by subtracting the capacitances C2 that are generated between the electrodes EL and the detection target object OBJ and obtained as described above from the capacitance values C(=C1'+C2) detected by the electrodes EL in the region Yab. When a force is applied to the force detection device, coordinates to which the force is applied may be obtained by analyzing the graph illustrated in FIG. 74 or the like, and the capacitance value Ccur2 (C1') at the obtained coordinates may be calculated. For example, a plurality of thresholds may be set to detect, as a region to which a force is applied, a region (region Yab) in which the capacitance value increases more significantly than its surrounding regions. The capacitance value Ccur2 (C1') in the region to which the force is applied may be obtained by performing linear interpolation using the coordinate values Ya and Yb, as illustrated by a long-dashed short-dashed line in FIG. 74. As illustrated in FIG. 72, the capacitance value C1 detected at the coordinates when no force is applied to the force detection device may be used as the capacitance value Ccur1.

The method for calculating the capacitance value C in the region Yab with which the detection target object OBJ is in contact is not limited to the method described above. For example, the coordinates Ya and Yb at both ends of the region Yab with which the detection target object OBJ is in contact may be detected, and the capacitance value C between the coordinates Ya and Yb may be linearly interpolated, or may be nonlinearly interpolated using capacitance values at a plurality of coordinates. The present invention is not limited by the method for calculating the capacitance value C in the region Yab with which the detection target object OBJ is in contact.

4-2. Configuration and Operation of Force Detection Controller

The force detection processing in the present embodiment is performed by, for example, the force detection processor 442 of the signal processor 44 in the force detection controller 50 illustrated in FIG. 2. The force detection processing in the present embodiment is performed by, for example, the force detection processor 442a of the signal processor 44a in the force detection controller 50a illustrated in FIG. 40. The force detection processing in the present embodiment is performed by, for example, the force detection processor 442b of the signal processor 44b in the force detection controller 50b illustrated in FIG. 52. The force detection processing in the present embodiment is performed by, for example, the force detection processor 442c of the signal processor 44c in the force detection controller 50c illustrated in FIG. 62. The following description describes a configuration example of a force detection processor 442d in a force detection controller 50d that is substitutable for the force detection processor 442 in the force detection controller 50 illustrated in FIG. 2.

Figure 75:
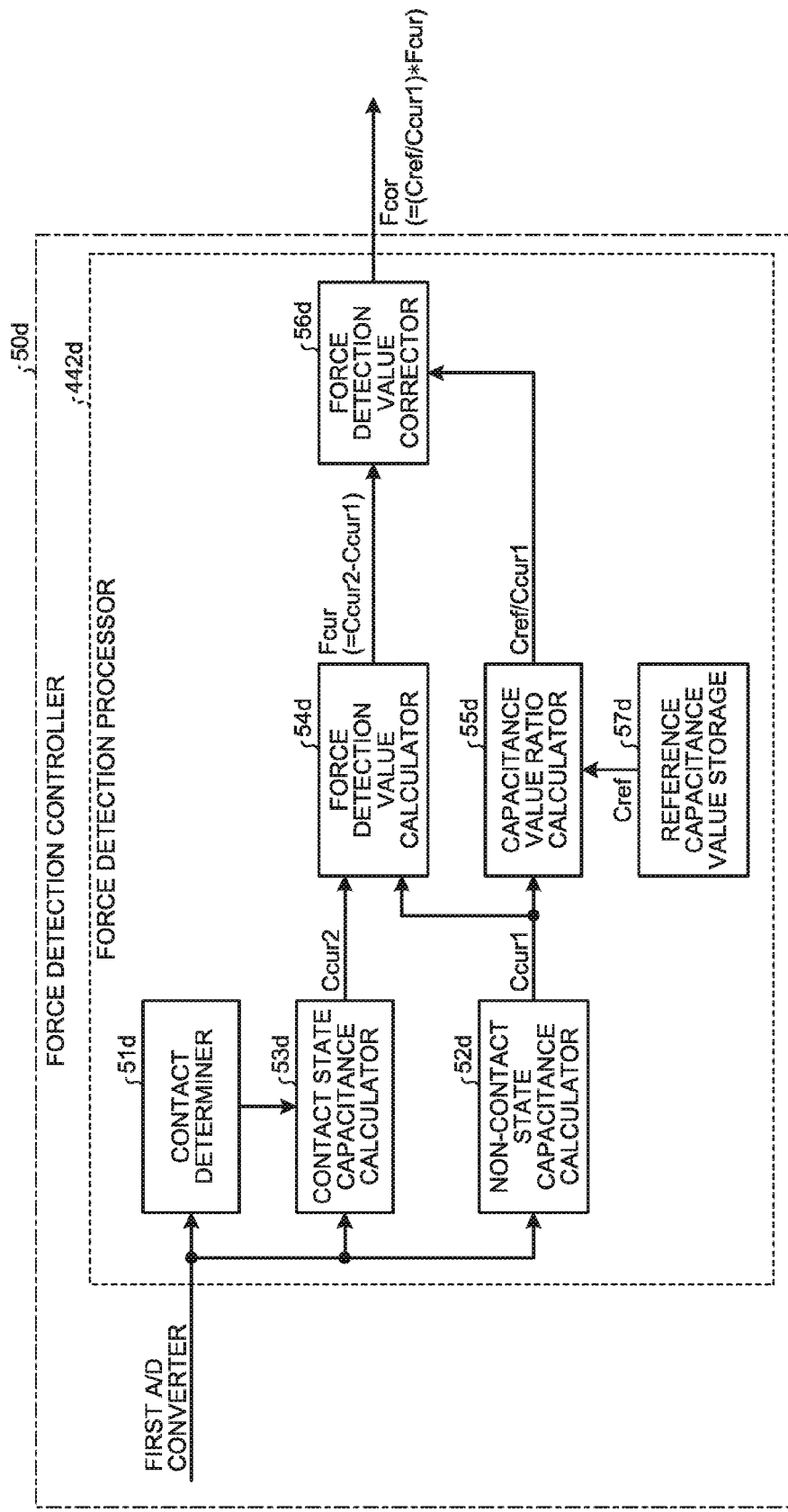
FIG. 75 is a diagram illustrating functional blocks of a force detection controller of the display apparatus with the touch detection function according to the fourth embodiment.

FIG. 75 is a diagram illustrating functional blocks of the force detection controller of the display apparatus with a touch detection function according to the fourth embodiment.

The force detection processor 442d of the force detection controller 50d includes a contact determiner 51d, a non-contact state capacitance calculator 52d, a contact state capacitance calculator 53d, a force detection value calculator 54d, a capacitance value ratio calculator 55d, a force detection value corrector 56d, and a reference capacitance value storage 57d. The reference capacitance value storage 57d stores in advance the reference capacitance value Cref between the electrode EL and the electrode SUS in the non-contact state at the reference temperature Tref (for example, under the environment of room temperature 25° C.). The reference capacitance value Cref may be individually set before shipment of the display apparatus with a touch detection function 1d according to the fourth embodiment. The reference capacitance value storage 57d is made up of, for example, a register and/or the like.

The contact determiner 51d, the non-contact state capacitance calculator 52d, the contact state capacitance calculator 53d, the force detection value calculator 54d, the capacitance value ratio calculator 55d, and the force detection value corrector 56d are configured, for example, as circuits. The contact determiner 51d, the non-contact state capacitance calculator 52d, the contact state capacitance calculator 53d, the force detection value calculator 54d, the capacitance value ratio calculator 55d, and the force detection value corrector 56d may be implemented by execution of programs by the touch IC 49. In this case, the contact determiner 51d, the non-contact state capacitance calculator 52d, the contact state capacitance calculator 53d, the force detection value calculator 54d, the capacitance value ratio calculator 55d, and the force detection value corrector 56d may be implemented by execution of the programs by the COG 19 or the host HST, or may be implemented by execution of the programs by cooperation of two or more of the COG 19, the touch IC 49, and the host HST.

The contact determiner 51d determines whether or not the detection target object OBJ is in contact with or in proximity to the input surface IS, based on the signal output from the first A/D converter 43-1 (refer to FIG. 2). As a method for determining whether or not the detection target object OBJ is in contact with or in proximity to the input surface IS, for example, the detection target object OBJ can be determined to be in contact with or in proximity to the input surface IS if a region is present in which the capacitance value C detected by the electrode EL exceeds the threshold $C_{th}$, as described above. The present invention is not limited by the method for determining whether or not the detection target object OBJ is in contact with or in proximity to the input surface IS.

While the drive signal Vcomts1 (or the drive signal Vcomts2) is applied to the electrodes EL, if the contact determiner 51d determines that the detection target object OBJ is neither in contact with nor in proximity to the input surface IS, the non-contact state capacitance calculator 52d calculates the capacitance value Ccur1 in the non-contact state based on the signal output from the first A/D converter 43-1 (refer to FIG. 2), and outputs the capacitance value Ccur1 to the force detection value calculator 54d and the capacitance value ratio calculator 55d.

While the drive signal Vcomts1 (or the drive signal Vcomts2) is applied to the electrodes EL, if the contact determiner 51d determines that the detection target object OBJ is in contact with or in proximity to the input surface IS, the contact state capacitance calculator 53d calculates the capacitance value Ccur2 in the contact state based on the signal output from the first A/D converter 43-1 (refer to FIG. 2), and outputs the capacitance value Ccur2 to the force detection value calculator 54d.

The force detection value calculator 54d calculates, as the force detection value Fcur, the amount of change (Ccur2−Ccur1) of the capacitance value Ccur2 in the contact state relative to the capacitance value Ccur1 in the non-contact state, and outputs the force detection value Fcur to the force detection value corrector 56d.

The capacitance value ratio calculator 55d calculates the ratio (Cref/Ccur1) between the reference capacitance value Cref in the non-contact state at the reference temperature Tref and the capacitance value Ccur1 detected in the non-contact state, and outputs the ratio (Cref/Ccur1) to the force detection value corrector 56d.

The force detection value corrector 56d receives the force detection value Fcur from the force detection value calculator 54d. The force detection value corrector 56d receives the ratio (Cref/Ccur1) from the capacitance value ratio calculator 55d. The force detection value corrector 56d calculates the corrected force detection value Fcor (=(Cref/Ccur1)*Fcur) by multiplying the force detection value Fcur by the ratio (Cref/Ccur1) between the reference capacitance value Cref in the non-contact state at the reference temperature Tref and the capacitance value Ccur1 detected in the non-contact state, and outputs the corrected force detection value Fcor.

In the present embodiment, the force detection controller 50d performs the force detection based on the capacitance values detected by the electrodes EL during the self-capacitance detection period 140 (or the self-capacitance detection period 141).

FIG. 76 is a flowchart illustrating a process executed by the force detection controller of the display apparatus with a touch detection function according to the fourth embodiment. The process illustrated in FIG. 76 is executed during the self-capacitance detection period 140 (or the self-capacitance detection period 141) described above.

The non-contact state capacitance calculator 52$d$ calculates the capacitance value Ccur1 in the non-contact state based on the signal output from the first A/D converter 43-1 (refer to FIG. 2) (Step S501).

The contact determiner 51$d$ determines whether or not the detection target object OBJ is in contact with or in proximity to the input surface IS (Step S502). If the contact determiner 51$d$ determines that the detection target object OBJ is neither in contact with nor in proximity to the input surface IS, that is, no force is applied to the input surface IS (No at Step S502), the process returns to Step S501, and the processing of Steps S501 and S502 is repeatedly performed until the detection target object OBJ is determined to be in contact with or in proximity to the input surface IS at Step S502. As a method used by the contact determiner 51$d$ to determine whether or not the detection target object OBJ is in contact with or in proximity to the input surface IS, for example, the detection target object OBJ can be determined to be in contact with or in proximity to the input surface IS if a region is present in which the capacitance value C detected by the electrode EL exceeds the threshold $C_{th}$.

If the contact determiner 51$d$ determines that the detection target object OBJ is in contact with or in proximity to the input surface IS (Yes at Step S502), the contact state capacitance calculator 53$d$ calculates the capacitance value Ccur2 in the contact state based on the signal output from the first A/D converter 43-1 (refer to FIG. 2) (Step S503).

The force detection value calculator 54$d$ calculates, as the force detection value Fcur, the amount of change (Ccur2−Ccur1) of the capacitance value Ccur2 detected in the contact state relative to the capacitance value Ccur1 detected in the non-contact state, and outputs the force detection value Fcur to the force detection value corrector 56$d$ (Step S504).

The capacitance value ratio calculator 55$d$ calculates the ratio (Cref/Ccur1) between the reference capacitance value Cref in the non-contact state at the reference temperature Tref and the capacitance value Ccur1 detected in the non-contact state, and outputs the ratio (Cref/Ccur1) to the force detection value corrector 56$d$ (Step S505).

The force detection value corrector 56$d$ receives the force detection value Fcur from the force detection value calculator 54$d$. The force detection value corrector 56$d$ receives the ratio (Cref/Ccur1) from the capacitance value ratio calculator 55$d$. The force detection value corrector 56$d$ calculates the corrected force detection value Fcor (=(Cref/Ccur1)*Fcur) by multiplying the force detection value Fcur by the ratio (Cref/Ccur1) between the reference capacitance value Cref in the non-contact state at the reference temperature Tref and the capacitance value Ccur1 detected in the non-contact state, and outputs the corrected force detection value Fcor (Step S506). The process then returns to the processing at Step S501.

The execution of the process described above can reduce the influence of the temperature characteristics of the dielectric materials, which are included in the air layer AG and the layered body LB provided between the electrode EL and the electrode SUS, on the force detection processing, and thus can restrain the reduction in accuracy of the detection in the force detection processing.

FIGS. 75 and 76 exemplify the configuration example and the processing example of the force detection processor 442$d$ of the force detection controller 50$d$ that is substitutable for the force detection processor 442 in the force detection controller 50 illustrated in FIG. 2. The configuration and the processing of the force detection controller 50$d$ of the display apparatus with a touch detection function 1$d$ according to the fourth embodiment are, however, not limited to these examples.

For example, the display apparatus with a touch detection function 1$d$ according to the fourth embodiment can have a configuration in which the force detection processor 442$d$ of the force detection controller 50$d$ is substitutable for the force detection processor 442$a$ in the force detection controller 50$a$ illustrated in FIG. 40. In this case, the predetermined threshold $C_{th}$ for the capacitance value C detected by the electrode EL may be varied according to the temperature detected by the temperature sensor 60. Doing so enables more accurate detection of the contact or proximity of the detection target object OBJ to the input surface IS.

For example, the display apparatus with a touch detection function 1$d$ according to the fourth embodiment can have a configuration in which the force detection processor 442$d$ of the force detection controller 50$d$ is substitutable for the force detection processor 442$b$ in the force detection controller 50$b$ illustrated in FIG. 52, or can have a configuration in which the force detection processor 442$d$ of the force detection controller 50$d$ is substitutable for the force detection processor 442$c$ in the force detection controller 50$c$ illustrated in FIG. 62. Doing so enables correction of the force detection value Fcur according to the coordinates of the touch detection position, and thus can restrain the reduction in accuracy of the detection in the force detection processing regardless of the touch detection position.

In the fourth embodiment described above, the example has been presented that is applied to the configuration of performing both the mutual capacitance touch detection and the self-capacitance touch detection. However, the display apparatus with a touch detection function 1$d$ according to the fourth embodiment can be applied to a configuration of performing only the self-capacitance touch detection, without performing the mutual capacitance touch detection.

As described above, the display apparatus with a touch detection function 1$d$ according to the fourth embodiment includes the input surface IS, the electrodes EL (first electrode), the electrode SUS (second electrode), the touch detection controller 40, and the force detection controller 50$d$. The input surface IS is a surface to which the force is applied by the detection target object OBJ. The electrode EL (first electrode) and the electrode SUS (second electrode) are disposed facing each other across the dielectric layer. The touch detection controller 40 detects the contact or proximity of the detection target object OBJ to the input surface IS. The force detection controller 50$d$ detects a force applied to the input surface IS by the detection target object OBJ based on the electrostatic capacitance between the electrode EL (first electrode) and the electrode SUS (second electrode). The force detection controller 50$d$ corrects the force detection value Fcur based on the ratio (Cref/Ccur1) between the reference capacitance value Cref and the capacitance value Ccur1. The reference capacitance value Cref represents a capacitance value between the electrode EL (first electrode) and the electrode SUS (second electrode) in the non-contact state of the detection target object OBJ with the input surface IS at the reference temperature Tref. The capacitance value Ccur1 represents a capacitance value between the electrode EL (first electrode) and the electrode SUS (second electrode) in the non-contact state of the detection target object OBJ with the input surface IS.

The configuration described above can reduce the influence of the temperature characteristics of the dielectric materials, which are included in the air layer AG and the layered body LB provided between the electrode EL (first electrode) and the electrode SUS (second electrode), on the force detection processing, and thus can restrain the reduction in accuracy of the detection in the force detection processing.

According to the present embodiment, the display apparatus with a touch detection function is obtained that is capable of restraining the reduction in accuracy of detection of a force applied to the input surface of the touchscreen panel.

The components of the embodiments described above can be combined as appropriate. Other operational advantages accruing from the aspects described in the embodiments that are obvious from the description herein, or that are appropriately conceivable by those skilled in the art will naturally be understood as accruing from the present invention.

What is claimed is:

1. A display apparatus with a touch detection function, the display apparatus comprising:
   an input surface configured to receive a force applied by a detection target object;
   a touch detection electrode provided on a first substrate and facing the input surface;
   a drive electrode provided on a second substrate and facing the touch detection electrode;
   a force detection electrode facing the drive electrode with a dielectric layer therebetween;
   a pixel electrode;
   a display controller configured to, during a display period, display an image in the input surface by generating an electric field between the pixel electrode and the drive electrode;
   a touch detection controller configured to, during the touch detection period, detect contact with or proximity to the input surface by the detection target object based on electrostatic capacitance between the drive electrode and the touch detection electrode; and
   a force detection controller configured to, during the touch detection period, detect a force applied to the input surface by the detection target object based on electrostatic capacitance between the drive electrode and the force detection electrode,
   wherein the drive electrode is disposed between the touch detection electrode and the force detection electrode,
   wherein a gap between the drive electrode and the force detection electrode is deformed by the force applied to the input surface, and
   wherein the force detection controller is configured to correct a force detection value based on a reference capacitance value between the drive electrode and the force detection electrode at a reference temperature in a non-contact state of the detection target object with the input surface,
   wherein the force detection controller is configured to correct the force detection value by multiplying the force detection value by a ratio between the reference capacitance value and the first capacitance value.

2. The display apparatus with a touch detection function according to claim 1,
   wherein the force detection controller is configured:
   to calculate a first capacitance value between the drive electrode and the force detection electrode in the non-contact state of the detection target object with the input surface;
   to calculate a second capacitance value between the drive electrode and the force detection electrode in a contact state of the detection target object with the input surface, and;
   to detect, as the force detection value, an amount of change of the second capacitance value relative to the first capacitance value.

3. The display apparatus with a touch detection function according to claim 1,
   wherein the dielectric layer includes an air layer.

4. The display apparatus with a touch detection function according to claim 1,
   wherein the dielectric layer includes a layered body included in a backlight device for illuminating the input surface.

5. The display apparatus with a touch detection function according to claim 4,
   wherein the force detection electrode is provided on a surface opposite to a surface on the input surface side of the layered body.

6. The display apparatus with a touch detection function according to claim 4,
   wherein the force detection electrode is provided on a surface on the input surface side of the layered body.

7. The display apparatus with a touch detection function according to claim 4,
   wherein the force detection electrode is provided in an inner layer of the layered body.

8. A display apparatus with a touch detection function, the display apparatus comprising:
   an input surface configured to receive a force applied by a detection target object;
   a first electrode and a second electrode disposed facing each other with a dielectric layer therebetween;
   a touch detection controller configured to detect a position where the detection target object is in contact with or in proximity to the input surface; and
   a force detection controller configured to detect a force applied to the input surface by the detection target object based on electrostatic capacitance generated between the first electrode and the second electrode,
   wherein the force detection controller is configured to correct a force detection value indicating the detected force, based on a first ratio between a reference capacitance value of the electrostatic capacitance at a reference temperature in a non-contact state of the detection target object with the input surface and the electrostatic capacitance in the non-contact state of the detection target object with the input surface, and
   wherein the force detection controller is configured to correct the force detection value based on a second ratio between the force detection value at a reference position in a force detection area on the input surface and the force detection value at any position in the force detection area.

9. The display apparatus with a touch detection function according to claim 8,
   wherein the force detection controller is configured to correct the force detection value by multiplying the force detection value by the first ratio.

10. The display apparatus with a touch detection function according to claim 8, wherein the first ratio is set in advance as a first correction coefficient, and wherein the force detection controller is configured to correct the force detection value by multiplying the force detection value by the first correction coefficient.

11. The display apparatus with a touch detection function according to claim 10, further comprising a temperature sensor, wherein the force detection controller is configured to correct the force detection value according to a temperature detected by the temperature sensor, based on a first correction coefficient table associating the temperature with the first correction coefficient.

12. The display apparatus with a touch detection function according to claim 8, wherein the second ratio is set in advance as a second correction coefficient, and wherein the force detection controller is configured to correct the force detection value based on the second correction coefficient.

13. The display apparatus with a touch detection function according to claim 12, wherein the force detection controller is configured to correct the force detection value by multiplying the force detection value by the second correction coefficient.

14. The display apparatus with a touch detection function according to claim 13, wherein the force detection controller is configured to correct the force detection value according to the touch detection position detected by the touch detection controller, based on a second correction coefficient table associating the position in the force detection area with the second correction coefficient.

15. The display apparatus with a touch detection function according to claim 8, wherein the force detection controller is configured:

to calculate a first capacitance value of the electrostatic capacitance in the non-contact state of the detection target object with the input surface;

to calculate a second capacitance value of the electrostatic capacitance in a contact state of the detection target object with the input surface; and to detect, as the force detection value, an amount of change of the second capacitance value relative to the first capacitance value.

16. A display apparatus with a touch detection function, the display apparatus comprising:

an input surface configured to receive a force applied by a detection target object;

a first electrode and a second electrode disposed facing each other with a dielectric layer therebetween;

a touch detection controller configured to detect a position where the detection target object is in contact with or in proximity to the input surface; and a force detection controller configured to detect a force applied to the input surface by the detection target object based on electrostatic capacitance generated between the first electrode and the second electrode, and correct a force detection value indicating the detected force, based on a ratio between the force detection value at a reference position in a force detection area on the input surface and the force detection value at any position in the force detection area.

* * * * *